United States Patent
Calvin et al.

(10) Patent No.: US 12,523,824 B2
(45) Date of Patent: Jan. 13, 2026

(54) TERMINALS HAVING OPTICAL CONNECTION PORTS WITH SECURING FEATURES PROVIDING STABLE RETENTION FORCES AND METHODS OF MAKING THE SAME

(71) Applicant: Corning Research & Development Corporation, Corning, NY (US)

(72) Inventors: Matthew Calvin, Charlotte, NC (US); Allison Bailey McGinnis, Littleton, CO (US); Joel Christopher Rosson, Hickory, NC (US); Shane Chad Woody, Mooresville, NC (US); Zhiye Zhang, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 576 days.

(21) Appl. No.: 17/719,679

(22) Filed: Apr. 13, 2022

(65) Prior Publication Data

US 2022/0236497 A1 Jul. 28, 2022

Related U.S. Application Data

(63) Continuation of application No. PCT/US2020/053443, filed on Sep. 30, 2020.
(Continued)

(51) Int. Cl.
*G02B 6/00* (2006.01)
*G02B 6/38* (2006.01)
*G02B 6/44* (2006.01)

(52) U.S. Cl.
CPC ......... *G02B 6/3893* (2013.01); *G02B 6/3825* (2013.01); *G02B 6/4444* (2013.01);
(Continued)

(58) Field of Classification Search
None
See application file for complete search history.

(56) References Cited

U.S. PATENT DOCUMENTS 3,074,107 A 1/1963 Kiyoshi et al.
3,532,783 A 10/1970 Pusey et al.
(Continued)

FOREIGN PATENT DOCUMENTS

AU 2006232206 A1 10/2006
CN 1060911 A 5/1992
(Continued)

OTHER PUBLICATIONS

Liu et al., "Variable optical power splitters create new apps", Retrieved from: https://www.lightwaveonline.com/fttx/pon-systems/article/16648432/variable-optical-power-splitters-create-new-apps, 2005, 14 pages.
(Continued)

*Primary Examiner* — Jennifer Doan
(74) *Attorney, Agent, or Firm* — Michael E. Carroll, Jr.

(57) ABSTRACT

Devices such as terminals comprising connection ports with associated securing features and methods for making the same are disclosed. In one embodiment, the device comprises a shell, at least one connection port, and at least one securing feature. The at least one connection port is disposed on the terminal with the at least one connection port comprising an optical connector opening extending from an outer surface of the terminal to a cavity of the terminal and defining a connection port passageway. The securing feature is associated with the connection port passageway and is biased by a resilient member having a predetermined preload restoring force to the retain position.

65 Claims, 35 Drawing Sheets

Related U.S. Application Data

(60) Provisional application No. 62/923,245, filed on Oct. 18, 2019.

(52) U.S. Cl.
CPC ..... *G02B 6/44465* (2023.05); *G02B 6/44515* (2023.05); *G02B 6/44526* (2023.05); *G02B 6/44528* (2023.05); *G02B 6/44775* (2023.05)

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Wano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,876,071 A | 3/1999 | Aldridge |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |

(56) References Cited

U.S. PATENT DOCUMENTS

| | | |
|---|---|---|
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,224,270 B1 | 5/2001 | Nakajima et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,293,710 B1 | 9/2001 | Lampert et al. |
| 6,298,190 B2 | 10/2001 | Waldron et al. |
| 6,305,849 B1 | 10/2001 | Roehrs et al. |
| 6,321,013 B1 | 11/2001 | Hardwick et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,402,388 B1 | 6/2002 | Imazu et al. |
| 6,404,962 B1 | 6/2002 | Hardwick et al. |
| 6,409,391 B1 | 6/2002 | Chang |
| 6,422,764 B1 | 7/2002 | Marrs et al. |
| 6,427,035 B1 | 7/2002 | Mahony |
| 6,428,215 B1 | 8/2002 | Nault |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,533,468 B2 | 3/2003 | Nakajima et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,652 B1 | 4/2003 | Mahony |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Oder et al. |
| 6,809,265 B1 | 10/2004 | Gladd et al. |
| 6,841,729 B2 | 1/2005 | Sakabe et al. |
| 6,848,838 B2 | 2/2005 | Doss et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,899,467 B2 | 5/2005 | McDonald et al. |
| 6,908,233 B2 | 6/2005 | Nakajima et al. |
| 6,909,821 B2 | 6/2005 | Ravasio et al. |
| 6,916,120 B2 | 7/2005 | Zimmel et al. |
| 6,918,704 B2 | 7/2005 | Marrs et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,011,454 B2 | 3/2006 | Caveney et al. |
| 7,013,074 B2 | 3/2006 | Battey et al. |
| 7,025,507 B2 | 4/2006 | De Marchi |
| 7,033,191 B1 | 4/2006 | Cao |
| 7,044,650 B1 | 5/2006 | Tran et al. |
| 7,052,185 B2 | 5/2006 | Rubino et al. |
| 7,079,734 B2 | 7/2006 | Seddon et al. |
| 7,085,468 B2 | 8/2006 | Forrester |
| 7,088,899 B2 | 8/2006 | Reagan et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,103,255 B2 | 9/2006 | Reagan et al. |
| 7,103,257 B2 | 9/2006 | Donaldson et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,137,742 B2 | 11/2006 | Theuerkorn et al. |
| 7,146,089 B2 | 12/2006 | Reagan et al. |
| 7,146,090 B2 | 12/2006 | Vo et al. |
| 7,150,567 B1 | 12/2006 | Luther et al. |
| 7,165,893 B2 | 1/2007 | Schmitz |
| 7,171,102 B2 | 1/2007 | Reagan et al. |
| 7,178,990 B2 | 2/2007 | Caveney et al. |
| 7,184,634 B2 | 2/2007 | Hurley et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |

(56) References Cited

U.S. PATENT DOCUMENTS

| | | |
|---|---|---|
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,580,607 B2 | 8/2009 | Jones et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,002,566 B1 | 8/2011 | Baumann et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | Mcdowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,770,862 B2 | 7/2014 | Lu et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,944,703 B2 | 2/2015 | Song et al. |
| 8,974,124 B2 | 3/2015 | Chang |

(56) References Cited

U.S. PATENT DOCUMENTS

| | | |
|---|---|---|
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | Mcgranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,379,308 B2 | 8/2019 | Coate |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |

(56) References Cited

U.S. PATENT DOCUMENTS

| | | |
|---|---|---|
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 11,409,055 B2 * | 8/2022 | Dannoux ............... G02B 6/387 |
| 11,886,017 B2 * | 1/2024 | Dannoux ............. G02B 6/3885 |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |

(56) References Cited

U.S. PATENT DOCUMENTS

| | | |
|---|---|---|
| 2008/0142228 A1 | 6/2008 | Harvey et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Pinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | Mcgranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |

(56) References Cited

U.S. PATENT DOCUMENTS

| | | |
|---|---|---|
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0018875 A1 | 1/2017 | Bauer et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267265 A1 | 9/2018 | Zhang et al. |
| 2018/0329149 A1 | 11/2018 | Mullaney et al. |
| 2018/0372962 A1 | 12/2018 | Senhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Dannoux et al. |
| 2020/0132939 A1 | 4/2020 | Coenegracht et al. |
| 2020/0174214 A1 | 6/2020 | Alves et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |

(56) References Cited

U.S. PATENT DOCUMENTS

| | | | |
|---|---|---|---|
| 2020/0393629 A1 | 12/2020 | Hill et al. | |
| 2021/0318499 A1 | 10/2021 | Cote et al. | |

FOREIGN PATENT DOCUMENTS

| | | | |
|---|---|---|---|
| CN | 1071012 A | 4/1993 | |
| CN | 1213783 A | 4/1999 | |
| CN | 1231430 A | 10/1999 | |
| CN | 1114839 C | 7/2003 | |
| CN | 1646962 A | 7/2005 | |
| CN | 1833188 A | 9/2006 | |
| CN | 1922523 A | 2/2007 | |
| CN | 1985205 A | 6/2007 | |
| CN | 101084461 A | 12/2007 | |
| CN | 101111790 A | 1/2008 | |
| CN | 101195453 A | 6/2008 | |
| CN | 201404194 Y | 2/2010 | |
| CN | 201408274 Y | 2/2010 | |
| CN | 201522561 U | 7/2010 | |
| CN | 101806939 A | 8/2010 | |
| CN | 101846773 A | 9/2010 | |
| CN | 101866034 A | 10/2010 | |
| CN | 101939680 A | 1/2011 | |
| CN | 201704194 U | 1/2011 | |
| CN | 102141655 A | 8/2011 | |
| CN | 102346281 A | 2/2012 | |
| CN | 202282523 U | 6/2012 | |
| CN | 203224645 U | 10/2013 | |
| CN | 203396982 U | 1/2014 | |
| CN | 103713362 A | 4/2014 | |
| CN | 103782209 A | 5/2014 | |
| CN | 104007514 A | 8/2014 | |
| CN | 104064903 A | 9/2014 | |
| CN | 104280830 A | 1/2015 | |
| CN | 104603656 A | 5/2015 | |
| CN | 104704411 A | 6/2015 | |
| CN | 105467529 A | 4/2016 | |
| CN | 105492946 A | 4/2016 | |
| CN | 106716205 A | 5/2017 | |
| CN | 106873086 A | 6/2017 | |
| CN | 110954996 A | 4/2020 | |
| DE | 3537684 A1 | 4/1987 | |
| DE | 3737842 C1 | 9/1988 | |
| DE | 19805554 A1 | 8/1998 | |
| EP | 0012566 A1 | 6/1980 | |
| EP | 0026553 A1 | 4/1981 | |
| EP | 0122566 A2 | 10/1984 | |
| EP | 0130513 A2 | 1/1985 | |
| EP | 0244791 A2 | 11/1987 | |
| EP | 0462362 A2 | 12/1991 | |
| EP | 0468671 A1 | 1/1992 | |
| EP | 0469671 A1 | 2/1992 | |
| EP | 0547778 A1 | 6/1993 | |
| EP | 0547788 A1 | 6/1993 | |
| EP | 0762171 A1 | 3/1997 | |
| EP | 0782025 A1 | 7/1997 | |
| EP | 0855610 A2 | 7/1998 | |
| EP | 0856751 A1 | 8/1998 | |
| EP | 0856761 A1 | 8/1998 | |
| EP | 0940700 A2 | 9/1999 | |
| EP | 0949522 A2 | 10/1999 | |
| EP | 0957381 A1 | 11/1999 | |
| EP | 0997757 A2 | 5/2000 | |
| EP | 1065542 A1 | 1/2001 | |
| EP | 1122566 A2 | 8/2001 | |
| EP | 1243957 A2 | 9/2002 | |
| EP | 1258758 A2 | 11/2002 | |
| EP | 1391762 A1 | 2/2004 | |
| EP | 1431786 A2 | 6/2004 | |
| EP | 1438622 A2 | 7/2004 | |
| EP | 1678537 A1 | 7/2006 | |
| EP | 1759231 A1 | 3/2007 | |
| EP | 1810062 A1 | 7/2007 | |
| EP | 2069845 A2 | 6/2009 | |
| EP | 2149063 A1 | 2/2010 | |
| EP | 2150847 A1 | 2/2010 | |
| EP | 2193395 A1 | 6/2010 | |
| EP | 2255233 A1 | 12/2010 | |
| EP | 2333597 A2 | 6/2011 | |
| EP | 2362253 A1 | 8/2011 | |
| EP | 2401641 A1 | 1/2012 | |
| EP | 2609458 A1 | 7/2013 | |
| EP | 2622395 A1 | 8/2013 | |
| EP | 2734879 A1 | 5/2014 | |
| EP | 2815259 A1 | 12/2014 | |
| EP | 2817667 A1 | 12/2014 | |
| EP | 2992372 A1 | 3/2016 | |
| EP | 3022596 A1 | 5/2016 | |
| EP | 3064973 A2 | 9/2016 | |
| EP | 3101740 A1 | 12/2016 | |
| EP | 3207223 A1 | 8/2017 | |
| EP | 3245545 A1 | 11/2017 | |
| EP | 3265859 A1 | 1/2018 | |
| EP | 3336992 A1 | 6/2018 | |
| EP | 3362830 A1 | 8/2018 | |
| EP | 3427096 A1 | 1/2019 | |
| EP | 3443395 A1 | 2/2019 | |
| EP | 3535614 A1 | 9/2019 | |
| EP | 3537197 A1 | 9/2019 | |
| EP | 3646074 A1 | 5/2020 | |
| EP | 3646079 A1 | 5/2020 | |
| ES | 1184287 U | 5/2017 | |
| FR | 2485754 A1 | 12/1981 | |
| GB | 2022284 A | 12/1979 | |
| GB | 2154333 A | 9/1985 | |
| GB | 2169094 A | 7/1986 | |
| JP | 52-030447 A | 3/1977 | |
| JP | 58-142308 A | 8/1983 | |
| JP | 61-145509 A | 7/1986 | |
| JP | 62-054204 A | 3/1987 | |
| JP | 63-020111 A | 1/1988 | |
| JP | 63-078908 A | 4/1988 | |
| JP | 63-089421 A | 4/1988 | |
| JP | 03-063615 A | 3/1991 | |
| JP | 03-207223 A | 9/1991 | |
| JP | 05-106765 A | 4/1993 | |
| JP | 05-142439 A | 6/1993 | |
| JP | 05-297246 A | 11/1993 | |
| JP | 06-320111 A | 11/1994 | |
| JP | 07-318758 A | 12/1995 | |
| JP | 08-050211 A | 2/1996 | |
| JP | 08-054522 A | 2/1996 | |
| JP | 08-062432 A | 3/1996 | |
| JP | 08-292331 A | 11/1996 | |
| JP | 09-049942 A | 2/1997 | |
| JP | 09-135526 A | 5/1997 | |
| JP | 09-159867 A | 6/1997 | |
| JP | 09-203831 A | 8/1997 | |
| JP | 09-325223 A | 12/1997 | |
| JP | 09-325249 A | 12/1997 | |
| JP | 10-170781 A | 6/1998 | |
| JP | 10-332953 A | 12/1998 | |
| JP | 10-339826 A | 12/1998 | |
| JP | 11-064682 A | 3/1999 | |
| JP | 11-119064 A | 4/1999 | |
| JP | 11-248979 A | 9/1999 | |
| JP | 11-271582 A | 10/1999 | |
| JP | 11-281861 A | 10/1999 | |
| JP | 11-326693 A | 11/1999 | |
| JP | 11-337768 A | 12/1999 | |
| JP | 11-352368 A | 12/1999 | |
| JP | 2000-002828 A | 1/2000 | |
| JP | 2001-116968 A | 4/2001 | |
| JP | 2001-290051 A | 10/2001 | |
| JP | 2002-520987 A | 7/2002 | |
| JP | 3296698 B2 | 7/2002 | |
| JP | 2002-250987 A | 9/2002 | |
| JP | 2003-009331 A | 1/2003 | |
| JP | 2003-070143 A | 3/2003 | |
| JP | 2003-121699 A | 4/2003 | |
| JP | 2003-177279 A | 6/2003 | |
| JP | 2003-302561 A | 10/2003 | |
| JP | 2004-361521 A | 12/2004 | |
| JP | 2005-024789 A | 1/2005 | |

(56) References Cited

FOREIGN PATENT DOCUMENTS

| | | |
|---|---|---|
| JP | 2005-031544 A | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-018003 A | 1/2011 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/006176 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

CoolShirt fittings, https://www.amazon.com/Cool-Shirt-5014-0001-Release-Connectors/dp/B01LXBXYJ9, Sep. 23, 2016 (Year: 2016).

Corning Cable Systems, "SST Figure-8 Drop Cables 1-12 Fibers", Preliminary Product Specifications, 11 pgs. (2002).

Corning Cable Systems, "SST-Drop (armor) Cables 1-12 Fibers", Product Specifications, 2 pgs. (2002).

Faulkner et al. "Optical networks for local lopp applications," J. Lightwave Technol.0733-8724 7(11), 17411751 (1989).

Fiber Systems International: Fiber Optic Solutions, data, "TFOCA-II 4-Channel Fiber Optic Connector" sheet. 2 pgs.

Infolite—Design and Data Specifications, 1 pg. Retrieved Feb. 21, 2019.

Nawata, "Multimode and Single-Mode Fiber Connectors Technology"; IEEE Journal of Quantum Electronics, vol. QE-16, No. 6 Published Jun. 1980.

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Schneier, Bruce; "Applied Cryptography: Protocols, Algorithms, and Source Code in C," Book. 1995 Sec. 10.3, 12.2, 165 Pgs.

Stratos: Ughtwave., "Innovation Brought to Light", Hybrid HMA Series, Hybrid Multi Application, 2 pgs.

Wang et al. "Opto-VLSI-based dynamic optical splitter," Electron. Lett.0013-5194 10.1049/el:20046715 40(22), 14451446 (2004).

(56) References Cited

OTHER PUBLICATIONS

Xiao et al. "1xN wavelength selective adaptive optical power splitter for wavelength-division-multiplexed passive optical networks," Optics & Laser Technology 68, pp. 160-164, May 2015.

* cited by examiner

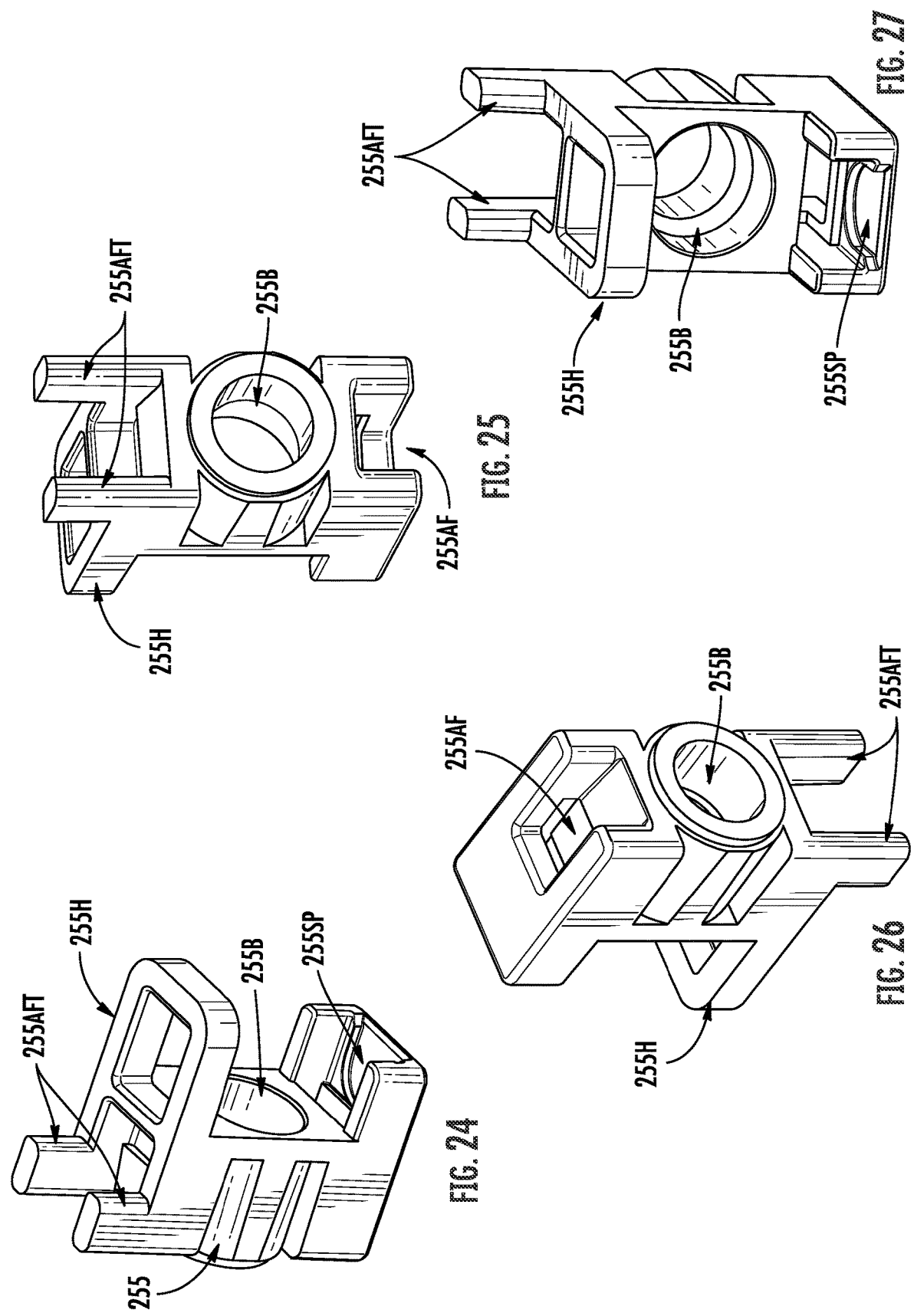

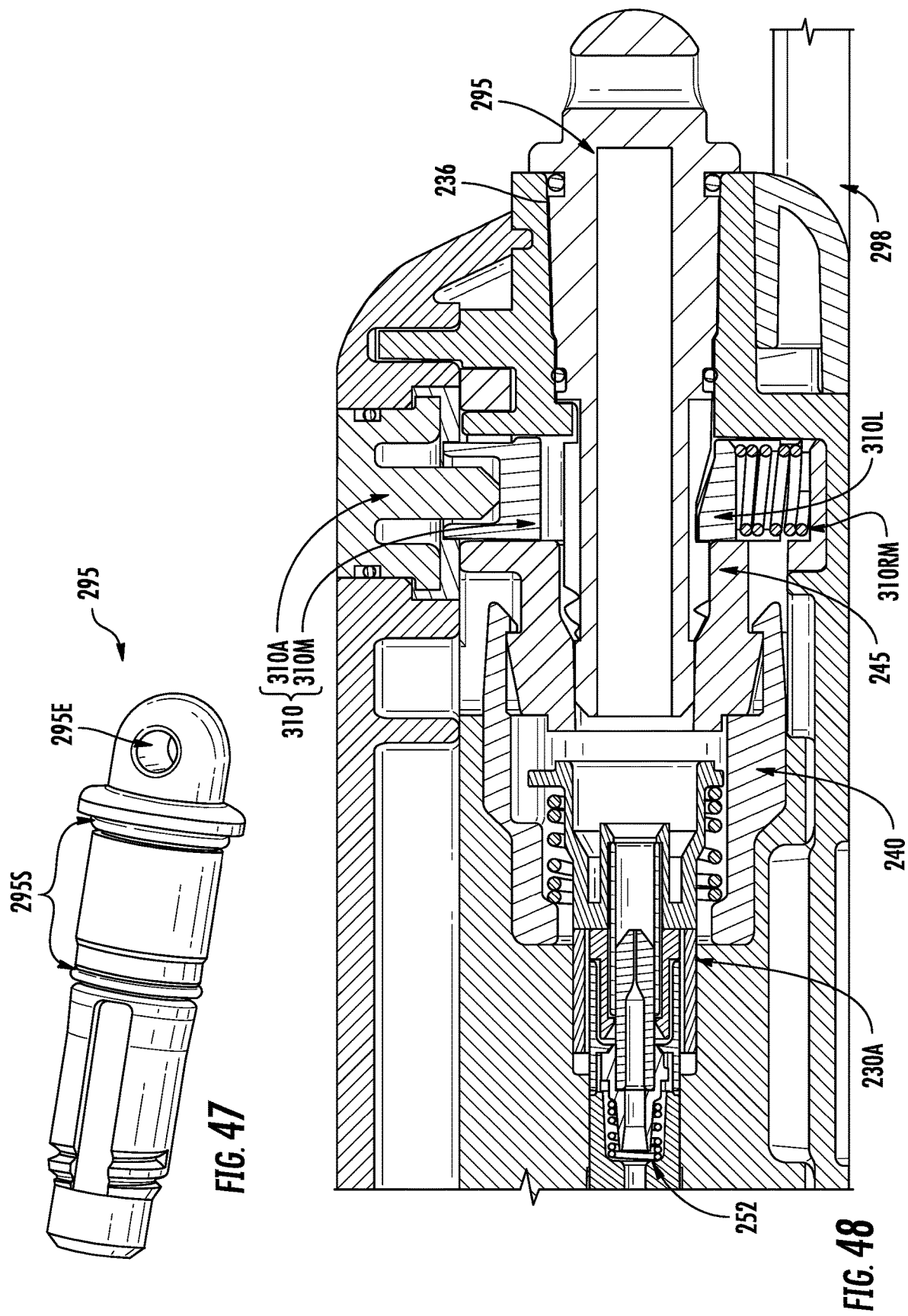

TERMINALS HAVING OPTICAL CONNECTION PORTS WITH SECURING FEATURES PROVIDING STABLE RETENTION FORCES AND METHODS OF MAKING THE SAME

PRIORITY

This application is a continuation of International Patent Application Serial No. PCT/US2020/053443 filed on Sep. 30, 2020, which claims the benefit of priority to U.S. Provisional Application Ser. No. 62/923,245 filed on Oct. 18, 2019, both applications being incorporated by reference.

FIELD

The disclosure is directed to devices providing at least one optical connection port along with methods for making the same. More specifically, the disclosure is directed to devices such as terminals comprising a connection port and a securing feature associated with the connection port for securing an optical connector with a stable retention force along with methods of making the same.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communication networks the need for making robust optical connections in outdoor applications in a quick and easy manner was apparent. To address this need for making quick, reliable, and robust optical connections in communication networks hardened fiber optic connectors such as the OptiTap® plug connector were developed.

Multiports were also developed for making an optical connections with hardened connectors such as the OptiTap. Prior art multiports have a plurality of receptacles mounted through a wall of the housing for protecting an indoor connector inside the housing that makes an optical connection to the external hardened connector of the branch or drop cable.

Illustratively, FIG. 1 shows a conventional fiber optic multiport 1 having an input fiber optic cable 4 carrying one or more optical fibers to indoor-type connectors inside a housing 3. The multiport 1 receives the optical fibers into housing 3 and distributes the optical fibers to receptacles 7 for connection with a hardened connector. The receptacles 7 are separate assemblies attached through a wall of housing 3 of the multiport 1. The receptacles 7 allow mating with hardened connectors attached to drop or branching cables (not shown) such as drop cables for "fiber-to-the-home" applications. During use, optical signals pass through the branch cables, to and from the fiber optic cable 4 by way of the optical connections at the receptacles 7 of multiport 1. Fiber optic cable 4 may also be terminated with a fiber optic connector 5. Multiports 1 allowed quick and easy deployment for optical networks.

Although, the housing 3 of the prior art multiport 1 is rugged and weatherable for outdoor deployments, the housings 3 of multiport 1 are relatively bulky for mounting multiple receptacles 7 for the hardened connector on the housing 3. Receptacles 7 allow an optical connection between the hardened connector such as the OptiTap male plug connector on the branch cable with a non-hardened connector such as the SC connector disposed within the housing 3, which provides a suitable transition from an outdoor space to a protected space inside the housing 3.

Receptacle 7 for the OptiTap connector is described in further detail in U.S. Pat. No. 6,579,014. As depicted in U.S. Pat. No. 6,579,014, the receptacle includes a receptacle housing and an adapter sleeve disposed therein. Thus, the receptacles for the hardened connector are large and bulky and require a great deal of surface array when arranged in an array on the housing 3 such as shown with multiport 1. Further, conventional hardened connectors use a separate threaded or bayonet coupling that requires rotation about the longitudinal axis of the connector and room for grabbing and rotating the coupling by hand when mounted in an array on the housing 3.

Consequently, the housing 3 of the multiport 1 is excessively bulky. For example, the multiport 1 may be too boxy and inflexible to effectively operate in smaller storage spaces, such as the underground pits or vaults that may already be crowded. Furthermore, having all of the receptacles 7 on the housing 3, as shown in FIG. 1, requires sufficient room for the drop or branch cables attached to the hardened connectors attached to the multiport 1. While pits can be widened and larger storage containers can be used, such solutions tend to be costly and time-consuming. Network operators may desire other deployment applications for multiports 1 such as aerial, in a pedestal or mounted on a façade of a building that are not ideal for the prior art multiports 1 for numerous reasons such as congested poles or spaces or for aesthetic concerns.

Other multiports designs have been commercialized to address the drawbacks of the prior art multiports depicted in FIG. 1. By way of explanation, US 2015/0268434 discloses multiports 1' having one or more connection ports 9 positioned on the end of extensions 8 that project from the housing of the multiport 1' such as depicted in FIG. 2. Connection ports 9 of multiport 1' are configured for mating directly with a hardened connector (not shown) such as an OptiTap without the need to protect the receptacle 7 within a housing like the prior art multiport 1 of FIG. 1.

Although, these types of multiport designs such as shown in FIG. 2 and disclosed in US 2015/0268434 allow the device to have smaller footprints for the housing 3', these designs still have concerns such as the space consumed by the relatively large ports 9 and associated space requirements of optical connections between the ports and hardened connector of the drop cables along with organizational challenges. Simply stated, the ports 9 on the extensions 8 of the multiport 1' and the optical connections between ports 9 and hardened connector occupy significant space at a location a short distance away from the multiport housing 3' such as within a buried vault or disposed on a pole. In other words, a cluster of optical ports 9 of multiport 1' are bulky or occupy limited space. The conventional hardened connectors used with multiport 1' also use a separate threaded or bayonet coupling that requires rotation about the longitudinal axis of the connector along with sufficient space for grabbing and rotating the coupling means by hand. Further, there are aesthetic concerns with the prior art multiports 1' as well.

Additionally, the threaded or bayonet couplings between the external connectors and the multiport do not allow the external connectors to release from the multiports in the event of an over-stress pulling condition without damaging the cable, external connector or the multiport.

Consequently, there exists an unresolved need for devices that allow flexibility for the network operators to quickly and easily make optical connections in their optical network while also addressing concerns related to limited space, organization, aesthetics or stable retention forces for the external connector disposed within the port.

SUMMARY

The disclosure is directed to terminals comprising at least one connection port and a securing feature associated with the connection port. Terminals that may use the concepts disclosed herein include multiports, closures, wireless devices or other devices that may receive a fiber optic connector for optical connection. Methods of making the terminals are also disclosed. The terminals can have any suitable construction such as disclosed herein such as comprising a connection port that is keyed for inhibiting a non-compliant connector from being inserted and potentially causing damage to the device or not.

One aspect of the disclosure is directed to terminals comprising a shell, at least one connection port, at least one securing feature, and at least one securing feature resilient member. The at least one connection port is disposed on the terminal with the at least one connection port comprising an optical connector opening extending from an outer surface of the terminal to a cavity of the terminal and defining a connection port passageway. The at least one securing feature is disposed within the shell and associated with the connection port passageway, and at least one securing feature resilient member for biasing a portion of the at least one securing feature, wherein the at least one securing feature resilient member comprises a pre-load restoring force between 5 pounds force and 12 pounds force.

Another aspect of the disclosure is directed to terminals comprising a shell, at least one connection port, at least one modular adapter sub-assembly disposed within the shell, at least one securing feature, and at least one securing feature resilient member for biasing a portion of the at least one securing feature. The at least one connection port comprising an optical connector opening extending from an outer surface of the terminal to a cavity of the terminal and defining a connection port passageway. The at least one securing feature is associated with the connection port passageway, and the at least one securing feature comprising a bore with a locking feature. The locking feature projects form the bore with a locking feature height between 3-8 millimeters.

Still another aspect of the disclosure is directed to terminals comprising a shell, at least one connection port, at least one modular adapter sub-assembly disposed within the shell, and at least one securing feature. The at least one connection port comprising an optical connector opening extending from an outer surface of the terminal to a cavity of the terminal and defining a connection port passageway. The at least one securing feature capable of translating being associated with the connection port passageway, where a portion of the at least one securing feature is part of the modular adapter sub-assembly. The securing feature comprising a bore with a locking feature disposed within the bore, wherein the locking feature projects from the bore with a locking feature height between 3-8 millimeters.

Yet another aspect of the disclosure is directed to terminals comprising a shell, at least one connection port, modular adapter sub-assembly disposed within the shell, at least one securing feature, and at least one securing feature resilient member for biasing a portion of the at least one securing feature. The at least one connection port comprising an optical connector opening extending from an outer surface of the terminal to a cavity of the terminal and defining a connection port passageway. The at least one securing feature capable of translating being associated with the connection port passageway, and a portion of the at least one securing feature comprises a bore. The at least one securing feature resilient member comprises a pre-load restoring force between 5 pounds force and 12 pounds force.

A further aspect of the disclosure is directed to terminals comprising a shell, at least one connection port, at least one modular adapter sub-assembly disposed within the shell, at least one securing feature, and at least one securing feature resilient member for biasing a portion of the at least one securing feature. The at least one connection port comprising an optical connector opening extending from an outer surface of the terminal to a cavity of the terminal and defining a connection port passageway. The at least one securing feature capable of translating being associated with the connection port passageway, and a portion of the at least one securing feature comprises a bore with a locking feature disposed within the bore. The locking feature projects from the bore with a height between 3-8 millimeters and the at least one securing feature resilient member comprises a pre-load restoring force between 5 pounds force and 12 pounds force. The at least one securing feature translates from a retain position to an open position as a suitable fiber optic connector is inserted into the at least one connection port.

A further aspect of the disclosure is directed to terminals comprising a shell, at least one connection port, at least one modular adapter sub-assembly disposed within the shell, at least one securing feature, and at least one securing feature resilient member for biasing a portion of the at least one securing feature. The at least one connection port comprising an optical connector opening extending from an outer surface of the terminal to a cavity of the terminal and defining a connection port passageway. The at least one securing feature capable of translating being associated with the connection port passageway, and a portion of the at least one securing feature comprises a bore with a locking feature disposed within the bore. The locking feature projects from the bore with a height between 3-8 millimeters and the at least one securing feature resilient member comprises a pre-load restoring force between 6 pounds force and 10 pounds force. The at least one securing feature translates from a retain position to an open position as a suitable fiber optic connector is inserted into the at least one connection port.

Still another aspect of the disclosure is directed to terminals comprising a shell, at least one connection port, at least one modular adapter sub-assembly disposed within the shell, at least one securing feature, and at least one securing feature resilient member for biasing a portion of the at least one securing feature. The at least one connection port comprising an optical connector opening extending from an outer surface of the terminal to a cavity of the terminal and defining a connection port passageway. The at least one securing feature capable of translating being associated with the connection port passageway, and the securing feature comprises an actuator and a securing member, and the at least one securing member comprises a bore and a locking feature. The at least one securing feature resilient member comprises a pre-load restoring force between 5 pounds force and 12 pounds force. The at least one securing feature translates from a retain position to an open position as a suitable fiber optic connector is inserted into the at least one connection port.

Other aspects of the disclosure are directed to terminals comprising a shell, at least one connection port, a securing feature passageway, at least one securing feature, at least one securing feature resilient member for biasing a portion of the at least one securing feature, and at least one modular adapter sub-assembly disposed within the shell. The at least one connection port comprising an optical connector opening extending from an outer surface of the terminal to a cavity of the terminal and defining a connection port passageway. The at least one securing feature being disposed within the shell. The at least one securing feature capable of translating being associated with the connection port passageway, and the at least one securing feature comprises a securing member and an actuator, and the actuator is capable of translating within a portion of the at least one securing feature passageway. The at least one securing feature resilient member comprises a pre-load restoring force between 6 pounds force and 10 pounds force. The at least one securing feature translates from a retain position to an open position as a suitable fiber optic connector is inserted into the at least one connection port. The securing member being a part of the modular adapter sub-assembly.

A still further aspect of the disclosure is directed to a wireless device comprising a shell, at least one connection port, at least one securing feature, and at least one securing feature resilient member. The at least one connection port is disposed on the wireless device, the at least one connection port comprising an optical connector opening extending from an outer surface of the wireless device into a cavity of the wireless device and defining a connection port passageway. The at least one securing feature capable of translating being associated with the connection port passageway, and at least one securing feature resilient member for biasing a portion of the at least one securing feature. The at least one securing feature resilient member comprises a pre-load restoring force between 5 pounds force and 12 pounds force. In further embodiments, the at least one securing feature may comprises a securing member and an actuator or be formed as a single component as desired. The connection port of the wireless device may also comprise other features, structures or components as disclosed herein.

Other aspects of the disclosure are directed to methods of making the terminal or devices described herein. One method of making terminals or devices comprising an optical connection port comprises the steps of installing at least one securing feature into the device so that the at least one securing feature is associated with a respective connection port. The securing feature may translate between an open position and a retain position, and at least one securing feature resilient member is positioned for biasing a portion of the at least one securing feature to a retain position. The at least one securing feature resilient member comprises a pre-load restoring force between 5 pounds force and 12 pounds force. The methods may further comprise a locking feature on the securing feature. Any suitable locking feature may be used, and in one embodiment the locking feature comprises a ramp with a ledge.

Methods of making the terminals or devices may further comprise the securing feature translating from a retain position to an open position as a suitable fiber optic connector is inserted into the at least one connection port. Still other methods may further comprise the securing feature being capable of moving to a retain position RP automatically when a suitable fiber optic connector is fully inserted into a connector port passageway. Yet further methods may comprise translating the at least one securing feature the open position from a normally biased retain position.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

BRIEF DESCRIPTION OF THE FIGURES

FIG. 11 is an exploded view of the modular adapter sub-assembly of FIGS. 9 and 10 along with the rear connector;

FIG. 24-27 are various perspective views showing the details of the adapter body of the modular adapter sub-assembly of FIGS. 9-12;

FIGS. 47 and 48 depict views of a dust cap for the connection ports of the devices disclosed;

DETAILED DESCRIPTION

Figure 1:
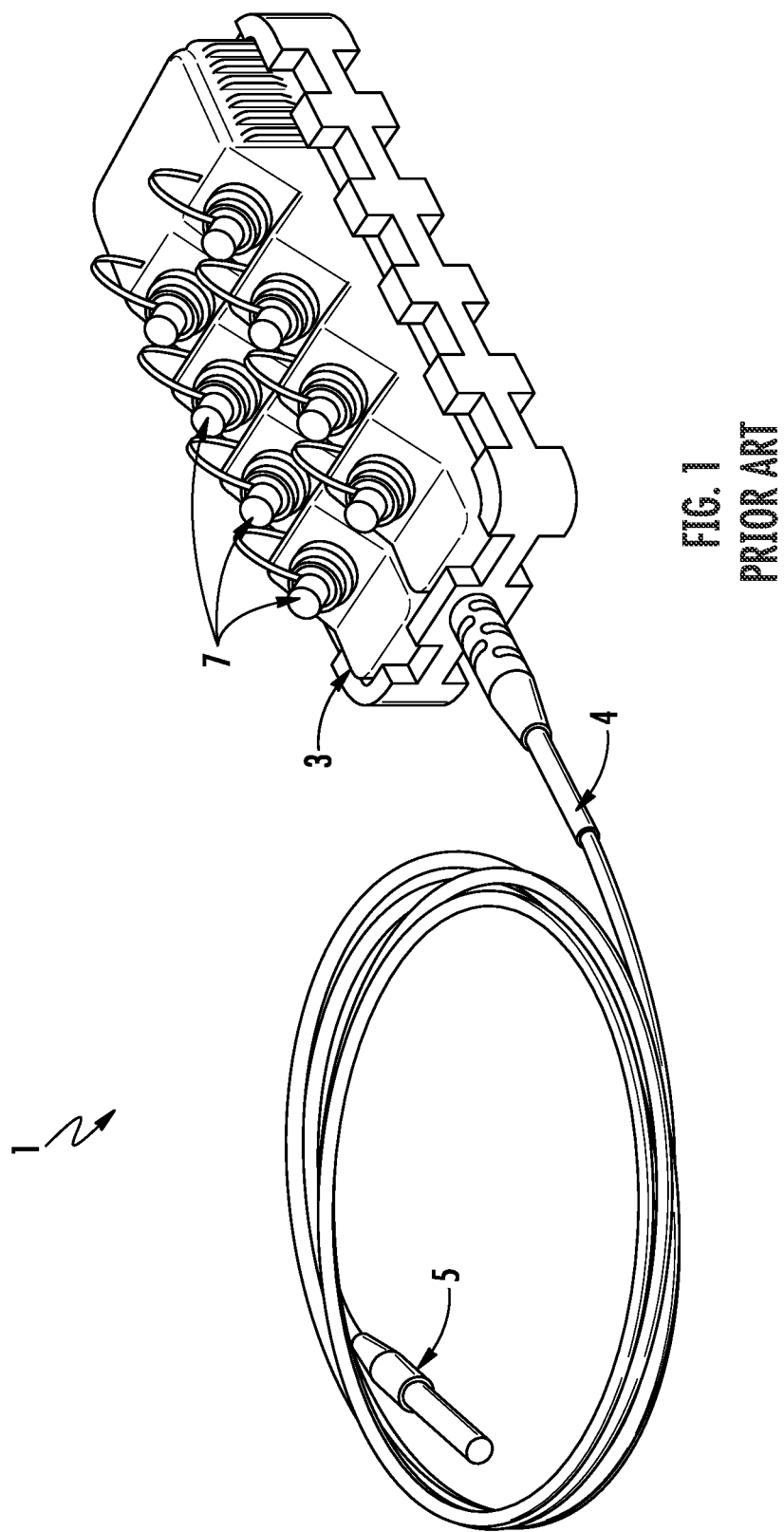
FIGS. 1 and 2 are prior art multiports.

Reference will now be made in detail to the embodiments of the disclosure, examples of which are illustrated in the accompanying drawings. Whenever possible, like reference numbers will be used to refer to like components or parts.

The concepts for the terminals or devices disclosed herein are suitable for providing at least one optical connection to the device for indoor, outdoor or other environments as desired. As used herein, the term "terminal" means any device comprising at least one connection port for receiving an external fiber optic connector. Generally speaking, the terminals disclosed and explained in the exemplary embodiments are multiports, but the concepts disclosed may be used with any suitable device as appropriate. As used herein, the term "multiport" means any device comprising one or more connection ports for making an optical connection and a securing feature associated with the at least one connection port. As known in the art, a connection port receives a connector. By way of example, the terminal may be any suitable device having at least one optical connection such as a passive device like an optical closure (hereinafter "closure") or an active device such as a wireless device having electronics for transmitting or receiving a signal. Although the concepts are disclosed with respect to terminals the concepts disclosed may be used with devices having a securing feature or a securing member such as an insert for a terminal having a securing feature or securing member.

The concepts disclosed advantageously allow compact form-factors for devices such as terminals comprising at least one connection port and a securing feature associated with the connection port. The concepts are scalable to any suitable count of connection ports on a device in a variety of arrangements or constructions. The securing features disclosed herein for devices engage directly with a portion of connector without conventional structures like prior art devices that require the turning of a coupling nut, bayonet or the like. As used herein, "securing feature" excludes threads and features that cooperate with bayonets on a connector. The securing feature is also disposed within the shell as depicted. Thus, the terminals disclosed may allow connection ports to be closely spaced together and may result in small devices since the room needed for turning a threaded coupling nut or bayonet is not necessary. The compact form-factors may allow the placement of the devices in tight spaces in indoor, outdoor, buried, aerial, industrial or other applications while providing at least one connection port that is advantageous for a robust and reliable optical connection in a removable and replaceable manner. The disclosed terminals may also be aesthetically pleasing and provide organization for the optical connections in manner that the prior art devices cannot provide.

Moreover, the concepts disclosed for terminals herein provide securing features with stable retention or pull-out forces for external connectors attached to the connection port(s) of the terminal. More specifically, the terminals disclosed allow the external connectors to be released (e.g., pulled-out) from the respective connection port, thereby inhibiting damage to the securing device or the external connector. By way of explanation, the external connector disposed in the connection port of the terminal may be released upon a predetermined pulling force being applied to the cable assembly having the external connector. For instance, if an unexpected pulling event of fifty pounds or more is applied to the cable assembly having the external connector, then the external connector is released from the connection port of the terminal for inhibiting damage to the terminal or the cable assembly having the external connector. Moreover, the securing feature of the terminal may be designed so that in the event of a second unexpected pulling event occurs, then the force required for releasing the external connector is within 20 percent of the designed release force for the external connector. Of course, the concepts disclosed may be used to design to any desired connector release force as appropriate such as having a release force of 75 pounds or more or even 100 pounds or more.

Several different factors may contribute to providing a designed release force for an external fiber optic connector received in the connection port of the terminals disclosed. By way of explanation, a first factor is pre-load restoring force applied by a resilient member biasing the securing feature of the connection port of the terminal to retain position. A second factor for the designed release force is a height of a locking feature disposed within a bore of the securing feature for the connection port that interacts with a locking feature on a housing of a suitable connector. A third factor for the designed release force is the angle of a ledge of the locking feature disposed on the securing feature for the connection port. Other factors may also contribute to the designed release force for the connection port such as materials or the like. These factors for the designed release force for the connection port of the terminal may be used independently or in combination as desired.

Besides being several contributing factors there are other factors that may influence the range of pull-out results for the external fiber optic connector so that results for similarly constructed parts could yield very different results when tested. For instance, a user could get oils from their skin on a locking feature of the connector, which could radically change the coefficient of friction between materials and thereby change pull-out results. Likewise, moisture could be present on a connector that could change pull-out results. Thus, when testing the pull-out forces for external connectors disposed in connection port of terminals the parts should be clean and dry and the pull-out force should be applied inline with the connection port and measured using a suitable scale with a smoothly applied force, and outlier results of pull-out performance should be disregarded. Moreover, the pull-out forces should only be measured two or three times for each connection port to avoid wear issues that may influence test results (e.g., an initial pull-out force and then a second and third pull-out force for gauging repeatability within the desired range). However, generally speaking, the concepts disclosed may produce relatively consistent results for pull-out forces for the external fiber optic connector using predetermined features as disclosed.

The terminals disclosed are simple and elegant in their designs. The terminals disclosed comprise at least one connection port and a securing feature associated with the connection port that is suitable for retaining an external fiber optic connector received by the connection port. The connection port may include a keying portion that cooperates with a key on a complimentary external fiber optic connector to inhibit damage to the connection port by inhibiting the insertion of a non-compliant connector. The keying portion may also aid the user during blind insertion of the external connector into the connection port of the device to determine the correct rotational orientation with respect to the connection port when a line of sight is not possible or practical for alignment.

Unlike prior art multiports, the concepts disclosed advantageously allow the quick and easy connection and retention by inserting the fiber optic connectors directly into the connection port of the device without the need or space considerations for turning a threaded coupling nut or bayonet for retaining the external fiber optic connector. Generally speaking, the securing features disclosed for use with terminals herein may comprise one or more components with at least one component translating for releasing or securing the external fiber optic connector to the terminal. As used herein, the term "securing feature" excludes threaded portions or features for securing a bayonet disposed on a connector.

Since the connector footprint used with the devices disclosed does not require the bulkiness of a coupling nut or bayonet, the fiber optic connectors used with the devices disclosed herein may be significantly smaller than conventional connectors used with prior art multiports. Moreover, the present concepts for connection ports on terminals allows an increased density of connection ports per volume of the shell or increased port width density since there is no need for accessing and turning the coupling nut or bayonets by hand for securing a fiber optic connector like the prior art multiports.

The terminals disclosed comprise a securing feature for directly engaging with a suitable portion of a connector housing of the external fiber optic connector or the like for securing an optical connection with the connection port of the terminal. Different variations of the concepts are discussed in further detail below. The structure for securing the fiber optic connectors in the terminals disclosed allows much smaller footprints for both the terminals and the fiber optic connectors along with a quick-connect feature. Terminals may also have a dense spacing of connection ports if desired. The terminals disclosed advantageously allow a relatively dense and organized array of connection ports in a relatively small form-factor while still being rugged for demanding environments. As optical networks increase densifications and space is at a premium, the robust and small-form factors for terminals such as multiports, closures and wireless devices disclosed herein becomes increasingly desirable for network operators.

The concepts disclosed herein are suitable for optical distribution networks such as for Fiber-to-the-Home and 5G applications but are equally applicable to other optical applications as well including indoor, automotive, industrial, wireless, or other suitable applications. Additionally, the concepts disclosed may be used with any suitable fiber optic connector footprint that cooperates with the securing feature of the terminal. Various designs, constructions, or features for terminals are disclosed in more detail as discussed herein and may be modified or varied as desired.

The terminals disclosed may locate the at least one connection port 236 in different portions or components of the device as desired using the disclosed concepts. The concepts are shown and described with a device 200 having 4-connection ports that are optically connected to an input port arranged in an array on one end of the device, but other configuration are possible such as connection ports or input ports on both ends, an express port, a pass-through port or the like. FIGS. 3-32 show the construction and features for a first explanatory terminal, and FIGS. 33-47 show the construction of a second explanatory terminal 200 similar to the first terminal 200. Although, these concepts are disclosed and described with respect to terminals configured as multiports the concepts may be used with any other suitable devices such as wireless devices (FIG. 49), closures (FIG. 50) or other suitable devices.

Figure 3:
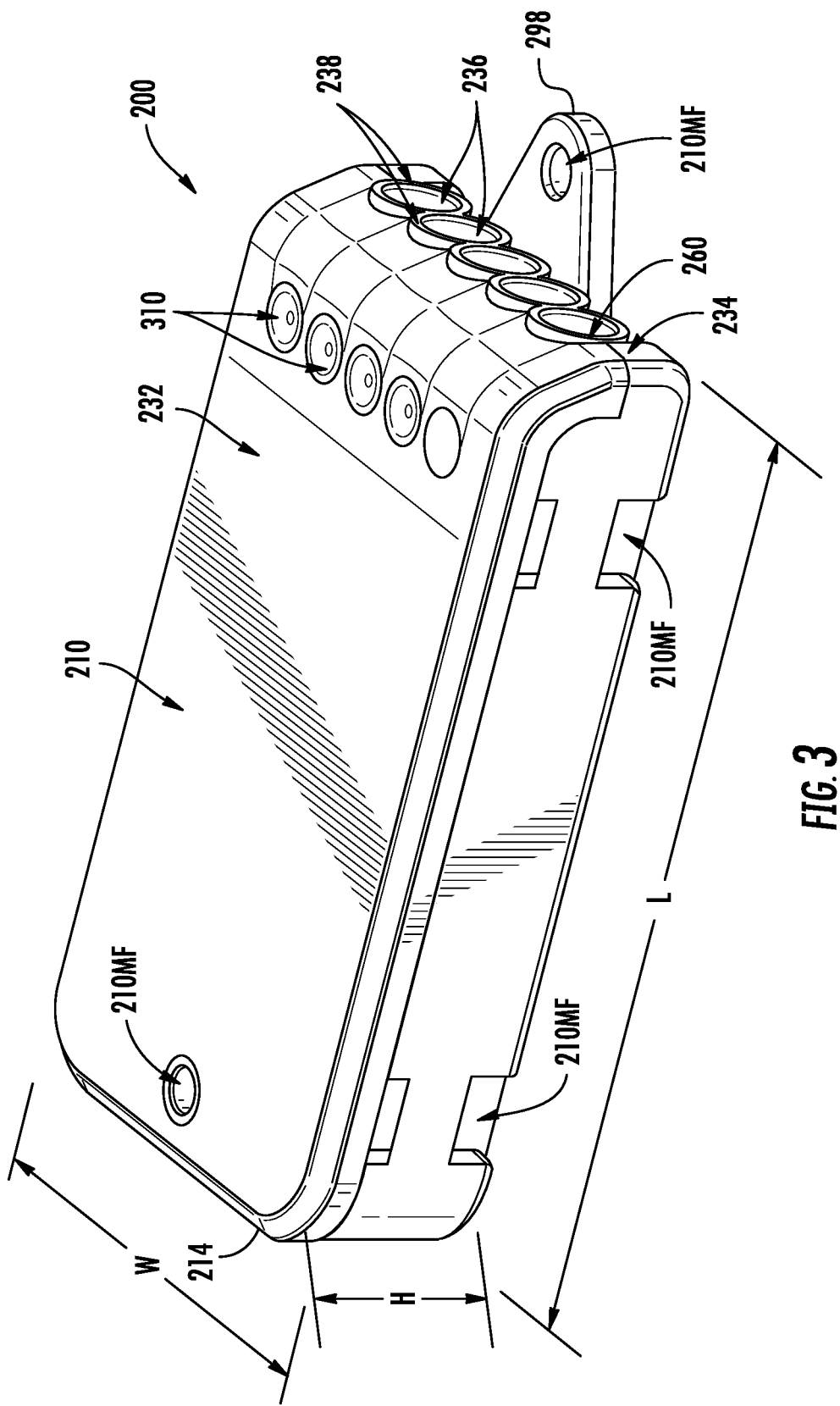
FIGS. 3 and 4 respectively are top and bottom perspectives view of an assembled device such as an explanatory terminal comprising at least one connection port defined by a respective optical connector opening disposed in the shell of the terminal along with a securing feature associated with the connection port passageway and disposed within the shell.
Figure 4:
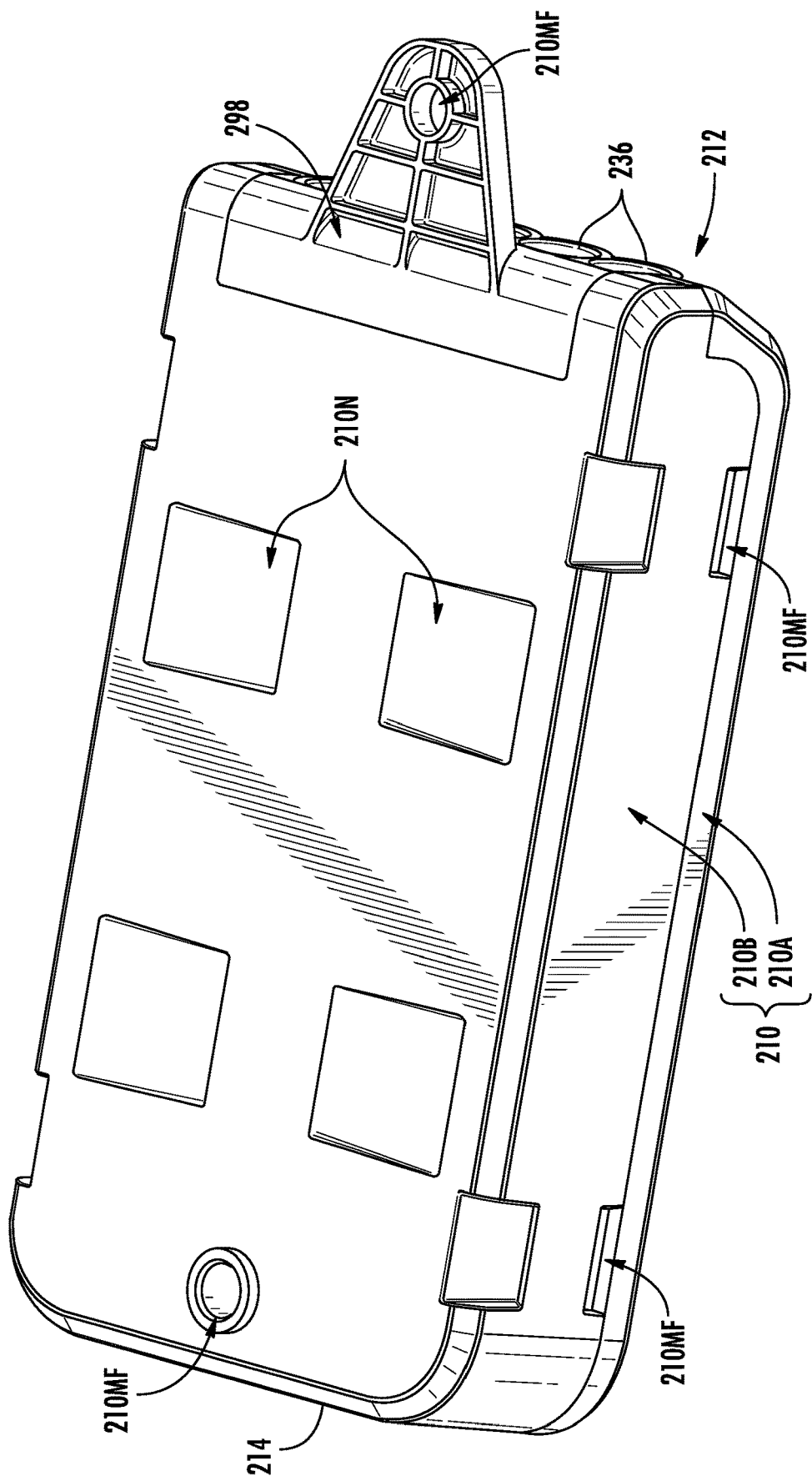

FIGS. 3 and 4 respectively depict top and bottom perspective views of the first explanatory terminal 200 comprising at least one connection port 236. Generally speaking, devices such as terminal 200 comprise a shell 210 comprising a body 232 and one or more connection ports 236 disposed on a first end or portion 212 of terminal 200. The connection ports 236 or input port 260 are configured for receiving and retaining suitable external fiber optic connectors 10 (FIG. 39) for making optical connections with the terminal 200.

Connection ports 236 each comprises a respective optical connector opening 238 extending from an outer surface 234 of the terminal 200 into a cavity 216 of the terminal 200 and defining a portion of a connection port passageway 233. By way of explanation, at least one connection port 236 is molded as a portion of shell 210. At least one securing feature 310 is associated with the connection port passageway 233 for cooperating with the external fiber optic connector 10. The securing feature 310 may translate for releasing or securing the external fiber optic connector 10. Terminal 200 of FIGS. 3 and 4 also comprises an input port 260 that is similar to the connection ports 236. As shown, the connection ports 236 or input port 260 may comprise a marking indicia such as an embossed number or text, but other marking indicia are also possible. For instance, the marking indicia may be on the securing feature 310 such as text or the securing features may be color-coded to indicate fiber count, input or output for the associated connection port or input port.

The concepts disclosed use a securing feature resilient member 310RM for biasing a portion of the securing feature 310 as discussed herein. Terminals 200 disclosed use one or more modular adapter sub-assemblies 310SA (FIGS. 9-12) disposed within a shell for a scalable form-factor for manufacturing similar devices with different port counts. The selection of pre-load restoring force PRF for the securing feature resilient member 310RM may provide a stable retention force for external connectors attached to the connection port(s) of the terminal. A predetermined range for the pre-load restoring force for the securing feature resilient member 310RM in the retain position allows the external connectors to be released from the respective connection port when a predetermined pulling force is applied to the cable assembly having the external connector, thereby inhibiting damage to the securing device or the external connector. As used herein, "a predetermined pulling force" means the pulling force PF applied ±20 percent. Even though a securing feature of the terminal is designed for a predetermined pulling force release the result may vary due to tolerances or other factors in design or the environment such as angle of pull, application of force, etc. By way of example, the pre-load restoring force range for the securing feature resilient member 310RM in the retain position is between 5 pounds and 12 pounds. Other pre-load restoring force ranges are possible for the securing feature resilient member 310RM in the retain position such as between 6 pounds and 10 pounds.

The shell comprises one or more connection ports and device comprises one or more respective securing features 310 cooperating with the connection ports for providing quick and easy optical connectivity with a robust and reliable design that is intuitive to use.

Optical connections to the devices are made by inserting one or more suitable external fiber optic connectors into respective connection port passageways 233 as desired. Specifically, the connection port passageway 233 is configured for receiving a suitable external fiber optic connector (hereinafter connector) of a fiber optic cable assembly (hereinafter cable assembly). Connection port passageway 233 is associated with a securing feature 310 for retaining (e.g., securing) the connector in the terminal 200 for making an optical connection. The securing feature 310 advantageously allows the user to make a quick and easy optical connection at the connection port 236 of terminal 200. The securing feature 310 may also operate for providing a connector release feature when actuated.

Specifically, the connector may be retained within the respective connection port 236 of the device by pushing and fully seating the connector within the connection port 236. To release the connector from the respective connection port 236, the securing feature 310 is actuated by pushing inward and releasing the securing feature 310 from the locking feature 20L on the external connector housing 20 (FIG. 39) and allowing the connector to be removed from the connection port 236. Stated another way, the at least one securing feature 310 is capable of releasing the connector when a portion of the securing feature 310 translates within a portion of a securing feature passageway 245. The full insertion and automatic retention of the connector may advantageously allow one-handed installation of the connector by merely pushing the connector into the connection port 236. The devices disclosed accomplish this connector retention feature upon full insertion by biasing the securing feature to a retain position. However, other modes of operation for retaining and releasing the connector are possible according to the concepts disclosed. For instance, the securing feature 310 may be designed to require actuation for inserting the connector; however, this may require a two-handed operation.

Securing feature 310 may be designed for holding a minimum pull-out force for the connector (e.g., retention force). In some embodiments, the pull-out force may be selected to release the connector before damage is done to the device or the connector. By way of example, the securing feature 310 associated with the connection port 236 may require a pull-out force of about 50 pounds (about 220 N) before the connector would release. Likewise, the securing feature 310 may provide a side pull-out force for connector for inhibiting damage as well. By way of example, the securing feature 310 associated with the connection port 236 may provide a side pull-out force of about 25 pounds (about 110 N) before the connector would release. Of course, other pull-out forces such as 75 pounds (about 330 N) or 100 (about 440 N) pounds are possible along with other side pull-out forces. Further, the pull-out force may be designed to be relatively stable so that the second force required for releasing the external connector is within 20 percent of the designed pull-out force for the external connector. By way of example, the first pull-out force may require about 50 pounds or more to release the connector from the connection port of the terminal and the second pull-out force may require 40 pounds or more to release the connector from the connection port of the terminal. However, other pull-out forces for the external fiber optic connector from the connector port may be possible.

FIGS. 3 and 4 depict that shell 210 is formed by a first portion 210A and a second portion 210B, but other constructions are possible for shell 210 using the concept disclosed. Terminal 200 or devices may comprise mounting features that are integrally formed in the shell 210 or that are separate components attached to shell 210 for mounting the device as depicted in FIGS. 3 and 4. By way of example, shell 210 depicts mounting features 210MF disposed near first and second ends 212, 214 of shell 210. Mounting feature 210MF adjacent the first end 212 of terminal 200 is a mounting tab 298 attached to shell 210, and the mounting feature 210MF adjacent the second end 214 is a through hole with a support 210S. Details of mounting tab will be discussed in further detail with respect to FIG. 15 and, and details of support 210S will be discussed in further detail with respect to FIG. 8. However, mounting features 210MF may be disposed at any suitable location on the shell 210 or connection port insert 230. For instance, terminal 200 also depicts a plurality of mounting features 210MF integrally formed on shell 210 and configured as passageways disposed on the lateral sides. Thus, the user may simply use a fastener such as a zip-tie threaded thru these lateral passageways for mounting the terminal 200 to a wall or pole as desired. Shell 210 may also include one or more notches 210N on the bottom side for aiding in securing the device to a round pole or the like as shown in FIG. 4.

Figure 5:
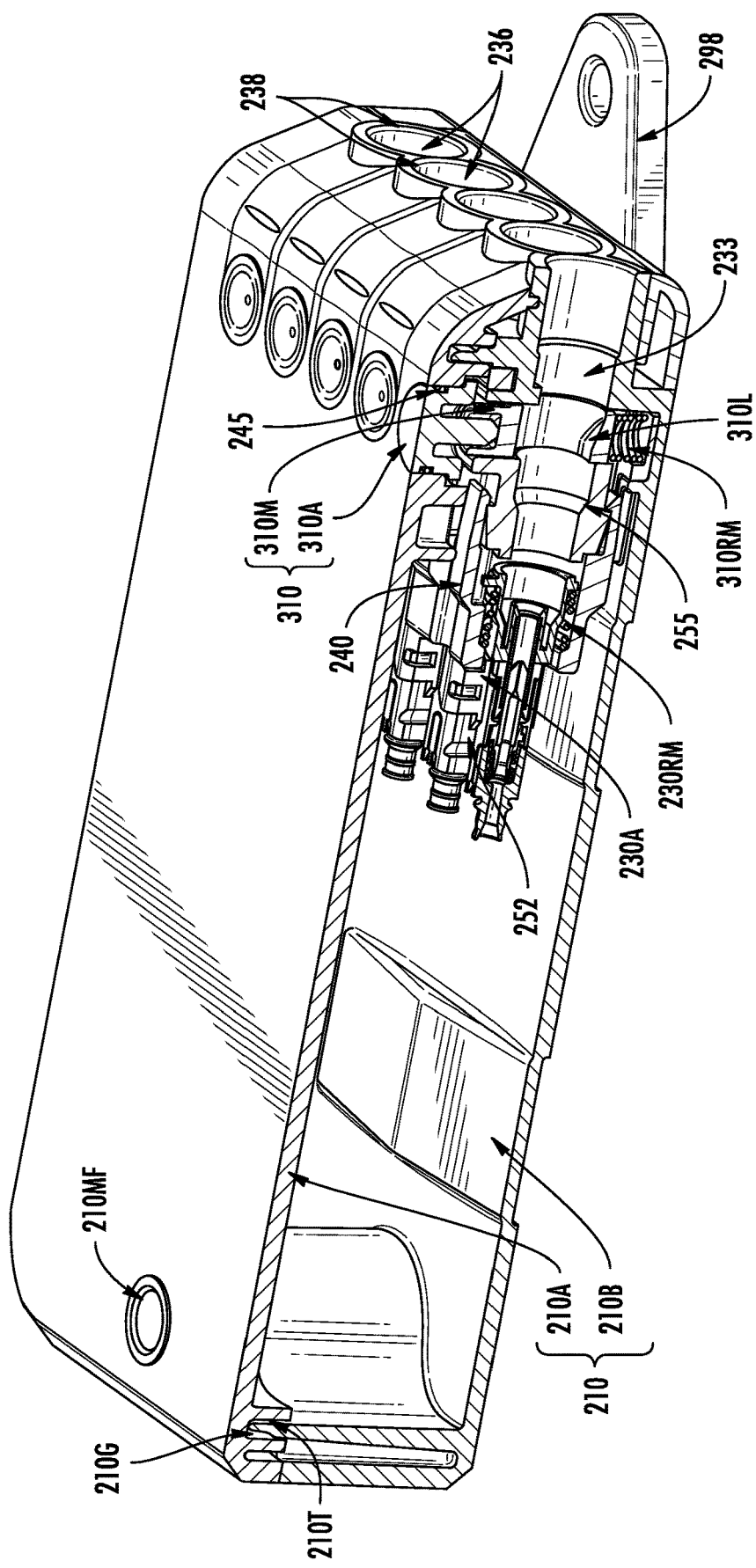
FIG. 5 depicts a longitudinal sectional view of the terminal of FIGS. 3 and 4 through the connection port for showing the internal construction of the terminal with the rear (internal) connector shown and the optical fibers removed for clarity.
Figure 6:
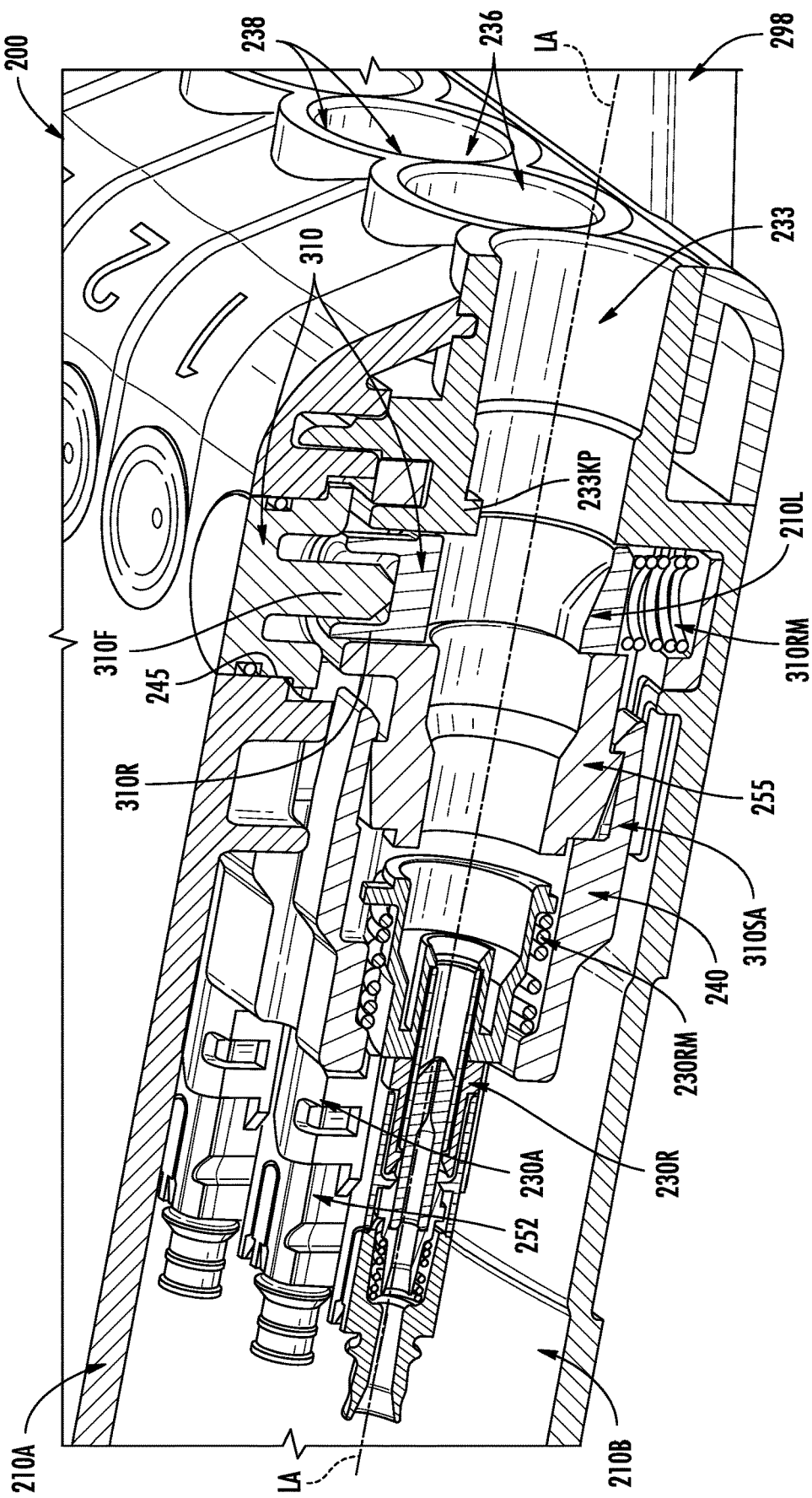
FIGS. 6 and 7 are detailed sectional views of the terminal of FIGS. 3 and 4 through the connection port for showing the internal construction of the terminal with the rear (internal) connectors shown and the optical fibers removed for clarity.
Figure 7:
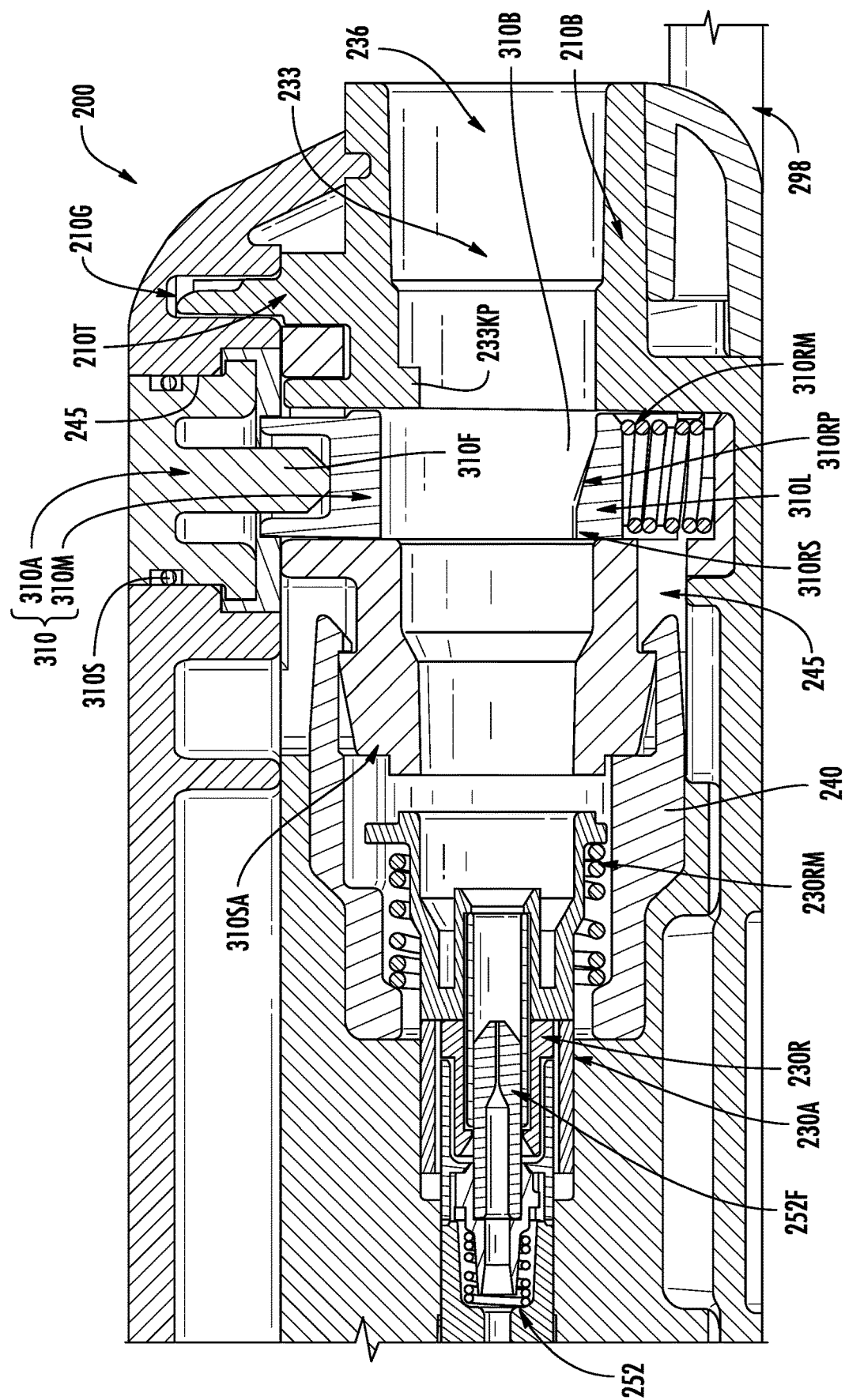
Figure 8:
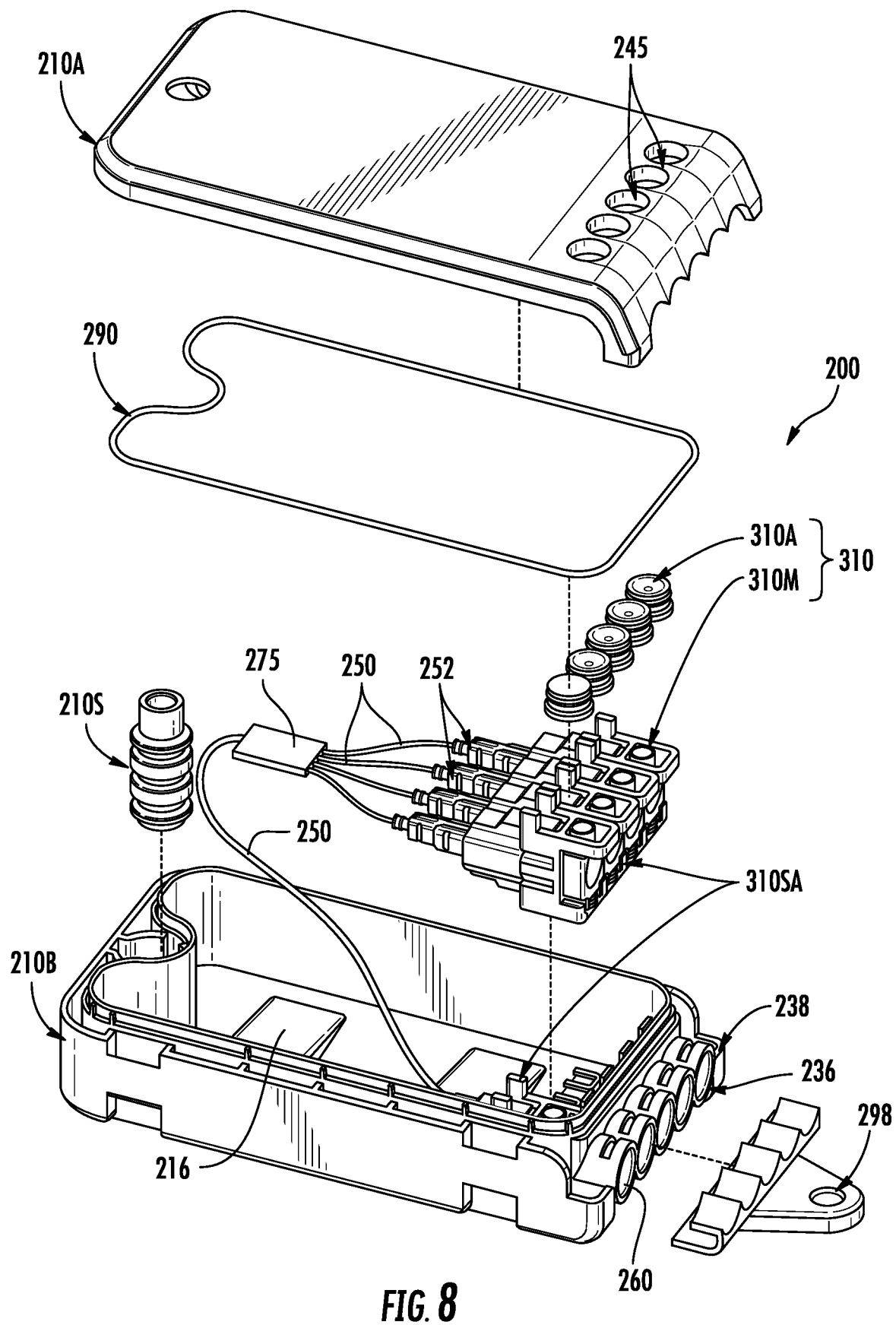
FIG. 8 is a partially exploded view of the terminal of FIGS. 3 and 4 with the optical fibers assembly comprising an optical splitter.

FIGS. 5-7 depict various cross-sections through a connection port passageway 233 showing the internal construction of terminal 200, and FIG. 8 is a partially exploded view of terminal 200 showing the optical fibers 250 that optically connect the connection ports 236 with the input port 260 inside the device. As depicted in FIG. 8, terminal 200 comprises a shell 210 comprising at least one connection port 236, and a modular adapter sub-assembly 310SA as discussed in further detail herein FIGS. 5-7 depicts the terminal 200 comprising at least one connection port 236 extending from an outer surface 234 of the terminal 200 into a cavity 216 of the terminal 200 and defining a connection port passageway 233. Terminal 200 also comprises at least one securing feature 310 associated with the connection port passageway 233. Terminal 200 also comprises at least one securing feature passageway 245 for receiving a portion of the securing feature 310. As depicted, the securing feature passageways 245 extend from the outer surface 234 of terminal 200 to cooperate with the respective connection port passageways 233 of the terminal 200. Terminal 200 also comprises a plurality of adapters 230A for receiving respective rear connectors 252 in alignment with the respective connection port 236 for making the optical connection with the external fiber optic connector.

The securing features 310 disclosed herein may take many different constructions or configurations as desired such as being formed as a single component or a plurality of components. Securing features 310 may be biased by a resilient member 230RM as discussed. Furthermore, the securing features 310 or portions of securing features 310 may be constructed as a portion of a modular adapter sub-assemblies 310SA such as shown in FIGS. 9-12 for easy assembly of the terminal 200. Moreover, the modular sub-assemblies 230SA advantageously allow the mating components for each connection port 236 to move or "float" independently of other mating components relative to the shell 210 for the other connection ports for preserving optical performance. "Float" means that the adapter 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

Generally speaking, the devices disclosed comprise at least one connection port 236 defined by an optical connector opening 238 extending into a cavity 216 of the device 200, 500, 700 along with a securing feature 310 associated with the connection port 236.

As best shown in FIGS. 6 and 7, securing feature 310 is biased to a retain position. Specifically, the securing feature 310 is biased in an upward direction using a securing feature resilient member 310RM. More specifically, securing feature resilient member 310RM is disposed beneath securing feature 310 for biasing to a normally retain position for the securing feature 310 where the locking feature 310L is disposed in the connection port passageway 233.

As best depicted in FIGS. 6 and 7, a portion of actuator 310A is disposed within a portion of the securing feature passageway 245 and cooperates with the securing member 310M of the respective securing feature. Consequently, a portion of securing feature 310 (i.e., the actuator 310A) is capable of translating within a portion of the securing feature passageway 245. Actuator 310A comprises a finger 310F for seating within a rim 310R of securing member 310M for transferring forces to the same. As depicted, a sealing feature 310S is disposed on the securing feature 310. Sealing feature 310S provides a seal between a portion of the securing feature 310 and the securing feature passageway 245 to inhibit dirt, dust and debris from entering the device. As shown, the sealing feature 310S is disposed within a groove of actuator 310A.

In this embodiment, the securing feature 310 comprises a bore 310B that is aligned with the least one connection port passageway 233 when assembled as best shown in FIG. 7. Bore 310B is sized for receiving a suitable connector therethrough for securing the same for optical connectivity. Bores or openings through the securing feature 310 may have any suitable shape or geometry for cooperating with its respective connector. As used herein, the bore may have any suitable shape desired including features on the surface of the bore for engaging with a connector. Bore 310B is disposed on the securing member 310M in this embodiment. The design of the securing feature 310 and in particular the geometry of the locking feature 310L may influence the pull-out force needed to release the external connector from the connection port 236 of terminal 200.

In some embodiments, a portion of the securing feature 310 is capable of moving to an open position when inserting a suitable connector 10 into the connection port passageway 233. When the connector 10 is fully inserted into the connector port passageway 233, the securing feature 310 such as the securing member 310M is capable of moving to the retain position automatically. Consequently, the connector 10 is secured within the connection port 236 by securing feature 310 without turning a coupling nut or a bayonet like the prior art terminals. Stated another way, the securing feature 310 translates from the retain position to an open position as a suitable connector 10 is inserted into the connection port 236. The securing feature passageway 245 is arranged transversely to a longitudinal axis LA of the terminal 200, but other arrangements are possible. Other securing features may operate in a similar manner but use an opening instead of a bore that receives the connector therethrough.

Figure 39:
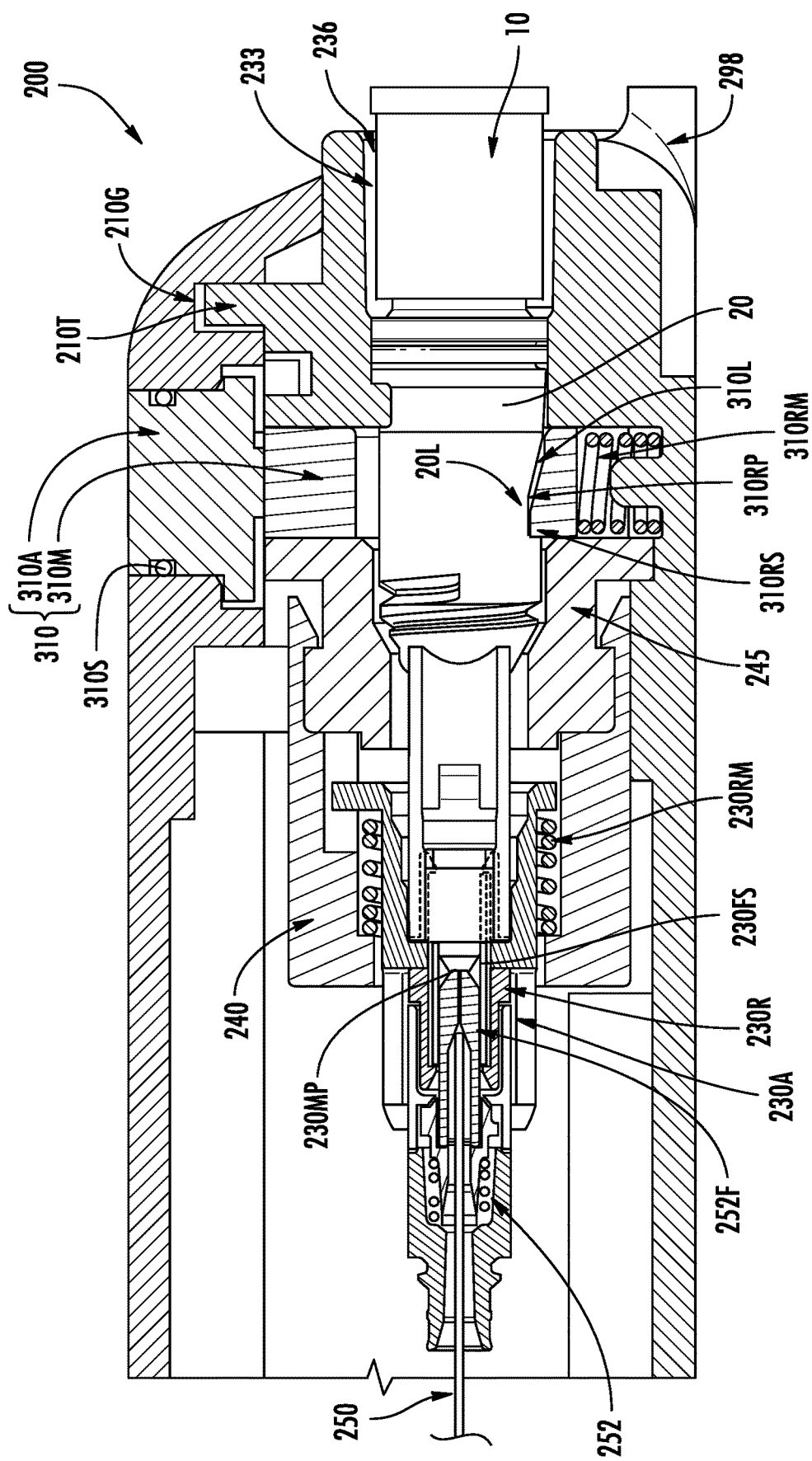
FIG. 39 is a detailed sectional view of the terminal of FIG. 33 through the connection port for showing the internal construction of the terminal with a fiber optic connector retained using the securing feature.

FIGS. 6 and 7 depict securing feature 310 comprising a locking feature 310L. Locking feature 310L cooperates with a portion of the connector 10 when it is fully inserted into the connection port 236 for securing the same. As best shown in FIG. 39, the connector housing 20 of connector 10 may have a cooperating geometry that engages the locking feature 310L of securing feature 310. In this embodiment, locking feature 310L comprises a ramp 310RP. The ramp is integrally formed at a portion of the bore 310B with the ramp angling up when looking into the connection port 236. The ramp allows the connector to push and translate the securing feature 310 downward against the securing feature resilient member 310RM as the connector is inserted in the connection port 236 as shown. Ramp may have any suitable geometry. Once the locking feature 310L of the securing feature 310 is aligned with the cooperating geometry of the locking feature 20L of connector, then a portion of the securing feature 310 translates so that the locking feature 310L engages the locking feature of connector.

Figure 7C:
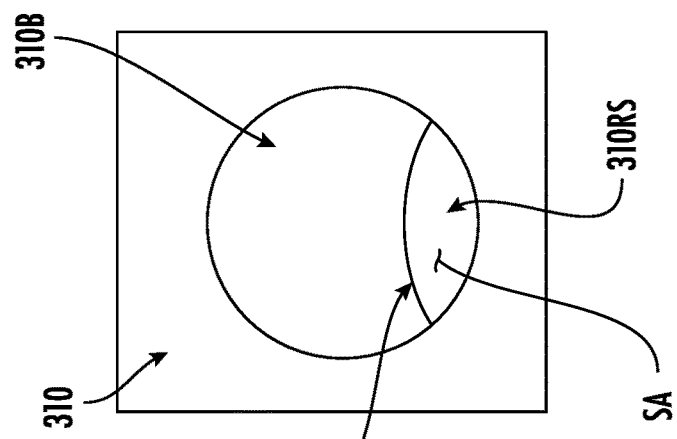
FIG. 7C schematically depicts a portion of the securing feature depicting a surface area of the locking feature that may engage with the external connector.
Figure 7B:
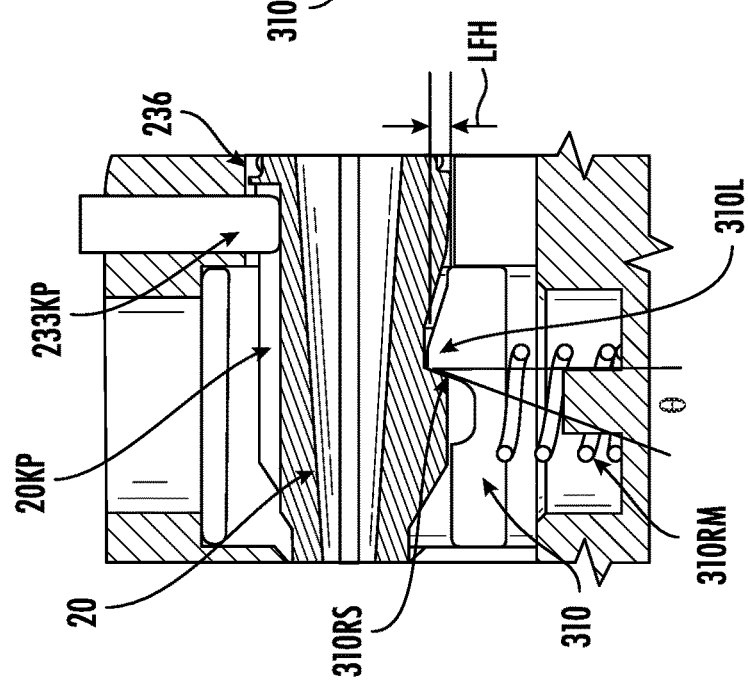
FIG. 7B a partial sectional view of a fiber optic connector secured in the connection port of the terminal showing the locking feature projecting from its bore with a predetermined height.
Figure 7A:
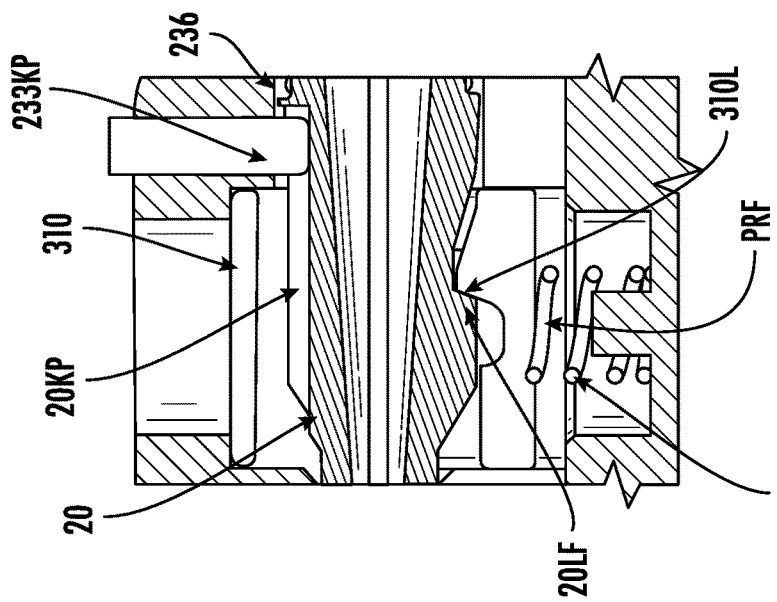
FIG. 7A depicts a partial sectional view of a fiber optic connector secured in the connection port of the terminal with the locking feature of the terminal biased to a retain position by a resilient member that provides a pre-load restoring force.

As discussed, there are several factors that may influence the pull-out force needed to release (e.g., pull-out) an external connector from the connection port 236 of terminal 200. FIGS. 7A-7C depict further details of the securing feature 310 of terminals 200 that may factor into tailoring the desired range of pull-out forces for the connection ports 236. FIGS. 7A and 7B depict a partial sectional view of an external fiber optic connector 20 secured in the connection port 236 of the terminal 200 using securing feature 310 and FIG. 7C schematically depicts a portion of the securing feature 310 looking into a bore 310B (from inside the cavity of the terminal) and depicting a surface area (SA) of the locking feature 310L that may engage with the external connector.

As depicted in FIGS. 7A and 7B, fiber optic connector 20 may comprise a locking feature 20L that cooperates with the securing feature locking feature 310LF for holding the connector 20 in connection port 236. This cooperation of these geometries along with the securing feature resilient member 310RM are factors that influence the pulling force required for releasing the connector 20 from the connection port 236 for inhibiting damage to the connection port. The connector 20 may also comprise a keying portion 20KP such as a female key that cooperates with a connection port keying feature 233KP for orientating the connector 20 in the port. The connection port keying feature 233KP may be disposed about 180 degrees (e.g. the opposite side of the port) from the locking feature 310LF on the securing feature 310 or securing member 310M.

FIG. 7A depicts a pre-load restoring force (PRF) applied to the securing feature 310 by the securing feature resilient member 310RM as represented by the arrow. By way of example, the securing feature resilient member 310RM may be a coil spring that applies the pre-load restoring force to the securing feature 310 such as applying the force to the securing member 310M. The pre-load restoring force (PRF) is the force applied by the resilient member 310RM to bias the securing feature 310 to the retain position (RP) without the connector in the connection port. The pre-load restoring force (PRF) may be calculated by multiplying the spring rate K (e.g., the spring constant) for the resilient member by the compression of the resilient member.

By way of example, the securing feature resilient member 310RM may comprise a pre-load restoring force that is greater than 5 pounds force. The securing feature resilient member 310RM may comprise a pre-load restoring force that is greater than 6 pounds force. Other pre-load restoring forces for the securing feature resilient member 310RM may be in the range between 5 pounds force and 12 pounds force, or in the range between 6 pounds and 10 pounds force. Other pre-load restoring forces may also be possible.

The securing feature resilient member 310RM may have any suitable spring rate (e.g. the spring constant). By way of example, the spring rate may be in the range of 60 lbf/inch to 100 lbf/inch, in the range of 70 lbf/inch to 90 lbf/inch, or in the range of 75 lbf/inch to 85 lbf/inch. In one example, the securing feature resilient member 310RM has a spring rate of about 79 lbf/inch. Thus, if the securing feature resilient member 310RM has a compression in the range of about 0.063 inches to about 0.152 inches, then the pre-load restoring force is in the range of about 5 pounds force to about 12 pounds force.

FIG. 7B depicts the locking feature 310 and labels a locking feature height (LFH) and the angle θ for the retention surface 310RS. The locking feature height (LFH) of the locking feature 310L may influence the pull-out force needed to release the external connector from the connection port 236 of terminal 200. The locking feature height (LFH) is the height that the locking feature 310L projects from the round bore 310B (that receives the external connector) of the securing feature or securing member 310. For instance, the locking feature 310L projects from the bore (310B) with the locking feature height (LFH) greater than 3 millimeters. In one example, the locking feature 310L projects from the bore (310B) with the locking feature height (LFH) between 3-8 millimeters, or the locking feature height (LFH) between 4-7 millimeters. Other locking feature heights (LFH) may also be possible.

As shown, locking feature 310L comprises a retention surface 310RS. In this embodiment, the backside of the ramp of locking feature 310L forms a ledge that cooperates with complimentary geometry on the connector housing of connector. However, retention surface 310RS may have different surfaces or edges that cooperate for securing connector for creating the desired mechanical retention. For instance, the retention surface 310RS may be canted or have a vertical wall for influencing the pull-out force. More specifically, retention surface 310RS comprises an angle θ for of the ledge as labeled in FIG. 7B for influencing the pull-out force of the external connector from the connection port 236.

By way of explanation, if the retention surface 310RS has a vertical wall the angle θ is zero, and if the retention surface 310RS if canted forward toward the optical connector opening of the connection port (as shown) then the angle θ is positive. By way of explanation, the angle θ for the retention surface 310RS may be between 0 and 30 degrees depending on the pull-out force desired. Other ranges for the angle θ are possible such as between 10 and 25 degrees. A specific angle θ for the retention surface 310RS may be used as well such as 0 degrees or 20 degrees as desired. However, other geometries such as negative angles are possible for the retention surface 310RS for influencing the pull-out forces. Moreover, the features disclosed herein may influence the pull-out force for the external connector in combination so that it is possible to have a range of pull-out forces that may be reached in a variety of combinations of predetermined features such as preload restoring force and the height of the locking feature. Additionally, the connection port 236 has a sealing location at a connection port passageway sealing surface with the connector that is located closer to the optical connector opening 238 at the outer surface 234 than the securing feature 310 or locking feature 310L. In other words, connection port 236 has connection port passageway sealing surface for the O-ring of connector 20 disposed at a distance from the optical connector opening 238 and the locking feature 310L and securing feature 310 are disposed at a distance further into the connection port passageway 233 than distance where the connector sealing occurs. The O-ring of connector 20 may also provide a friction force that needs to be overcome for the pull-out force of connector 20.

FIG. 7C is a schematic representation of the securing feature 310 showing the bore 310B for receiving the external connector along with the locking feature 310L that projects from the bore. The locking feature 310L may provide a locking feature surface area (SA) as represented by the area bounded in FIG. 7C that may engage with the connector locking feature 20LF for influencing the pull-out force of the connector. The locking feature surface area (SA) is a function of the locking feature heights (LFH). The friction force between the connector 20 and the securing member locking feature 310L is a function of the surface area (SA). The locking feature surface area (SA) may be greater than 3 square millimeters, greater than 5 square millimeters, or greater than 7 square millimeters. In other embodiments, the locking feature surface area (SA) may in the range between about 3-7 square millimeters, or in the range between about 4-6 square millimeters.

The material properties of the securing feature 310 or securing member 310M may also influence the pull-out forces for fiber optic connector. A portion of the securing feature 310 or securing member 310M may be formed from any suitable material such as a polymer, a metal or like as desired. In one embodiment, a portion of the securing feature 310 or securing member 310M is formed from a polymer comprising a break strain range of 2-10 percent elongation before breaking as measured by ASTM D638, but other ranges are possible for the break strain range. In other embodiments, a portion of the securing feature 310 or securing member 310M is formed from a polymer comprising a break stress range of 70-250 MPa as measured by ASTM D638, but other suitable ranges are possible for the break stress range. As an example, a portion of the securing feature 310 or securing member 310M may be formed of Veradel® AG-320 available from Specialty Polymers of Alpharetta, Georgia, but other suitable materials are possible such as Ultem® materials.

Generally speaking, the connection port passageways 233 may be configured for the specific connector intended to be received in the connection port 236. Likewise, the connection port passageways 233 should be configured for receiving the specific rear connector 252 for mating and making an optical connection with the connector 10.

The device 200 also comprises at least one adapter 230A aligned with the respective connection port 236 or connection port passageway 233. Adapter 230A and other components are a portion of the modular sub-assembly 310SA as depicted in FIGS. 9-12. Adapter 230A is suitable for securing a rear connector 252 thereto for aligning the rear connector 252 with the connection port 236. One or more optical fibers 250 (FIG. 8) may be routed from the connection port 236 toward an input connection port 260 of the terminal 200. For instance, the rear connector 252 may terminate the optical fiber 250 for optical connection at connection port 236 and route the optical fiber 250 for optical communication with the input connection port 260.

A plurality of rear connectors 252 are aligned with the respective connector port passageways 233 within the cavity 216 of the terminal 200. The rear connectors 252 are associated with one or more of the plurality of optical fibers 250. Each of the respective rear connectors 252 aligns and attaches to a structure such as the adapter 230A or other structure related to the connection port passageway 233 in a suitable matter. The plurality of rear connectors 252 may comprise a suitable rear connector ferrule 252F as desired and rear connectors 252 may take any suitable form from a simple ferrule that attaches to a standard connector type inserted into an adapter. By way of example, rear connectors 252 may comprise a resilient member for biasing the rear connector ferrule 252F or not. Additionally, rear connectors 252 may further comprise a keying feature.

The rear connectors 252 shown in FIGS. 5-7 have a SC footprint, but other connectors are possible. If SC connectors are used as the rear connector 252, they have a keying feature 252K that cooperates with the keying feature of adapter 230A. Additionally, adapters 230A comprise a retention feature (not numbered) for seating the adapters 230A in the device adjacent to the connection port passageway 233.

Figure 15:
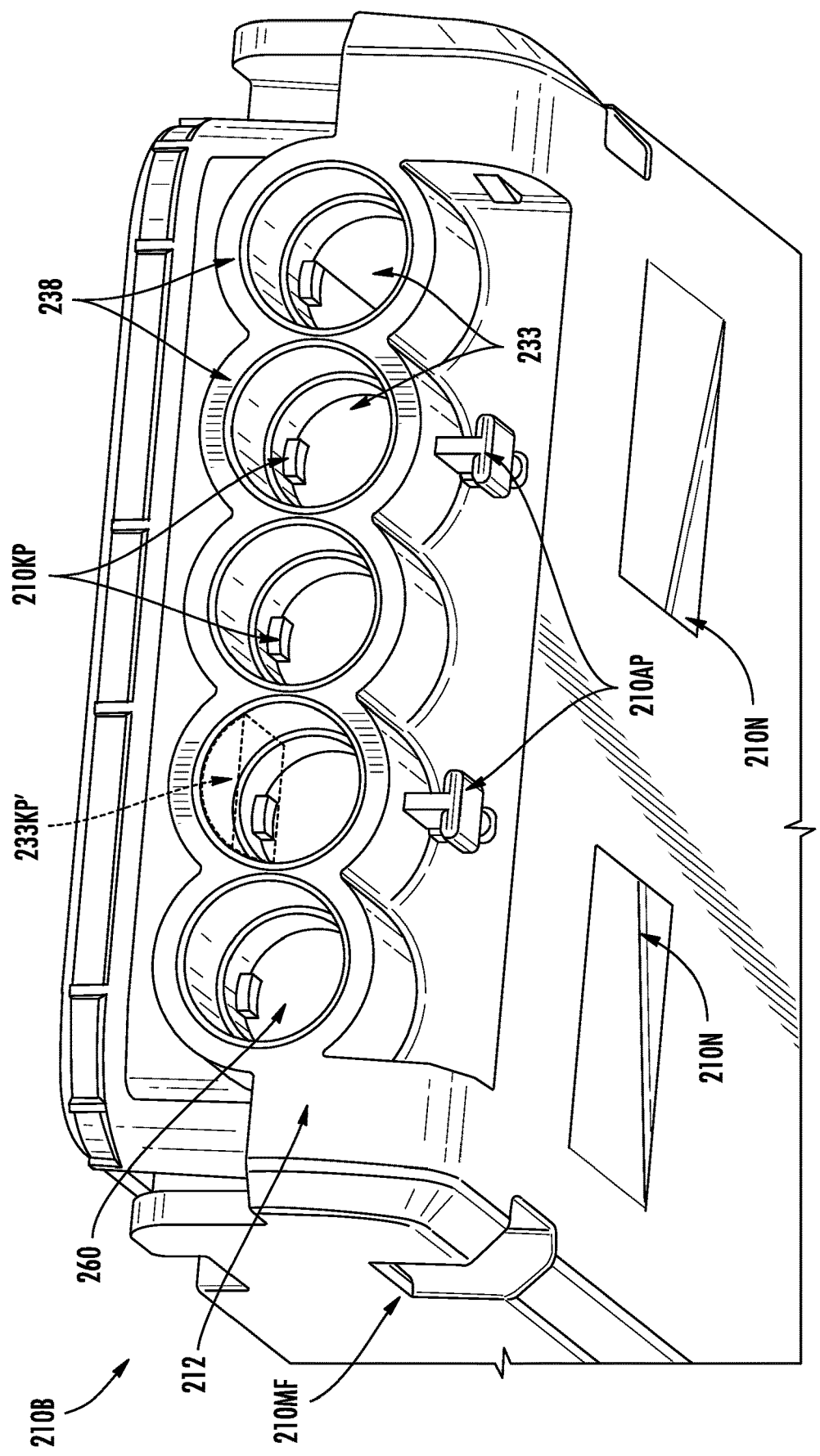
FIG. 15 is a front perspective view of the second portion of the shell depicted in FIGS. 13 and 14.
Figure 16:
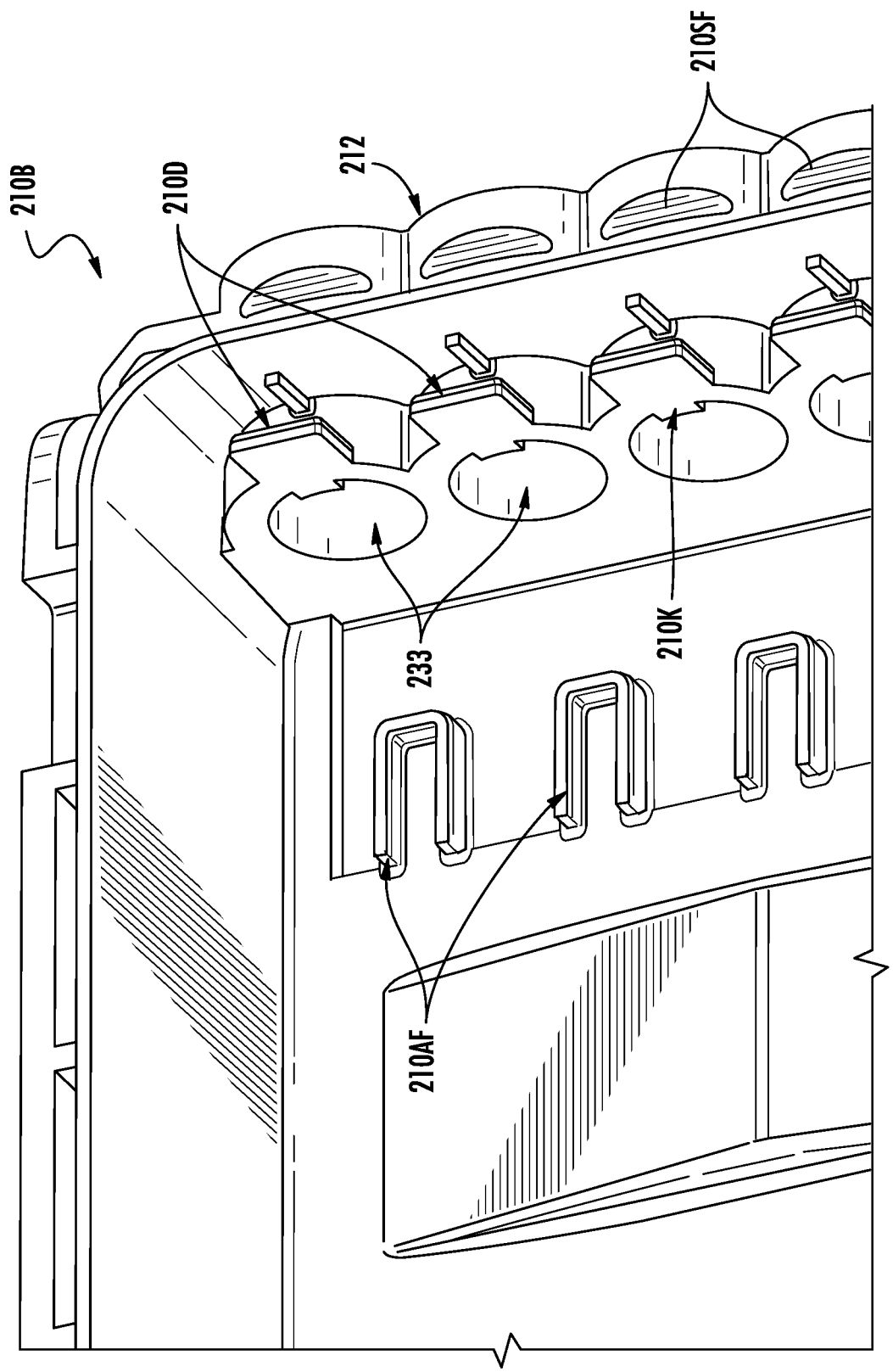
FIG. 16 is a detailed perspective view of the second portion of shell showing the mounting features for modular adapter sub-assembly of FIGS. 9 and 10.
Figure 17:
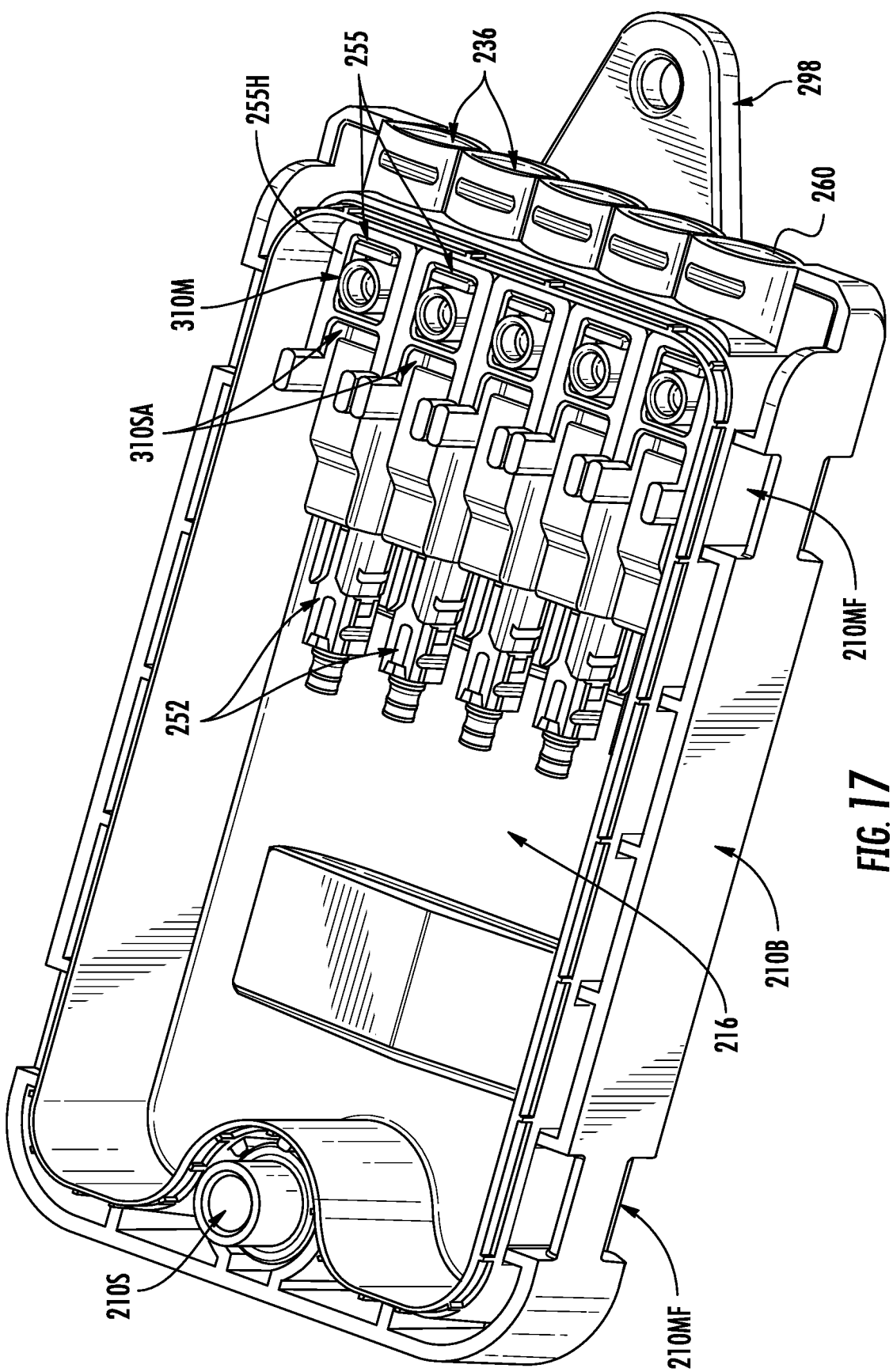

As best shown in FIGS. 7 and 15, the connection port passageway 233 may comprises a keying portion 233KP disposed forward of the securing feature 310 in connection port passageway. As shown, the keying portion 233KP is an additive keying portion to the primitive geometric round shape of the connection port passageway 233 such as a male key that is disposed forward of the securing feature in the connection port passageway 233. However, the concepts for the connection ports 236 of devices may be modified for different connector designs.

Adapters 230A are secured to an adapter body 255 using retainer 240. Adapters 230A may be biased using a resilient member 230RM as shown. Rear connectors 252 may take any suitable form and be aligned for mating with the connector secured with the connection ports 236 in any suitable manner. Adapters 230A may comprise latch arms for securing respective rear connectors therein.

Terminal 200 may have the input connection port 260 disposed in any suitable location. As used herein, "input connection port" is the location where external optical fibers are received or enter the device, and the input connection port does not require the ability to make an optical connection as discussed below. By way of explanation, terminal 200 may have the input connection port 260 disposed in an outboard position of the array of connection ports 236, on another side of the terminal, or disposed in a medial portion of array of connection ports 236 as desired.

FIG. 8 shows a partially exploded view of terminal 200 of FIGS. 3 and 4. Terminal 200 comprises a shell 200, at least one connection port 236, and a plurality of modular adapter sub-assemblies 310SA. Terminal 200 has one or more optical fibers 250 routed from the one or more connection ports 236 toward an input connection port 260 in a suitable fashion inside cavity 216 as depicted. In this embodiment, the rear connectors 252 are attached to optical fibers 250 that are routing through an optical splitter 275 (hereinafter "splitter(s)") for optical communication with the optical fiber 250 in optical communication with the input port 260. As shown, the modular adapter sub-assembly 310SA for the input connection port 260 is disposed in second portion 210B of shell 210.

Optical fibers 250 are routed from one or more of the plurality of connection ports 236 toward an input connection port 260 for optical communication within the terminal 200. Consequently, the input connection port 260 receives one or more optical fibers and then routes the optical signals as desired such as passing the signal through 1:1 distribution, routing through an optical splitter or passing optical fibers through the terminal. Splitters 275 such as shown in FIG. 8 allow a single optical signal to be split into multiple signals such as 1×N split, but other splitter arrangements are possible such as a 2×N split. For instance, a single optical fiber may feed input connection port 260 and use a 1×8 splitter within the terminal 200 to allow eight connector ports 236 for outputs on the terminal 200. The input connection port 260 may be configured in a suitable manner with any of the terminals 200 disclosed herein as appropriate such as a single-fiber or multi-fiber port. Likewise, the connection ports 236 may be configured as a single-fiber port or multi-fiber port. For the sake of simplicity and clarity in the drawings, all of the optical fiber pathways may not be illustrated or portions of the optical fiber pathways may be removed in places so that other details of the design are visible.

Additionally, the terminals or shells 210 may comprise at least one support 210S or fiber guide for providing crush support for the terminal and resulting in a robust structure.

As depicted in FIG. 8, terminal 200 may comprise a support 210S configured as a support insert that fits into shell 210. Support 210S has a bore therethrough and may act as a mounting feature for the use to a fastener to mount the terminal 200. Consequently, the support 210S carries the majority of any crushing forces that may be applied by the fastener and inhibits damage to the shell 210. Support 210S may also be located and attached to the shell at a location outside of the sealing interface between the first portion 210A and the second portion 210B of shell 210.

FIG. 7 also depicts a detailed sectional view of the interlocking features between the first portion 210A and the second portion 210B of the shell 210. Specifically, portions of the terminal may have a tongue 210T and groove 210G construction for alignment or sealing of the device.

Any of the terminals 200 disclosed herein may optionally be weatherproof by appropriately sealing seams of the shell 210 using any suitable means such as gaskets, O-rings, adhesive, sealant, welding, overmolding or the like. To this end, terminal 200 or devices may also comprise a sealing element 290 disposed between the first portion 210A and the second portion 210B of the shell 210. The sealing element 290 may cooperate with shell 210 geometry such as respective grooves 210G or tongues 210T in the shell 210. Grooves or tongue may extend about the perimeter of the shell 210. By way of explanation, grooves 210G may receive one or more appropriately sized O-rings or gaskets 290A for weatherproofing terminal 200, but an adhesive or other material may be used in the groove 210G. By way of example, the O-rings are suitably sized for creating a seal between the portions of the shell 210. By way of example, suitable O-rings may be a compression O-ring for maintaining a weatherproof seal. Other embodiments may use an adhesive or suitable welding of the materials for sealing the device. If welding such as ultra-sonic or induction welding of the shell is used a special sealing element 290 may be used as known in the art. If the terminal 200 is intended for indoor applications, then the weatherproofing may not be required.

As shown in FIG. 8, terminal 200 comprises a single input optical fiber of the input connection port 260 is routed to a 1:4 splitter 275 and then each one of the individual optical fibers 250 from the splitter is routed to each of the respective rear connector 252 of the four connection ports 236 for optical connection and communication within the terminal. Input connection port 260 may be configured in any suitable configuration for the terminals disclosed as desired for the given application. Examples of input connection ports 260 include being configured as a single-fiber input connection, a multi-fiber input connector, a tether input that may be a stubbed cable or terminated with a connector or even one of the connection ports 236 may function as an pass-through connection port as desired.

By way of explanation for multi-fiber ports, two or more optical fibers 250 may be routed from one or more of the plurality of connection ports 236 of the terminal 200 disclosed herein. For instance, two optical fibers may be routed from each of the four connection ports 236 of terminal 200 toward the input connection port 260 with or without a splitter such as single-fiber input connection port 260 using a 1:8 splitter or by using an eight-fiber connection at the input connection port 260 for a 1:1 fiber distribution. To make identification of the connection ports or input connection port(s) easier for the user, a marking indicia may be used such as text or color-coding of the terminal, color codes on the actuator 310A, or marking the input tether (e.g. an orange or green polymer) or the like.

Figure 40A:
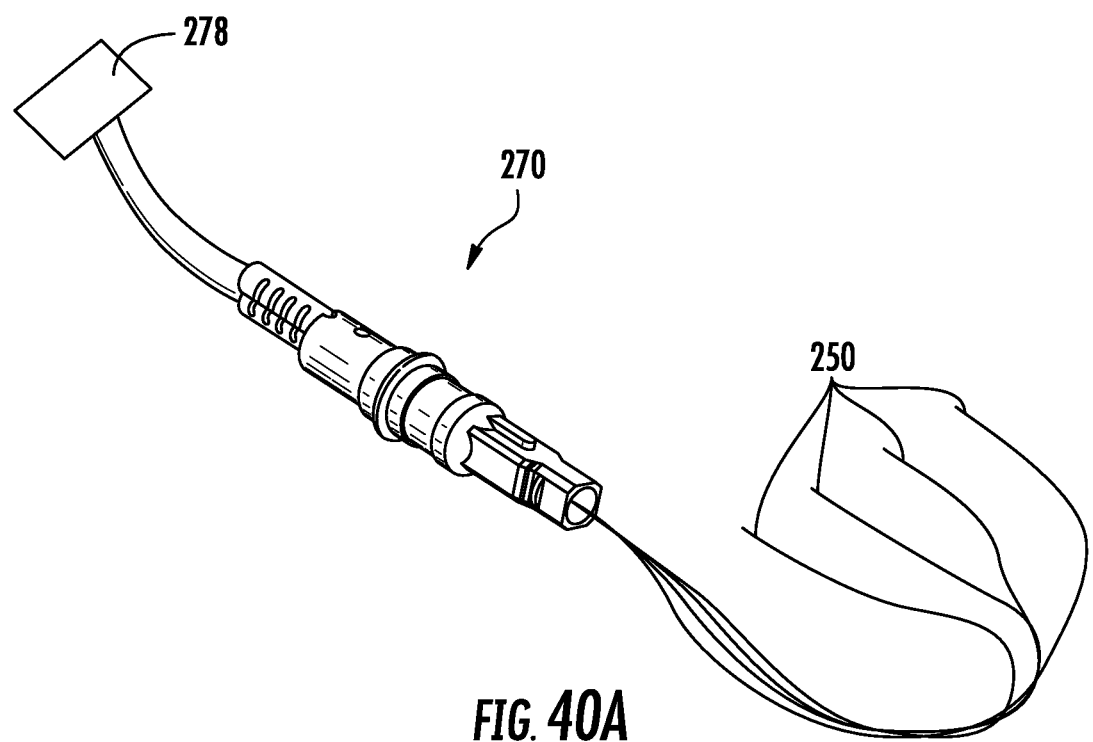
FIGS. 40A and 40B depict perspective views of an input tether and the input tether as part of the terminals disclosed.
Figure 40B:
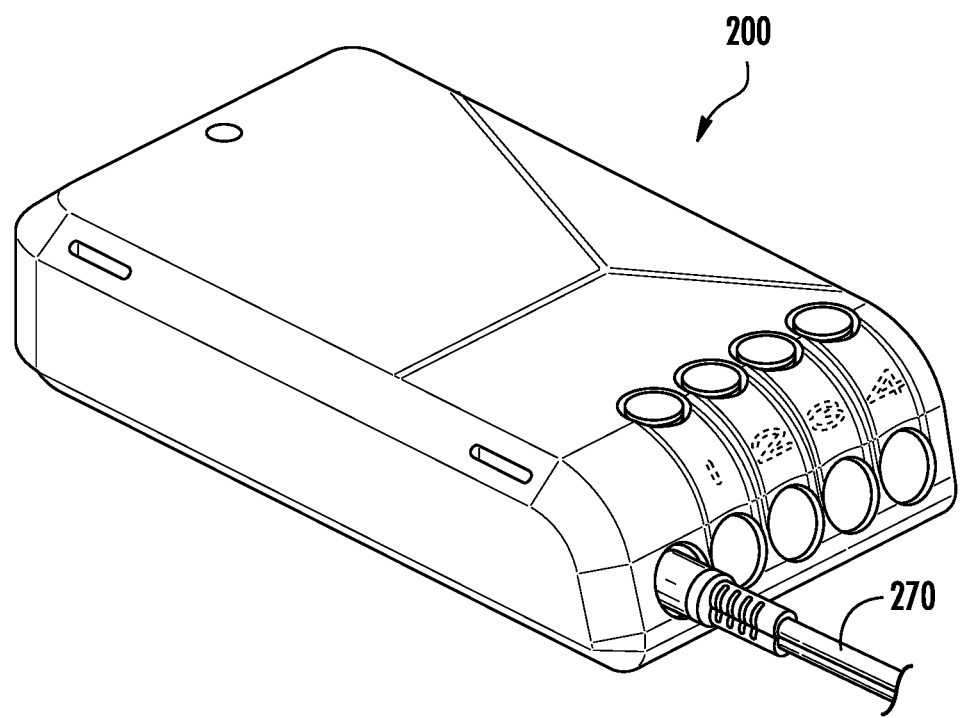

Other configurations are possible besides an input connection port 260 that receives a connector 10. Instead of using an input connection port that receives a connector 10, terminals 200 may be configured for receiving an input tether 270 attached to the terminal at the input connection port 260 such as represented in FIGS. 40A and 40B.

FIGS. 9-12 show modular adapter sub-assembly 310SA used in the terminal of FIGS. 3 and 4. Modular adapter sub-assemblies 310SA enable quick and easy assembly of terminals 200 in a scalable manner. Moreover, the modular sub-assemblies 230SA advantageously allow the mating components (i.e., the adapters 230A) corresponding to each connection port 236 to move or "float" independently of other the other modular adapter sub-assemblies 310SA relative to the shell 210 for preserving optical performance.

Figure 9:
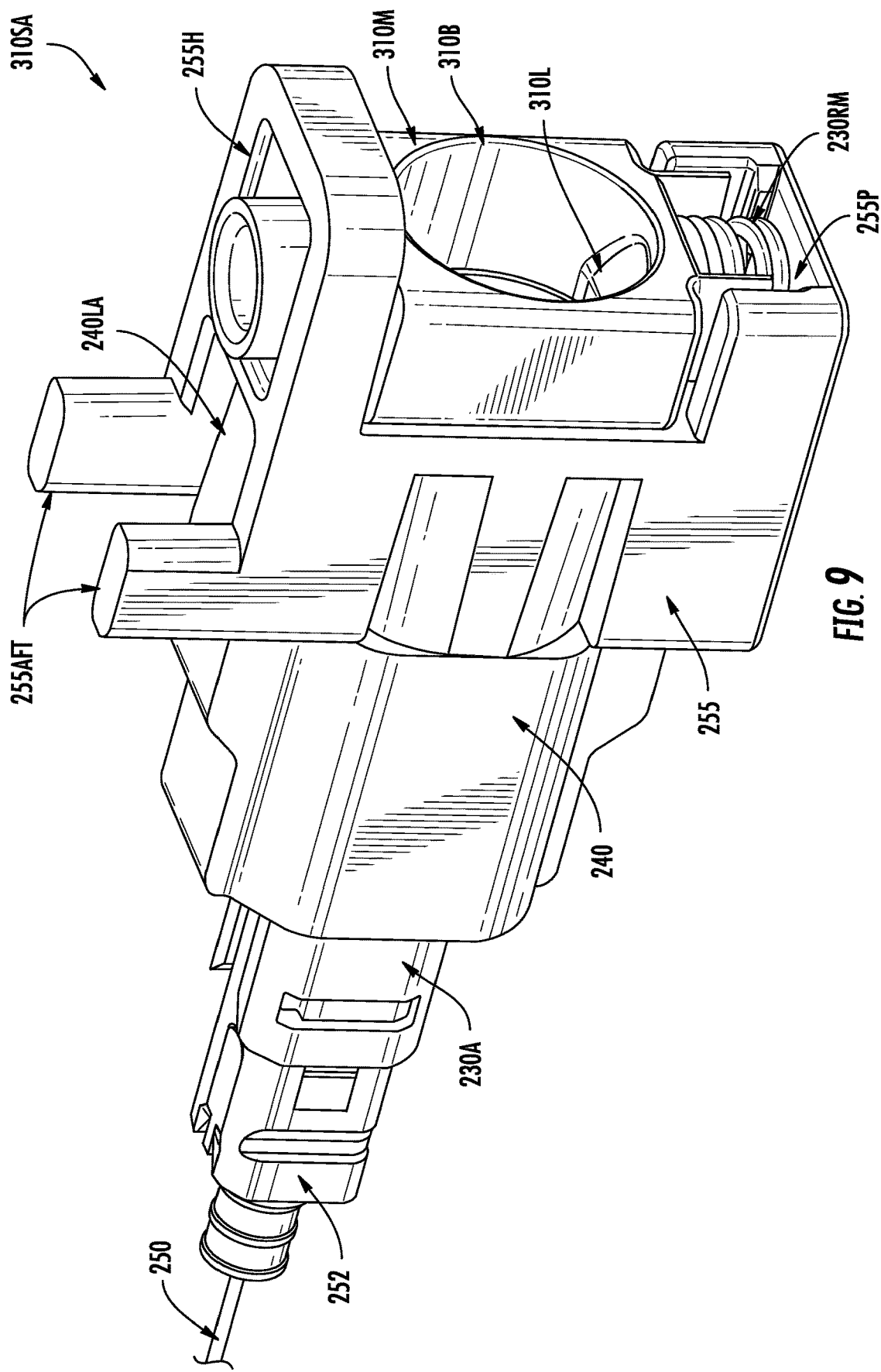
FIGS. 9 and 10 respectively are assembled front and rear perspective views of the modular adapter sub-assembly comprising an adapter and a portion of the securing feature for cooperation with one connection port of the device of FIGS. 3 and 4 with the rear connector attached.
Figure 10:
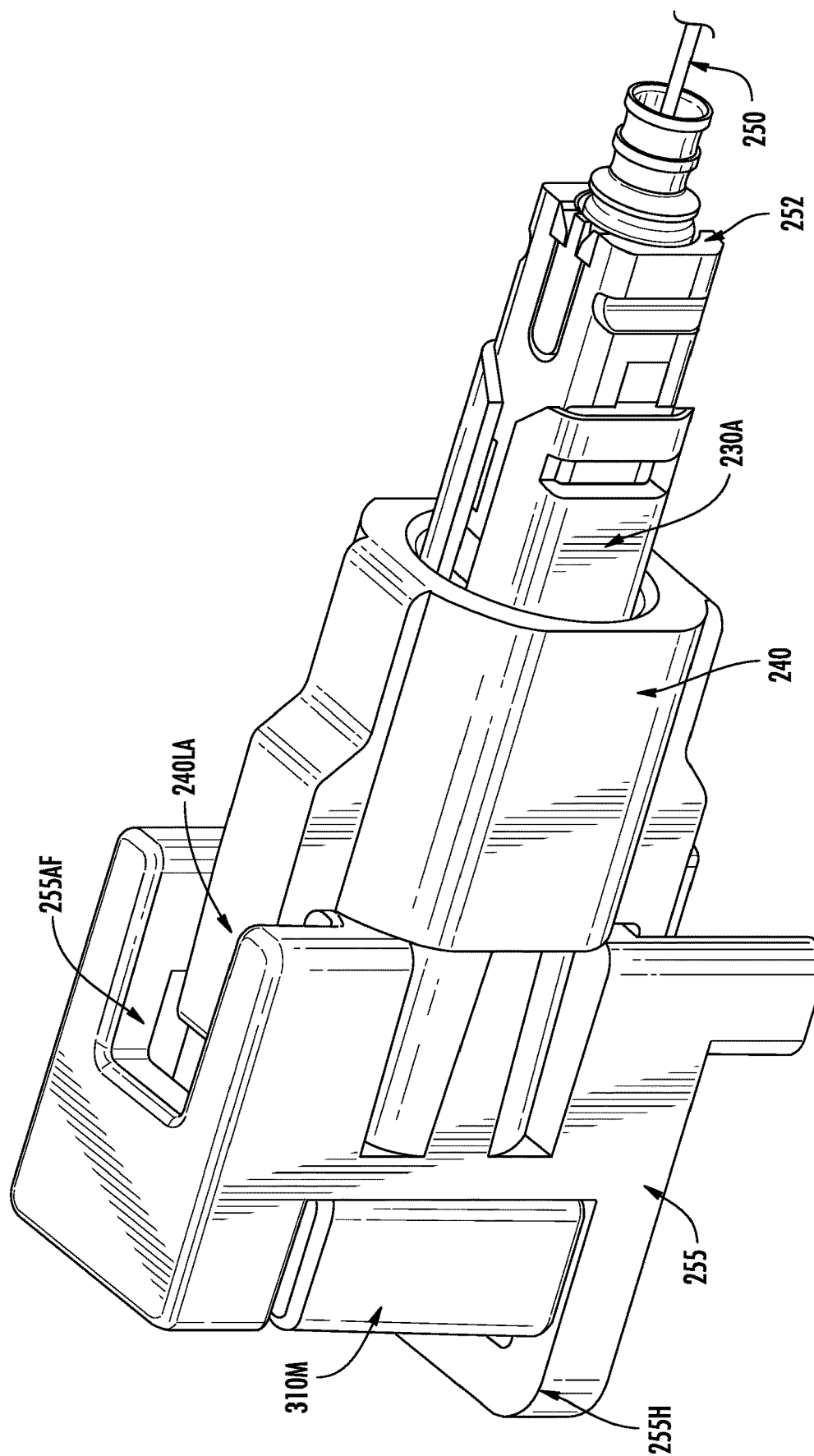
Figure 12:
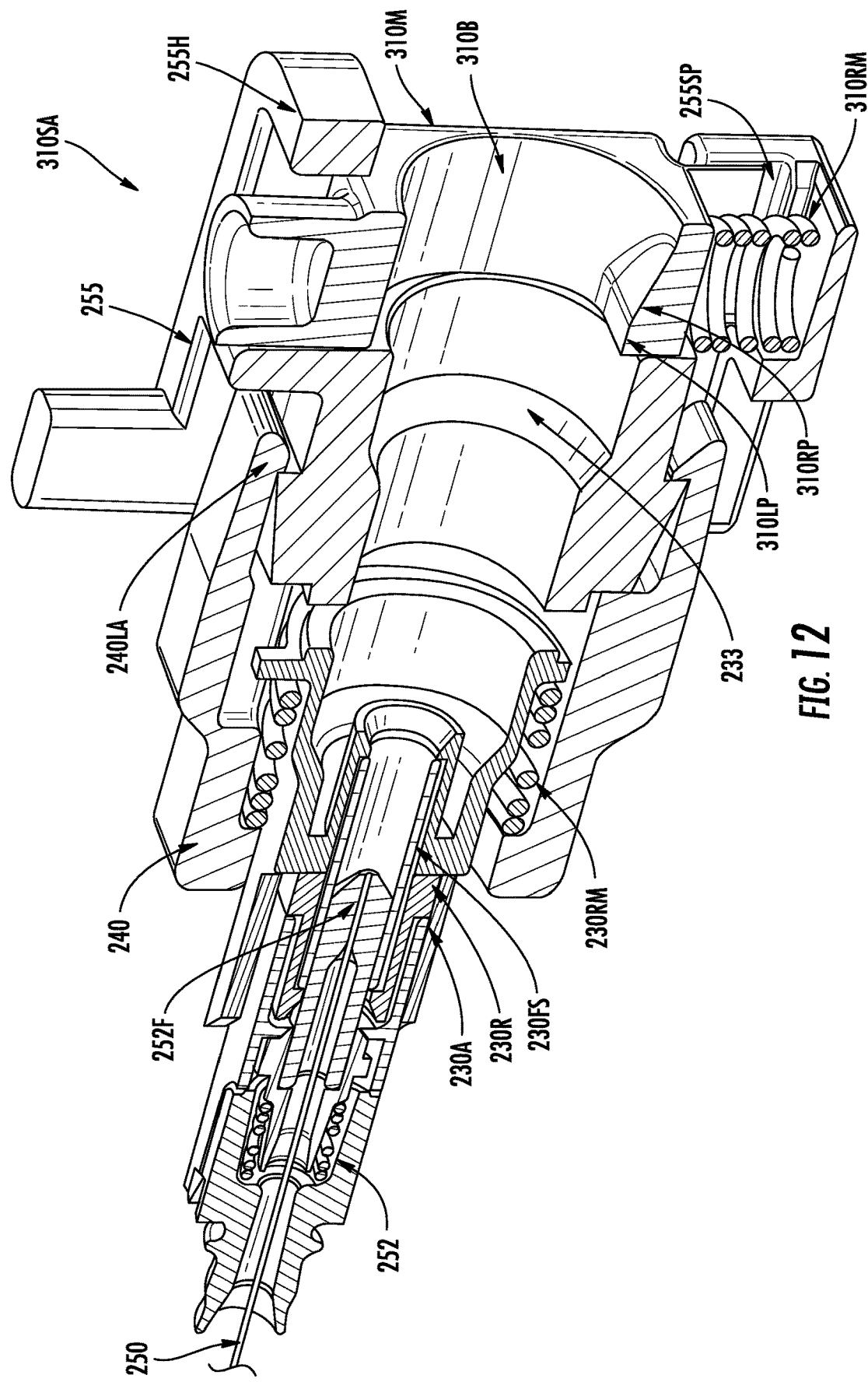
FIG. 12 is a longitudinal sectional view of the modular adapter sub-assembly of FIGS. 9 and 10 with the rear connector attached.
Figure 13:
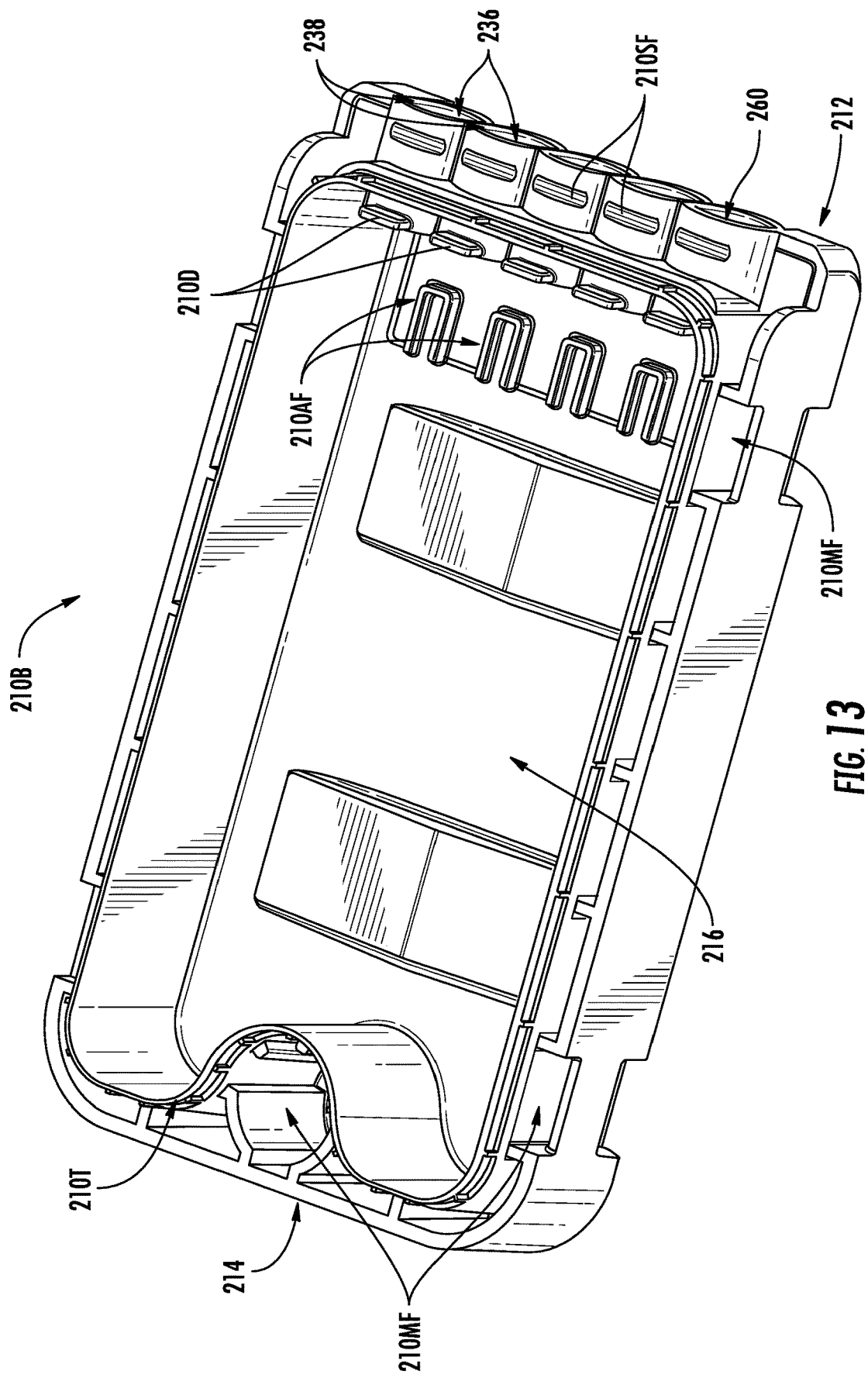
FIGS. 13 and 14 are top perspective views from different directions of a second portion of the shell of the terminal of FIGS. 3 and 4.
Figure 14:
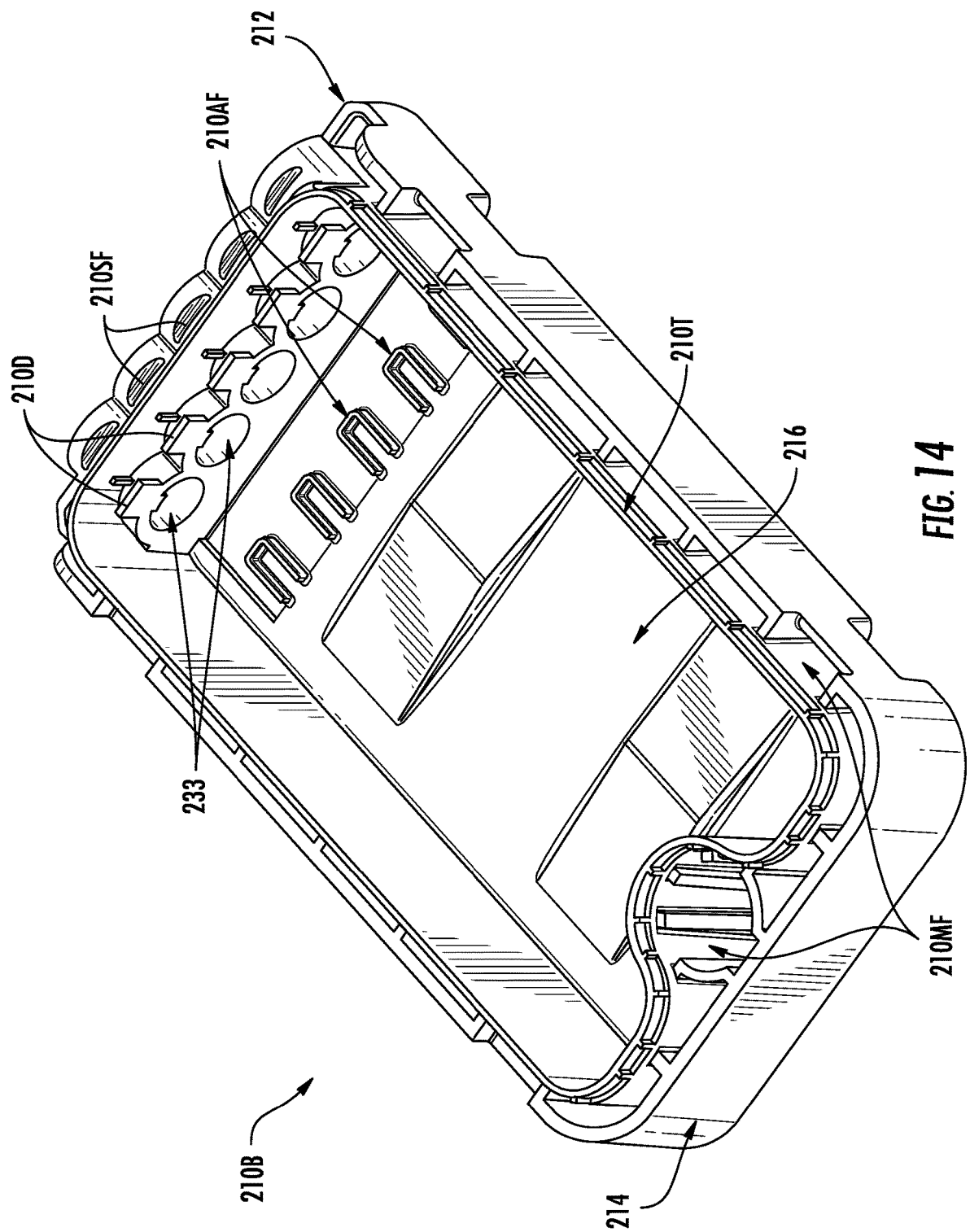

FIGS. 9 and 10 respectively show front and rear perspective views of modular adapter sub-assemblies 310SA with a rear connector 252 attached to the adapter 230A. FIG. 11 depicts an exploded view of the modular adapter sub-assemblies 310SA and shows that the rear connector 252 is not a portion of modular adapter sub-assembly 310SA, and FIG. 12 is a cross-sectional view of the modular adapter sub-assembly 310SA. Modular adapter sub-assemblies 310SA comprises an adapter 230A aligned with the at least one connection port 236 when assembled. Adapter 230 may be biased by a resilient member 230RM. The adapter (230A) may be secured to the adapter body 255 using retainer 240. FIGS. 21-32 show details of select components of the modular adapter sub-assembly 310SA.

As best shown in FIG. 11, modular adapter sub-assembly 310SA comprises a portion of securing feature 310 and a securing feature resilient member 310RM. Specifically, modular adapter sub-assembly 310SA comprises securing member 310M. However, other embodiments could comprise an actuator 310A or have a single securing feature 310 as part of the assembly. Securing member 310M is inserted into a front end of an adapter body 255 along with securing feature resilient member 310RM.

Specifically, the rim 310R of securing member 310M is inserted into a hoop 255H of adapter body 255 and standoffs 310SO are disposed in a portion of the resilient member pocket 255SP at the bottom of the adapter body 255. Securing feature resilient member 310RM is disposed in the resilient member pocket 255SP for biasing the securing member 310M to a retain position as shown in FIG. 12. This construction advantageously keeps the assembly intact using the securing feature resilient member 310RM. Standoffs 310SO of adapter body 255 may also act as stops to limit the translation of the securing member 310.

In this embodiment, modular adapter sub-assembly 310SA may comprises an adapter body 255, securing member 310M, securing feature resilient member 310RM, a ferrule sleeve 230FS, a ferrule sleeve retainer 230R, resilient member 230RM, a retainer along with the adapter 230A. Adapter body 255 has a portion of the connection port passageway 233 disposed therein.

As best depicted in FIGS. 11 and 12, the is resilient member 230RM is disposed over a barrel of adapter 230A and seated on the flange of adapter 230A as depicted, then retainer 240 can be attached to adapter body 255 using latch arms 240LA to secure the same. Ferrule sleeve retainer 230R and ferrule sleeve 230FS are aligned for assembly into the adapter 230A for assembly as shown in FIG. 11 and seated using the ferrule sleeve retainer 230R. Of course, other variations of the modular adapter sub-assembly 310SA are possible.

FIGS. 13-16 depict detailed views of the second portion 210B of shell 210 with the internal components removed for showing the internal construction of the terminal 200 of FIGS. 3 and 4. Shells 210 may have any suitable shape, design or configuration as desired. Second portion 210B cooperates with first portion 210A to form shell 210. Second portion 210B comprises a plurality of connection ports 236 and input connection port 260. Second portion 210B provides a portion of cavity 216 of terminal 200, and the internal bottom surface of second portion 210B comprises a plurality of alignment features 210AF for aligning the modular adapter sub-assembly 310SA with the respective connection ports 236. Alignment features 210AF have a U-shape and cooperate with the alignment features 255AF on the bottom of adapter body 255. Second portion 210B also includes a plurality of studs 210D on top of the respective connection ports 236 within cavity 216 for seating the hoop 255H of the adapter body 255 for assembly. Second portion 210B may also include a plurality of guide features 210SF for aligning the first portion 210A with the second portion 210B of the shell 210.

FIG. 15 is a front perspective view of second portion 210B showing other features. As shown, the keying portion 233KP is an additive keying portion to the primitive geometric round shape of the connection port passageway 233 such as a male key that is disposed forward of the securing feature in the connection port passageway 233. However, the concepts for the connection ports 236 of devices may be modified for different connector designs. For instance, the keying portion 233KP may be defined as a walled-portion across part of the connection port passageway 233 as represented by the dashed line 233KP' shown in one of the connection ports 236. Thus, the connection port with keying portion 233KP' would be able to properly receive an external fiber optic connector having a portion with a proper D-shaped portion.

FIG. 15 also depicts alignment protrusions 210AP on the front end 212 of second portion 210B of shell 210. Alignment protrusions 210AP cooperate with mounting tab 298 for aligning and attaching the same to the shell 210 of the terminal 200. In other embodiments, the mounting tab could be integrally formed with the shell 210, but that requires a more complex molding process.

Figure 17:
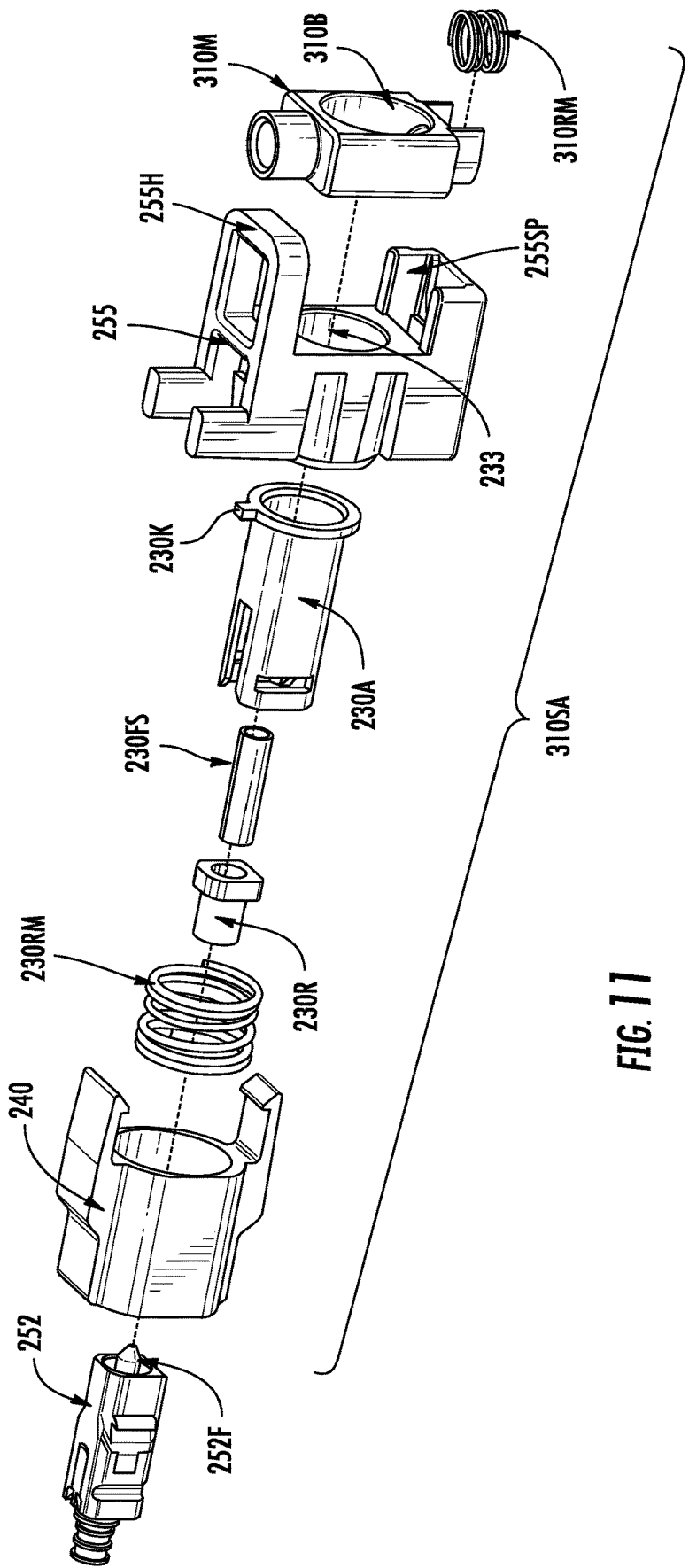
FIG. 17 is a top perspective view of the modular adapter sub-assemblies loaded into the second portion of the shell with the optical fibers removed for clarity.

FIG. 17 depicts the assembly of modular sub-assemblies 310SA into the second portion 210B of shell 200. As shown, modular adapter sub-assemblies 310AS are aligned and installed onto the U-shaped alignment features 210AF of the second portion 210B of shell 210 as discussed. FIG. 26 shows a representation of the alignment features 210AF of the second portion 210B of shell 210 cooperating with the alignment features 255AF on the bottom of adapter body 255 in another embodiment. FIG. 17 also shows the hoops 255H of the adapter bodies 255 disposed about the plurality of studs 210D on top of the respective connection ports 236 within cavity 216 for aligning the modular adapter sub-assembly 310SA within the second portion 210B of shell 210 for aligning the connection port passageway 233 of the adapter body 255 with the connection port passageway 233 of the shell 210. FIG. 17 also shows the support 210S placed into the respective bore of the second portion 210B of the shell. As depicted, support 210S is located outside of the sealing interface of the second portion 210B of shell 210.

Figure 18:
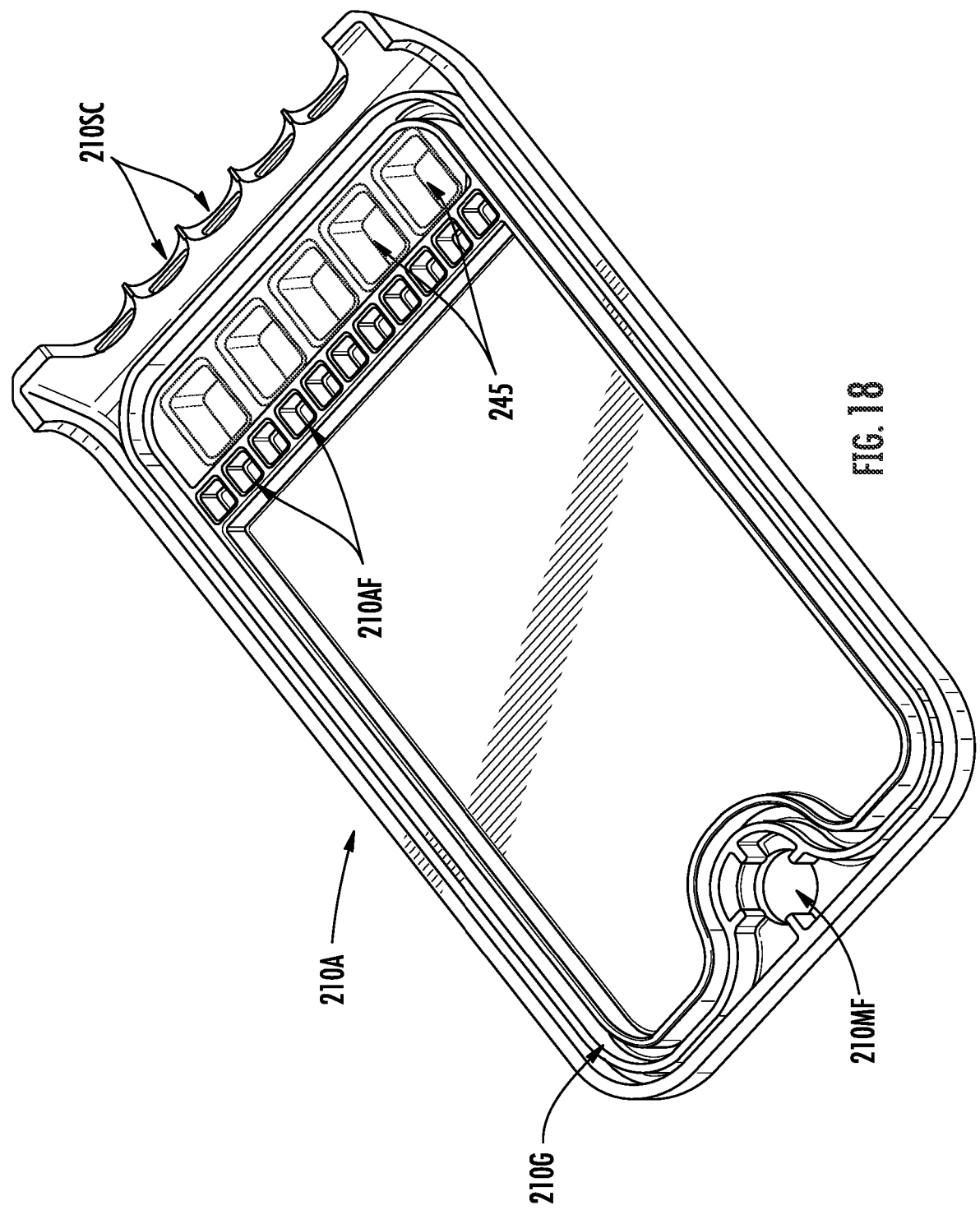
FIG. 18 is an inside perspective view of the first portion of the shell.

FIG. 18 depicts an inside surface of the first portion 210A of shell 200. As shown, first portion 210A comprises a profile that conforms to the profile of the second portion 210B of shell 210. By way of explanation, first portion 210A comprises a plurality of scallops 210SC for cooperating with the connection ports 236 on the second portion 210B of shell 210. First portion 210A also comprise a sealing perimeter that cooperates with the sealing perimeter of the second portion 210B of shell 210. First portion 210A also comprises alignment features 210AF sized and shaped for cooperating with the alignment features 255AFT on the top of adapter body 255 for securing the same when the terminal is assembled. The respective alignment features 210AF,255AF only allow assembly of the modular adapter sub-assemblies 310AS into the shell 210 in one orientation for the correct orientation of the locking feature 310L with respect to the connection port 236.

Terminal may include a fiber tray or fiber guide/supports that are discrete components that may attach to the shell 210; however, fiber guides may be integrated with the shell if desired. Shell may also 210 comprise one or more fiber guides for organizing and routing optical fibers 250. The fiber tray inhibits damage to optical fibers and may also provide a location for the mounting of other components such as splitters, electronics or the like if desired. Fiber guides may also act as support 210S for providing crush strength to the shell 210 if they have a suitable length.

Figure 19:
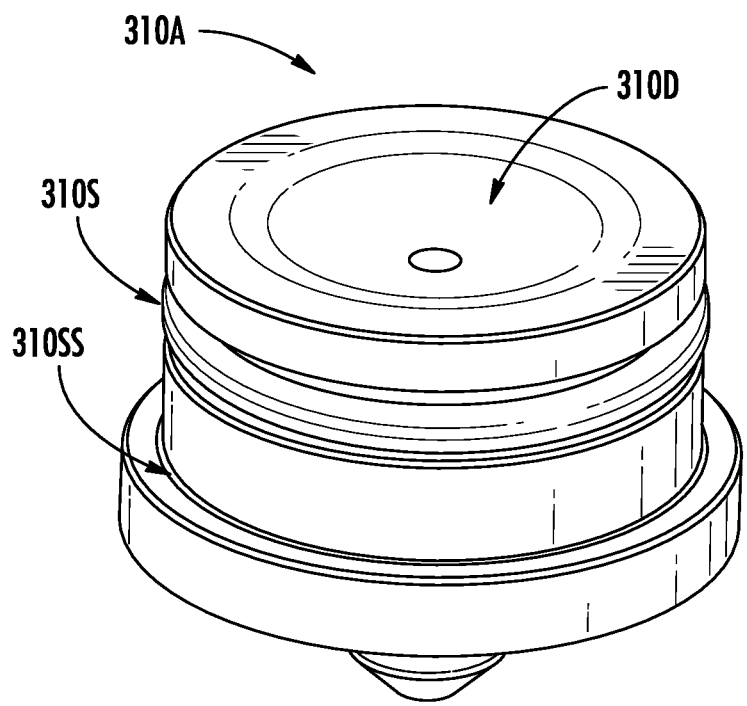
FIGS. 19 and 20 depict perspective views showing the details of the actuator of the securing feature of the terminal of FIGS. 3 and 4 that cooperates with the securing member of FIGS. 21-23.
Figure 20:
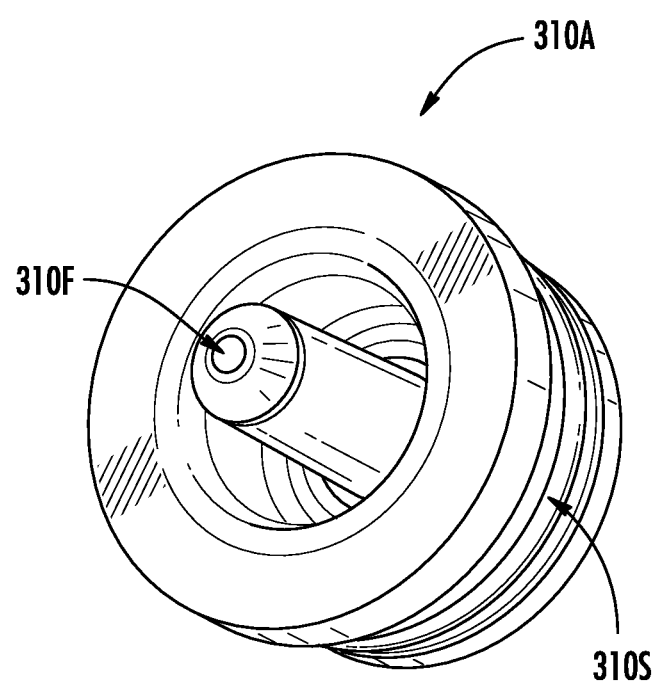

FIGS. 19 and 20 show detailed perspective view of actuator 310A. Actuator 310A may include a sealing member 310S for keeping dirt, debris and the like out of portions of the terminal 200. Sealing member 310S is sized for the retention groove 310RG in the securing feature 310 and the securing feature passageway 245 for sealing. Actuator 310A may also comprise a stop surface 310SS for inhibiting overtravel of the securing feature 310 of inhibit the actuator from being removed from the terminal 200 when assembled. In this embodiment, the stop surface 310SS. Actuator 310A may also include a dimple 310D or other feature for inhibiting inadvertent activation/translation of the securing feature 310 or allowing a tactical feel for the user. Actuator 310A comprises a finger 310F for seating within a rim 310R of securing member 310M for transferring forces to the same.

Actuator 310A may also be a different color or have a marking indicia for identifying the port type. For instance, the actuator 310A may be colored red for connection ports 236 and the actuator 310A for the input connection port 260 may be colored black. Other color or marking indicia schemes may be used for pass-through ports, multi-fiber ports or ports for split signals.

Figure 23:
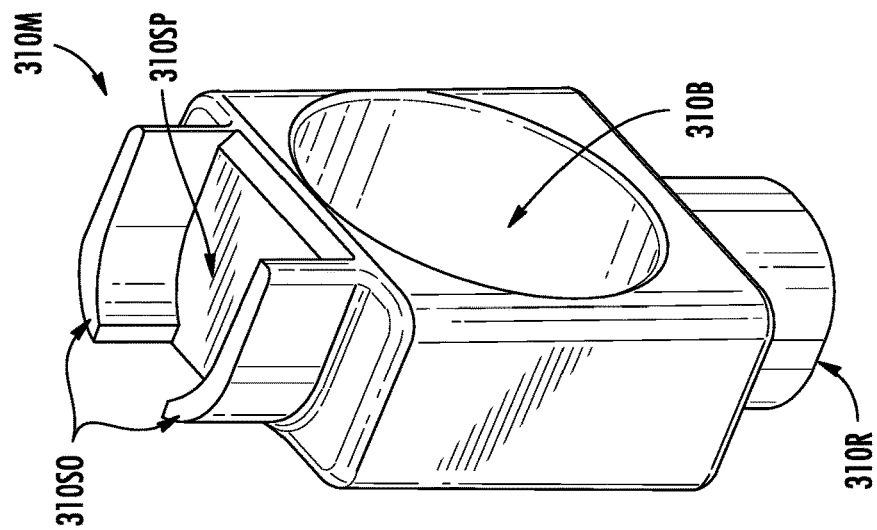
FIGS. 21-23 are various perspective views showing the details of the securing member of the securing feature of the terminal of FIGS. 3 and 4 that cooperates with the actuator of FIGS. 19 and 20.
Figure 22:
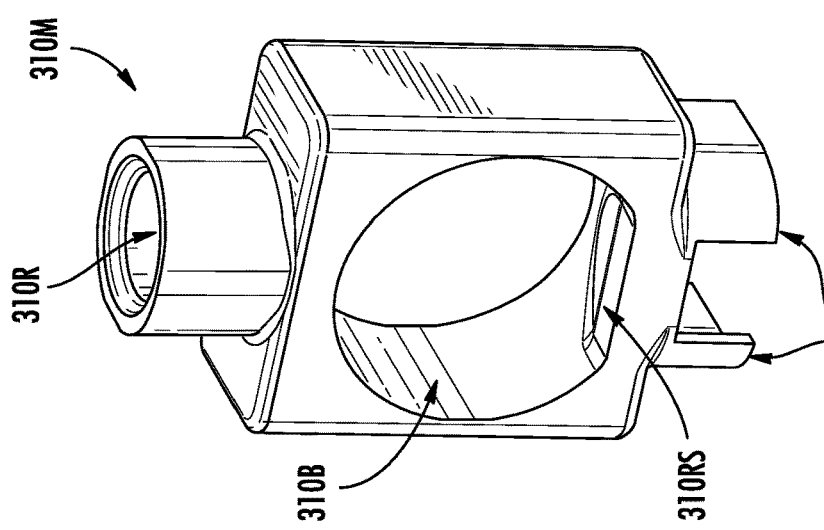
Figure 21:
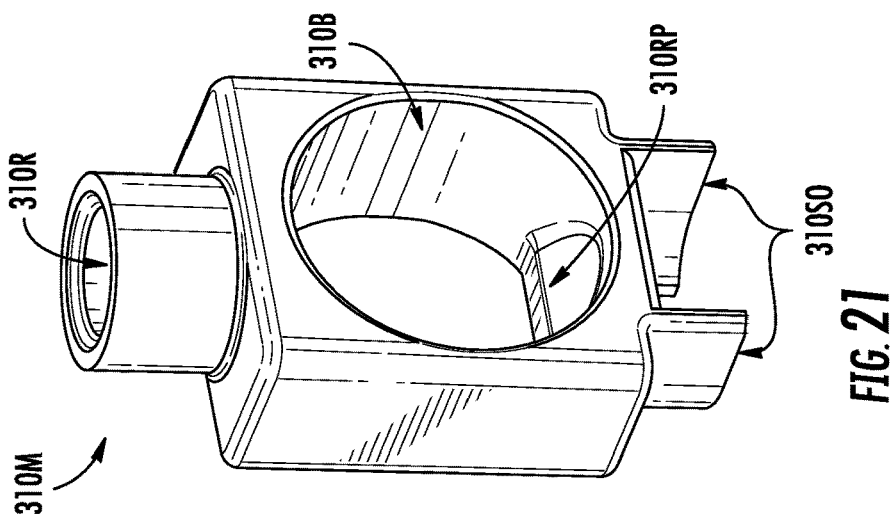

FIGS. 21-32 show details of select components of the modular adapter sub-assembly 310SA. FIGS. 21-23 show various perspective detailed views of securing member 310M. Securing member 310M comprises a locking feature 310L. Locking feature 310L is configured for engaging with a suitable locking portion 20L on the housing 20 of connector 10. In this embodiment, securing feature 310 comprise a bore 310B that is respectively aligned with the respective connector port passageway 233 as shown in FIG. 8 when assembled. The bore 310B is sized for receiving a portion of connector 10 therethrough as shown in FIG. 39.

As depicted in this embodiment, locking feature 310L is disposed within bore 310B of securing member 310M. As shown, locking feature 310L is configured as ramp 310RP that runs to a short flat portion, then to a ledge for creating the retention surface 310RS for engaging and retaining the connector 10 once it is fully inserted into the connector port passageway 233 of the connection port 236. Consequently, the securing feature 310 is capable of moving to an open position (OP) when inserting a suitable connector 10 into the connector port passageway 233 since the connector housing 20 engages the ramp 310RP pushing the securing feature downward during insertion.

Securing member 310M may also comprises standoffs 310 as best shown in FIG. 23. Standoffs 310 cooperate with the resilient member pocket 255SP of the adapter body 255 for keeping the bore 310B in the proper rotational orientation within the respective to the adapter body 255. Specifically, standoffs 310 have curved shapes that only allow the securing member 310M to fully-seat into the adapter body 255 when oriented in the proper orientation.

FIG. 24-27 are various perspective views showing the details of the adapter body 255 of the modular adapter sub-assembly 310SA. Adapter body 255 comprises an adapter body bore 255B that comprises a portion of the connection port passageway 233 when assembled. As discussed, adapter body 255 comprises alignment features 255AF on the bottom of adapter body 255 that cooperate with the shell 210 to align and seat the same in the shell 210. Adapter body 255 also comprises hoop 255H. Hoop 255H captures the ring 255R at the top of the securing member 310M when assembled and also seats the adapter body 255 in the second portion 210B of shell 210 during assembly. Adapter body 255 also comprises alignment features 255AFT on the top of adapter body 255 for securing the same in the first portion 210A of the shell 210 when the terminal 200 is assembled. Adapter body 255 also comprise resilient member pocket 255SP at the bottom of the adapter body 255 for capturing the securing feature resilient member 310RM as depicted in FIG. 12.

Figure 28:
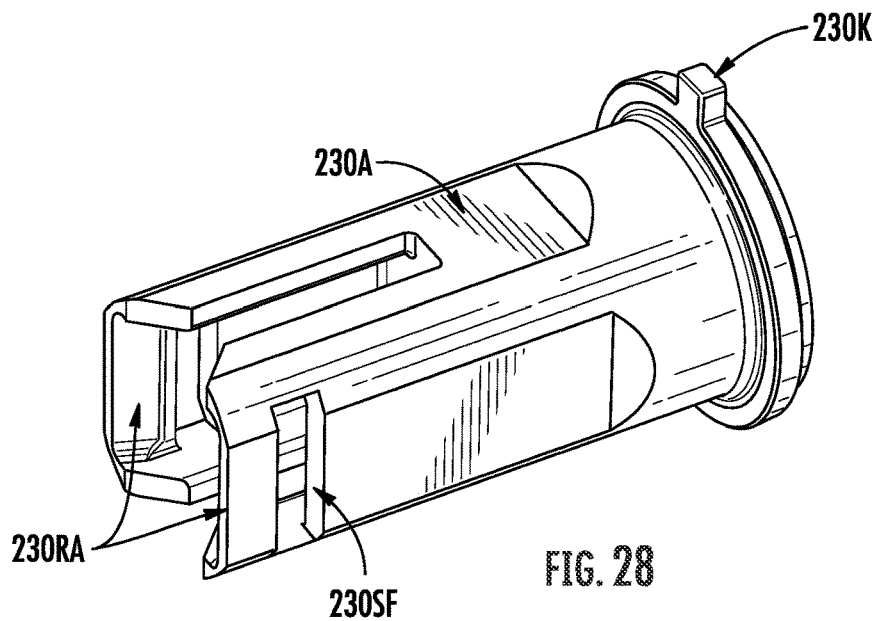
FIGS. 28 and 29 are perspective views of the adapter of the modular adapter sub-assembly of FIGS. 9-12.
Figure 29:
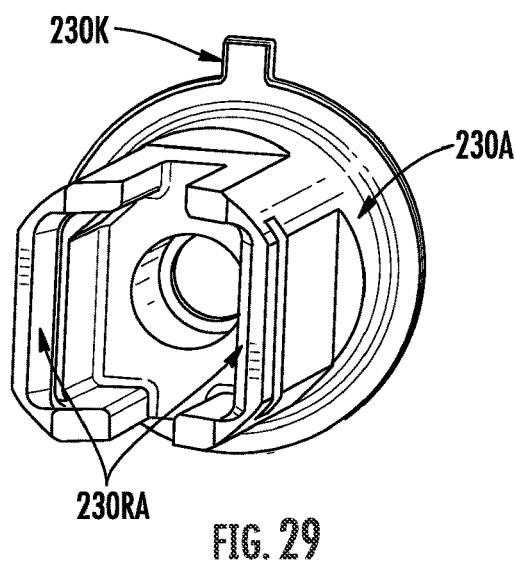
Figure 30:
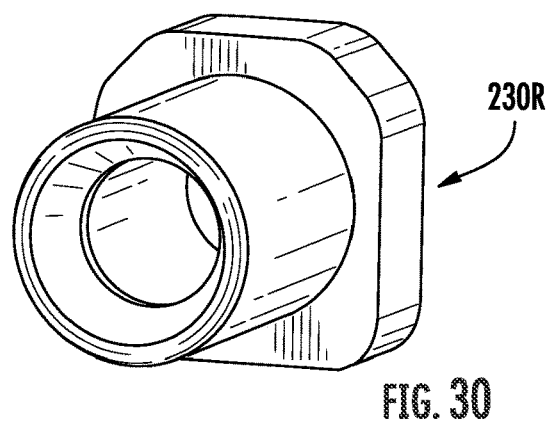
FIG. 30 is perspective view of the retainer of the modular adapter sub-assembly of FIGS. 9-12.
Figure 31:
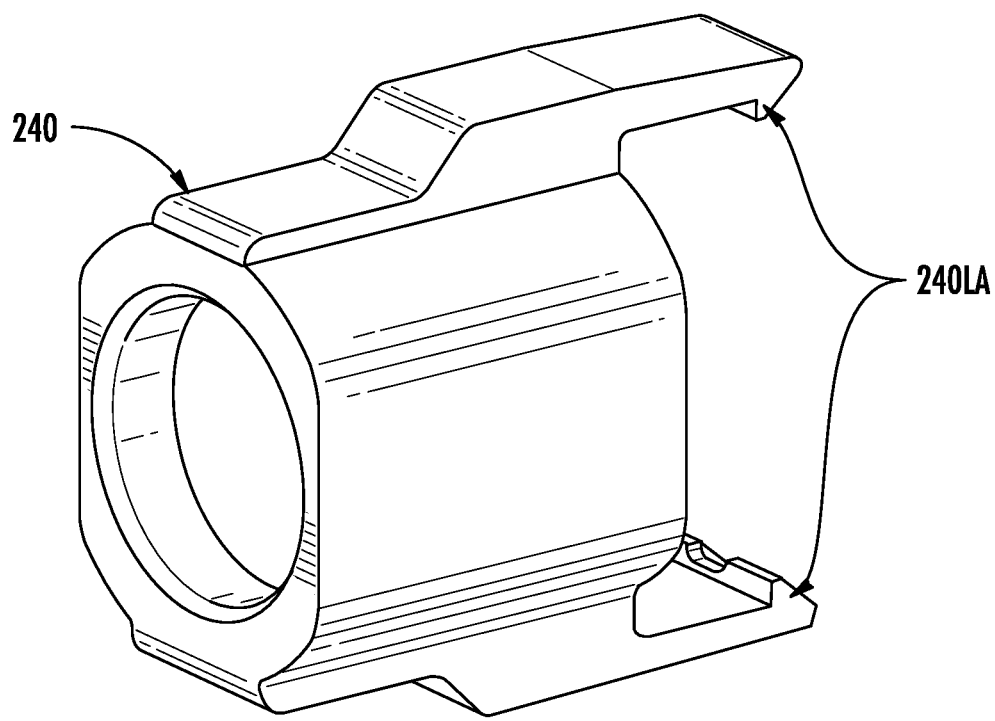
FIGS. 31 and 32 are perspective views of a keeper of the modular adapter sub-assembly of FIGS. 9-12.
Figure 32:
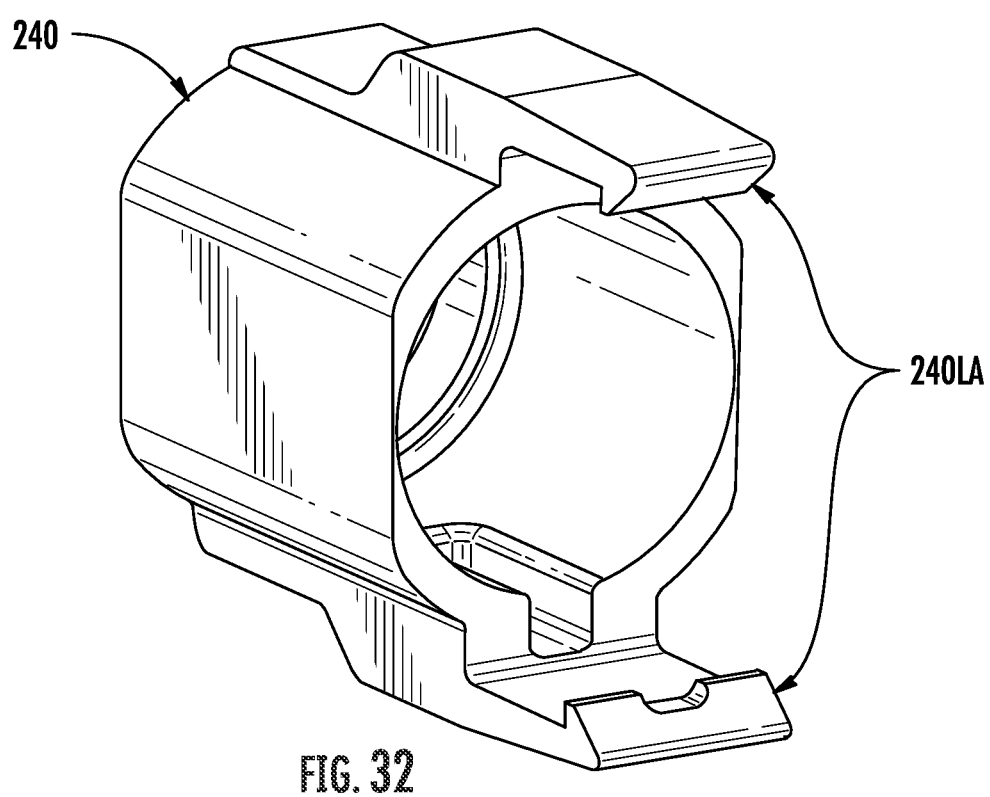

FIGS. 28 and 29 depict detailed views of adapter 230A. Adapter 230A comprises a plurality of resilient arms 230RA comprising securing features (not numbered). Adapter 230A also comprises an adapter key 230K for orientating the adapter 230A with the adapter body 255. Securing features 230SF cooperate with protrusions on the housing of rear connector 252 for retaining the rear connector 252 to the adapter 230A. The ferrule 252F is disposed within the ferrule sleeve 230FS when assembled. FIG. 12 is a sectional view showing the attachment of the rear connector 252 with the adapter 230A with ferrule sleeve retainer 230R and the ferrule sleeve 230FS therebetween. Ferrule sleeves 230FS are used for precision alignment of mating ferrules between rear connectors 252 and connector 10. Devices may use alternative rear connectors if desired and can have different structures for supporting different rear connectors. FIG. 30 depicts details of the ferrule sleeve retainer 230R. FIGS. 31 and 32 show detailed views of retainer 240 that forms a portion of the modular sub-assembly 310SA. Retainer 240 comprises one or more latch arms 240LA for cooperating with the adapter body 255 for securing the adapter 230A and resilient member 230RM of the modular adapter sub-assembly 310SA.

The concepts disclosed allow relatively small terminals 200 having a relatively high-density of connections along with an organized arrangement for connectors 10 attached to the terminals 200. Shells have a given height H, width W and length L that define a volume for the terminal as depicted in FIG. 3. By way of example, shells 210 of terminal 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of terminals 200 comprise a connection port insert 230 having a port width density of at least one connection port 236 per 20 millimeters of width W of the terminal 200. Other port width densities are possible such as 15 millimeters of width W of the terminal. Likewise, embodiments of terminals 200 may comprise a given density per volume of the shell 210 as desired.

Figure 2:
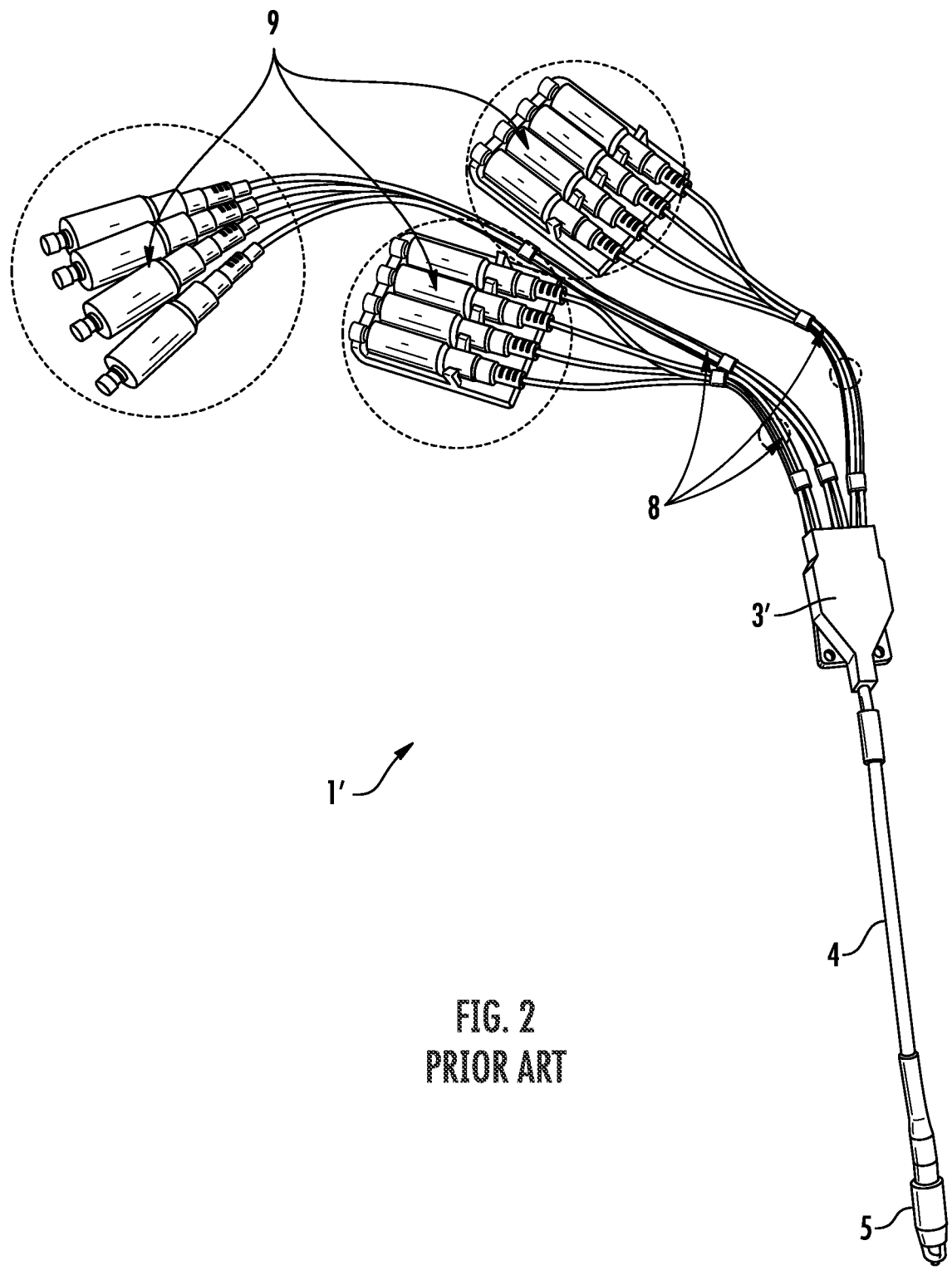

The concepts disclosed allow relatively small form-factors for terminals as shown in Table 1. Table 1 below compares representative dimensions, volumes, and normalized volume ratios with respect to the prior art of the shells (i.e., the housings) for terminals having 4, 8 and 12 ports as examples of how compact the terminals of the present application are with respect to convention prior art terminals. Specifically, Table 1 compares examples of the conventional prior art terminals such as depicted in FIG. 1 with terminals having a linear array of ports. As depicted, the respective volumes of the conventional prior art terminals of FIG. 1 with the same port count are on the order of ten times larger than terminals with the same port count as disclosed herein. By way of example and not limitation, the terminal may define a volume of 400 cubic centimeters or less for 12-ports, or even if double the size could define a volume of 800 cubic centimeters or less for 12-ports. Terminals with smaller port counts such as 4-ports could be even smaller such as the shell or terminal defining a volume of 200 cubic centimeters or less for 4-ports, or even if double the size could define a volume of 200 cubic centimeters or less for 4-ports. Devices with sizes that are different will have different volumes form the explanatory examples in Table 1 and these other variations are within the scope of the disclosure. Consequently, it is apparent the size (e.g., volume) of terminals of the present application are much smaller than the conventional prior art terminals of FIG. 1. In addition to being significantly smaller, the terminals of the present application do not have the issues of the conventional prior art terminals depicted in FIG. 2. Of course, the examples of Table 1 are for comparison purposes and other sizes and variations of terminals may use the concepts disclosed herein as desired.

One of the reasons that the size of the terminals may be reduced in size with the concepts disclosed herein is that the connectors that cooperate with the terminals have locking features that are integrated into the housing 20 of the connectors 10. In other words, the locking features for securing connector are integrally formed in the housing of the connector, instead of being a distinct and separate component like a coupling nut of a conventional hardened connector used with conventional terminals. Conventional connectors for terminals have threaded connections that require finger access for connection and disconnecting. By eliminating the threaded coupling nut (which is a separate component that must rotate about the connector) the spacing between conventional connectors may be reduced. Also eliminating the dedicated coupling nut from the conventional connectors also allows the footprint of the connectors to be smaller, which also aids in reducing the size of the terminals disclosed herein.

TABLE 1

Comparison of Conventional Multiport of FIG. 1 with Multiports of Present Application

| Multiport Type | Port Count | Dimension L × W × H (mm) | Volume ($cm^3$) | Normalized Volume Ratio |
|---|---|---|---|---|
| Prior Art FIG. 1 | 4 | 274 × 66 × 73 | 1320 | 1.0 |
| | 8 | 312 × 76 × 86 | 2039 | 1.0 |
| | 12 | 381 × 101 × 147 | 5657 | 1.0 |

TABLE 1-continued

Comparison of Conventional Multiport of FIG. 1 with Multiports of Present Application

| Multiport Type | Port Count | Dimension L × W × H (mm) | Volume (cm³) | Normalized Volume Ratio |
|---|---|---|---|---|
| Linear | 4 | 76 × 59 × 30 | 134 | 0.10 |
|  | 8 | 123 × 109 × 30 | 402 | 0.20 |
|  | 12 | 159 × 159 × 30 | 758 | 0.14 |

Terminal or Devices may have other constructions using the concepts disclosed. FIGS. 33-47 depict views of another explanatory device 200 configured as a terminal that comprises at least one connection port 236 along with a securing feature 310 associated with the connection port 236 that is similar to the terminal 200 of FIGS. 3 and 4.

Figure 33:
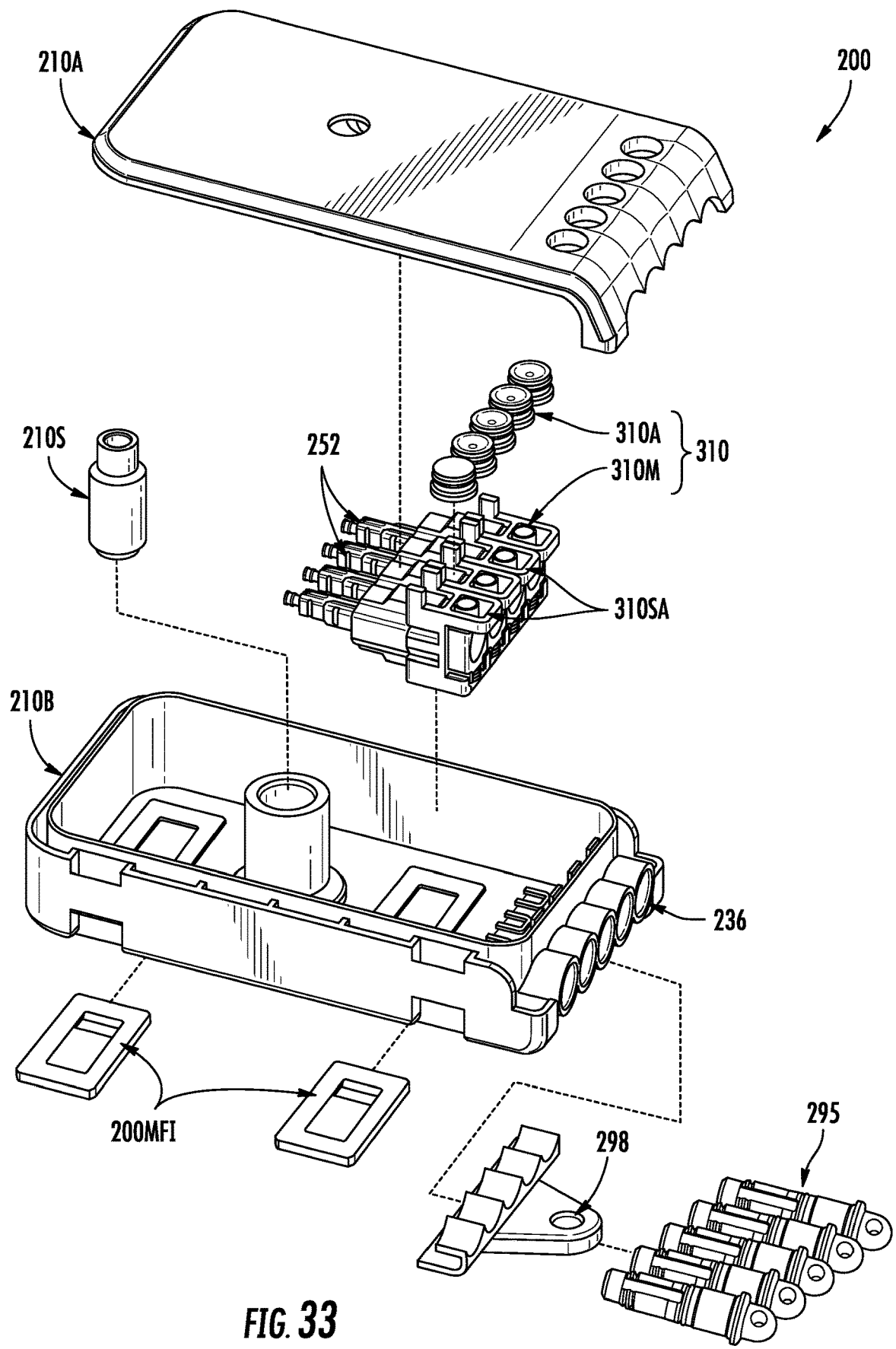
FIG. 33 is a partially exploded view of another explanatory terminal with the optical fibers removed for clarity that is similar to the terminal of FIGS. 3 and 4.
Figure 34:
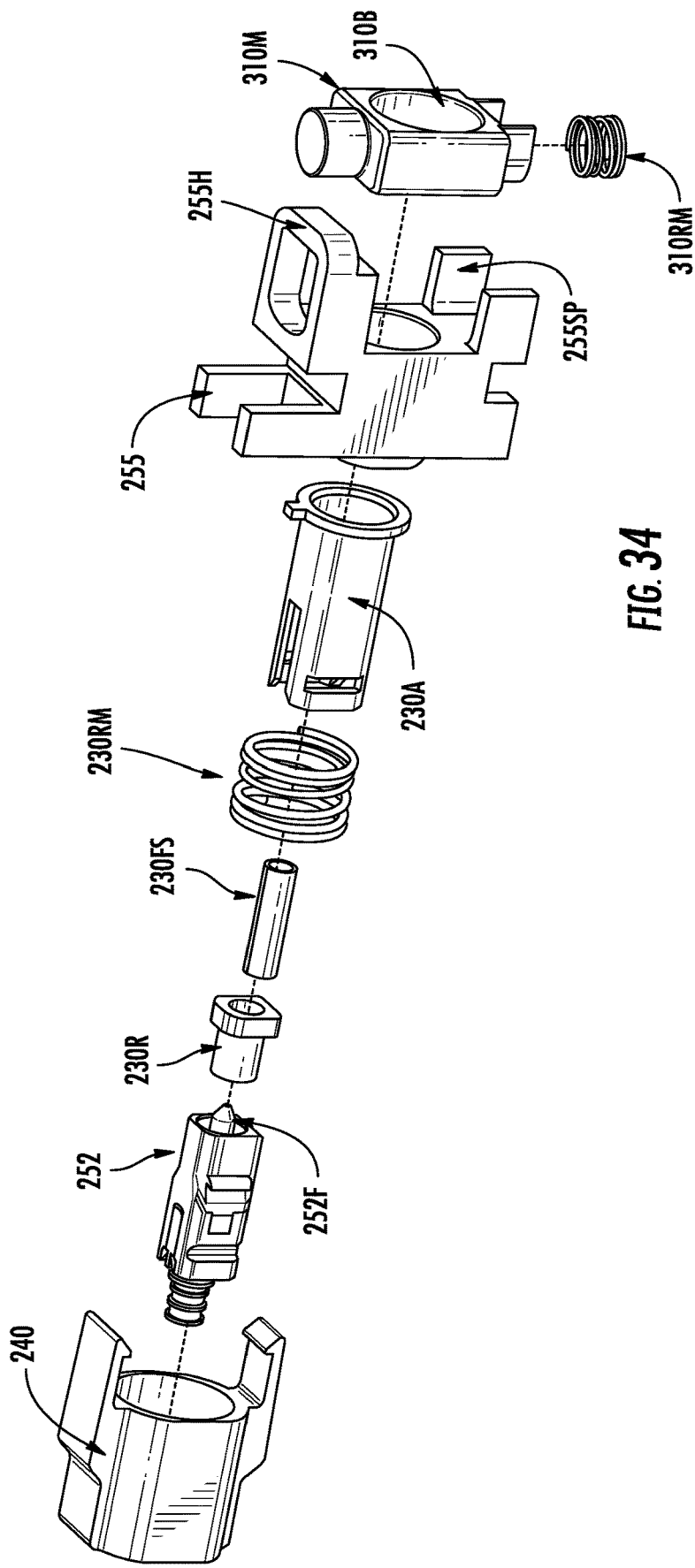
FIG. 34 is an exploded view of the modular adapter sub-assembly of the terminal of FIG. 33.
Figure 35:
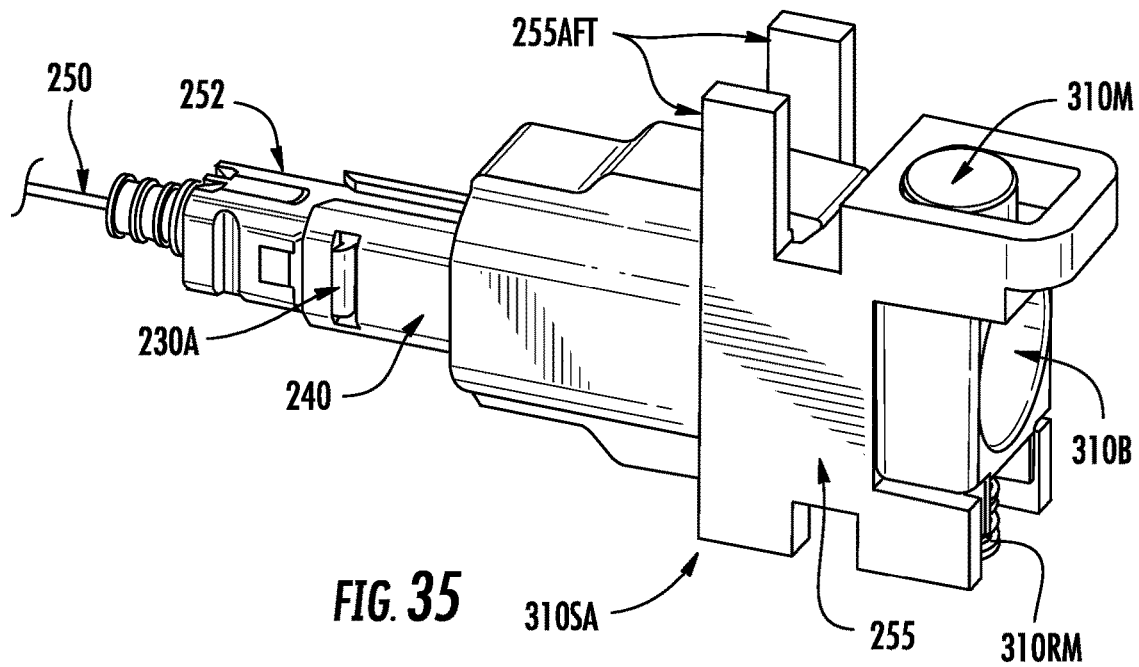
FIG. 35 is a perspective view of the modular adapter sub-assembly of FIG. 34.
Figure 36:
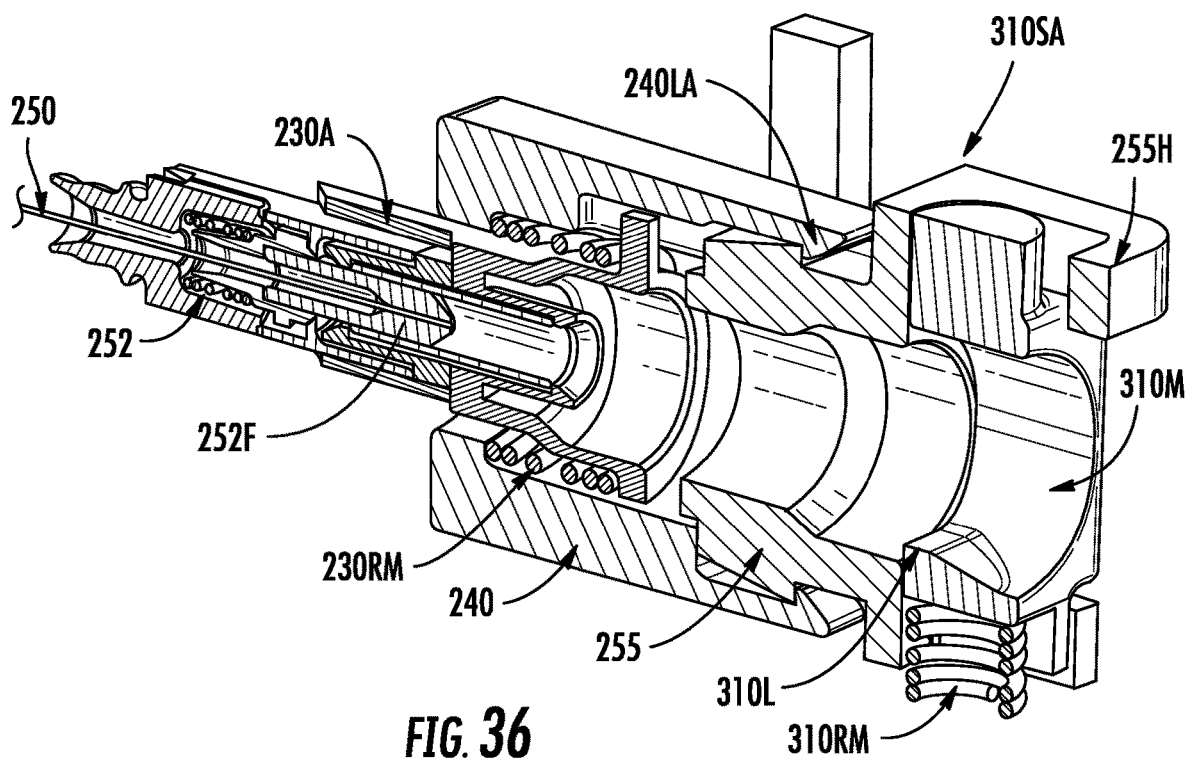
FIG. 36 is a longitudinal sectional view of the modular adapter sub-assembly of FIG. 35.
Figure 37:
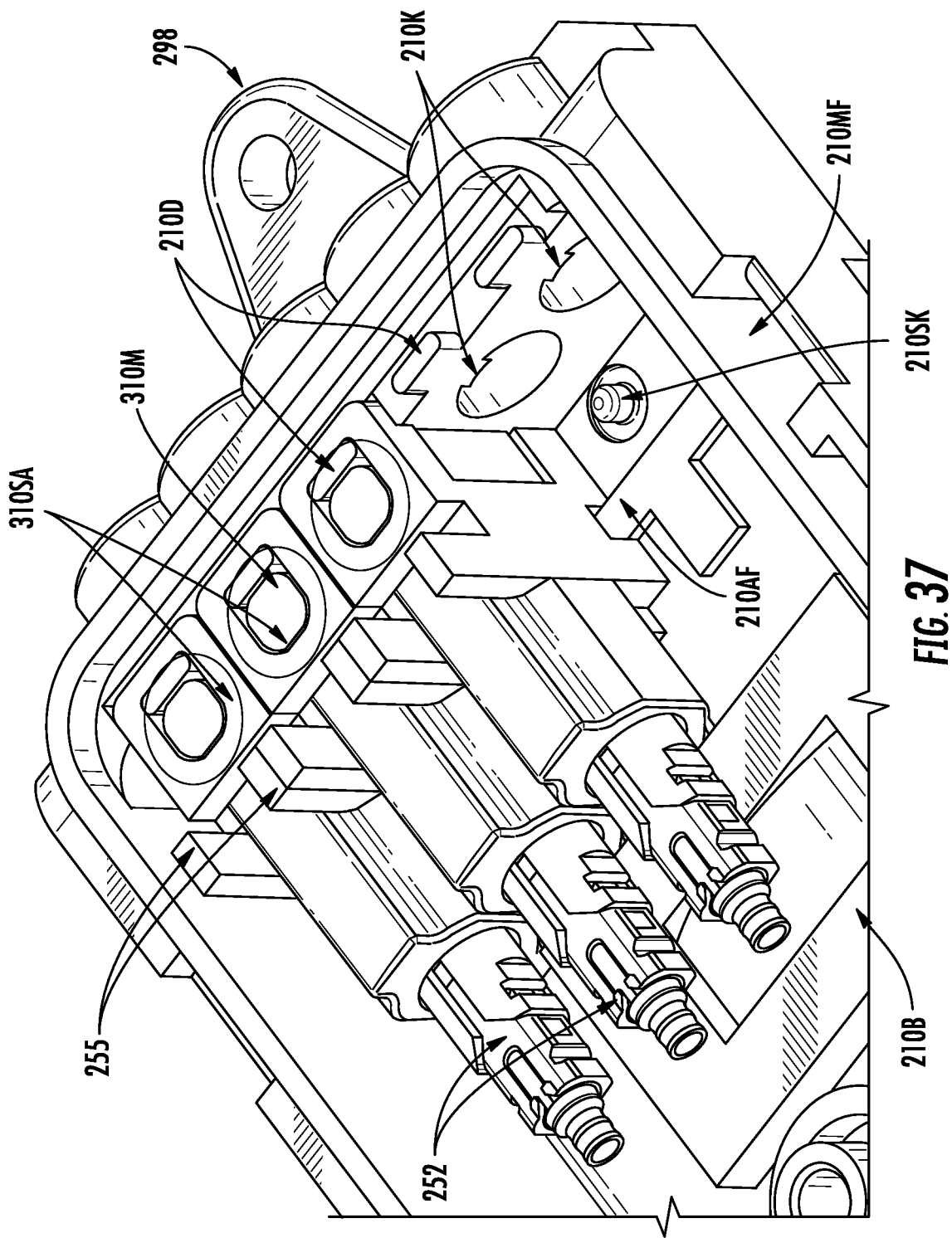
FIG. 37 is a detailed top perspective view of the modular adapter sub-assemblies of FIG. 35 being loaded into the second portion of the shell with the optical fibers removed for clarity.

FIG. 33 depicts a partially exploded view of another terminal 200 that is similar to terminal 200 of FIGS. 3 and 4 and has the optical fibers 250 removed for clarity, and FIGS. 34-36 are views of the modular adapter sub-assembly 310SA of the terminal 200 of FIG. 33. FIG. 37 shows the modular adapter sub-assemblies 310SA of FIG. 35 being loaded into the second portion 210B of the shell 210.

Like, the terminal 200 of FIGS. 3 and 4, this securing feature 310 comprises an actuator 310A and a securing member 310M with the securing member 310M being a portion of a modular adapter sub-assembly 310SA for ease of assembly and isolation of the retaining mechanisms so they can float independently. The securing feature member 310M of securing feature 310 is suitable for retaining connector in connection port 236 as discussed herein. Various different embodiments are possible for securing features 310 comprising more than one component for the devices disclosed.

Terminal 200 of FIG. 33 comprise one or more connection ports 236 and the one or more securing feature passageways 245 as a portion of the shell 210. Terminal 200 of FIG. 33 comprises a shell 210 comprising a body 232 with one or more connection ports 236 disposed on a first end or portion 212 with each connection port 236 comprising a respective optical connector opening 238. The optical connector openings 238 extend from an outer surface 234 of shell 210 into a cavity 216 and define a connection port passageway 233. One or more respective securing feature passsageways 245 extend from the outer surface 234 of the shell 210 to the respective connection port passageways 233. A plurality of security features 310 are associated with the respective plurality of connection ports 236. As depicted, shell 210 is formed by a first portion 210A and a second portion 210B.

FIGS. 34-36 are views of the modular adapter sub-assembly 310SA of the terminal 200 of FIG. 33, that is similar to the modular adapter sub-assembly 310SA used in the terminal 200 of FIGS. 3 and 4. The main difference in the modular adapter sub-assembly of FIGS. 34-36 are in the design of the adapter body 255. In this adapter body 255 the securing feature resilient member 310RM is not capture in a resilient member pocket of the adapter body 255. Instead, the second shell 210B comprises a spring keeper 210SK adjacent to the respective connection port 236 best shown in FIG. 37. This may make the assembly of the terminal 200 more challenging. Additionally, adapter body 255 of the terminal 200 of FIG. 33 has different alignment feature 255Af on the bottom of the adapter body 255.

FIG. 37 is a top detailed perspective view of the modular adapter sub-assemblies of FIG. 35 being loaded into the second portion 210B of the shell 210 with the optical fibers removed for clarity. As best shown in FIG. 37, the modular sub-assembles 310SA are individually placed into the second portion 210B of shell 210 after the securing feature resilient member 310RM is place about the spring keeper 210SK. As shown the alignment features 210AF of the second portion 210B of shell 210 align the modular adapter sub-assembly 310SA with the respective connection ports 236. In this embodiment, the alignment features 210AF are configured as a T-rail for seating the adapter body 255.

Figure 38:
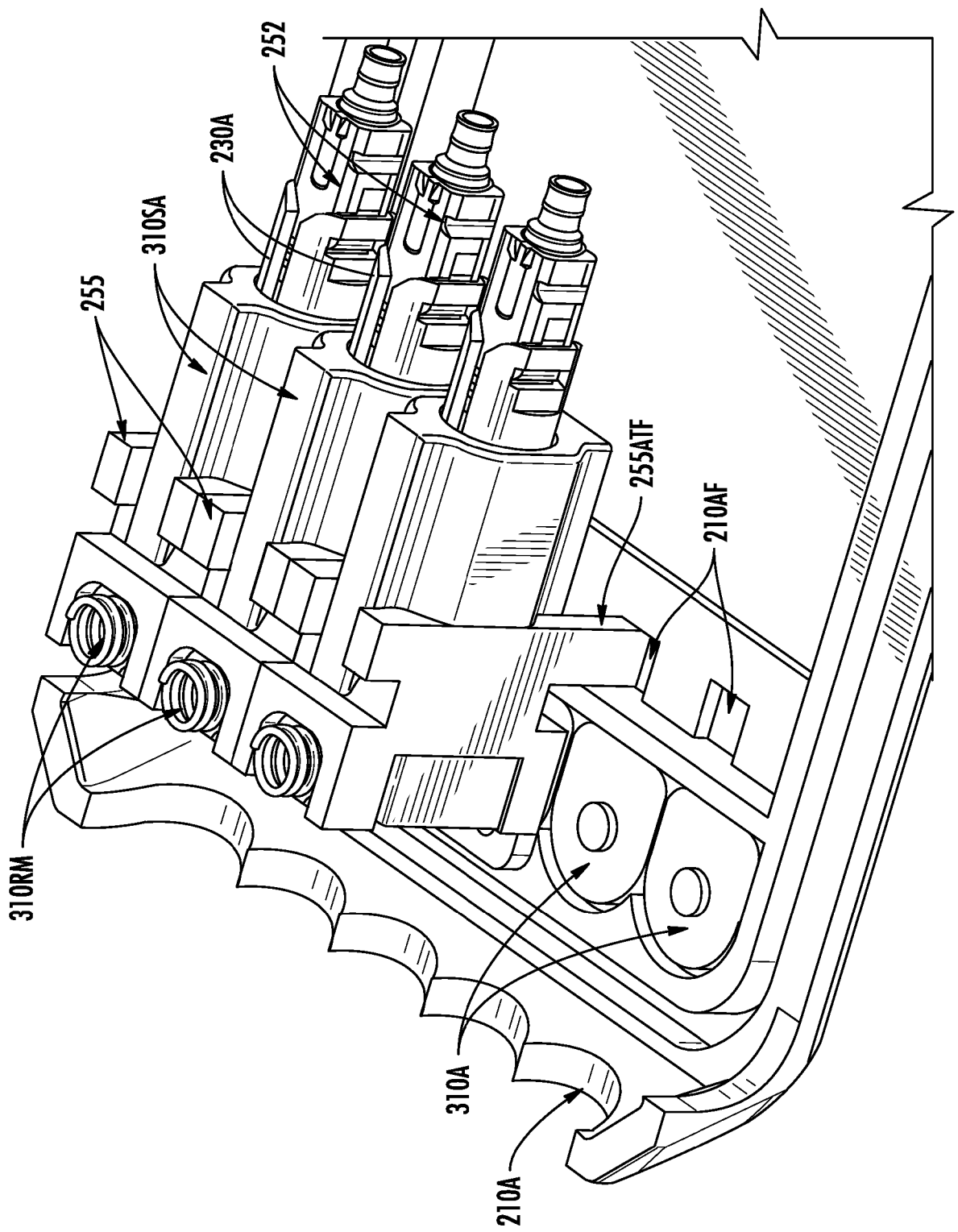
FIG. 38 is a detailed perspective view showing how the features of the modular sub-assemblies of FIG. 35 engage the first portion of the shell when assembled.

FIG. 38 is a detailed perspective view showing how the features of the modular adapter sub-assemblies 310SA of FIG. 35 engage the first portion 210A of the shell 210 when assembled. FIG. 38 depicts a partial assembled view of terminal 200 of FIG. 33 showing the respective actuators 310A placed into securing feature passageways 245 within the first portion 210A of the shell 210 and the modular sub-assemblies 310SA being placed on the first portion 210A of the shell. This view is shown to depict the cooperating geometry between the modular sub-assembles 310SA and the first portion 210A of shell 210. Like the other terminal 200, first portion 210A of shell 210 also comprises alignment features 210AF sized and shaped for cooperating with the alignment features 255AFT on the top of adapter body 255 for securing the same when the terminal is assembled. The respective alignment features 210AF,255AF only allow assembly of the modular adapter sub-assemblies 310AS into the shell 210 in one orientation for the correct orientation of the locking feature 310L with respect to the connection port 236. This view also shows that actuators 310A have a different geometry since they do not have a completely round form-factor like the actuators 310A shown in FIGS. 19 and 20. After the internal assembly is completed, the first and second portions 210A,210B of shell 210 may assembled in suitable fashion using a sealing element 290 or not.

FIG. 39 is a detailed sectional view of the terminal 200 of FIG. 33 through the connection port for showing the internal construction of the terminal with a fiber optic connector retained using the securing feature 310. As shown in FIG. 39, the connector mating plane 230MP between the ferrule of the rear connector 252 and ferrule of connector 10 is disposed within the cavity 216 terminal 200 for protecting the connector mating interface. Specifically, the respective ferrules are aligned using the ferrule sleeve 230FS. Connector 10 includes a locking feature 20L on the housing 20 for cooperating with a securing feature 310 of terminal 200. This arrangement is similar for retaining connectors 10 in the terminal 200 of FIGS. 3 and 4. Connector 10 comprises at least one O-ring 65 for sealing with the connector port passageway 233 at a sealing surface when the connector 10 is fully inserted into the connection port 236.

FIGS. 40A and 40B depicts the use of an input tether 270 with terminal 200. The concepts disclosed may be used with the pass-through cables as well. Input tether 270 has optical fibers 250 that enter the terminal 200 and are terminated with to rear connectors 252 for making an optical connection at the connection port 236. In this embodiment, there is no securing feature for the input connection port 260. However, other embodiments may retain the securing feature and secure the input tether 270 from inside the device.

If used, input tether 270 may terminate the other end with a fiber optic connector or be a stubbed cable as desired. For instance, the input tether connector could be an OptiTip® connector for optical connection to previously installed distribution cables; however, other suitable single-fiber or multi-fiber connectors may be used for terminating the input tether 270 as desired. Input tether 270 may be secured to the terminal 200 in other suitable manners inside the terminal such as adhesive, a collar or crimp, heat shrink or combinations of the same. In other embodiments, the input tether could be secured using a securing member internal to the shell without the actuator as shown. The input tether to terminal interface could also be weatherproofed in a suitable manner. The input tether 270 may also have stubbed optical fibers for splicing in the field if desired, instead of the connector 278.

Furthermore, the input tether 270 may further comprise a furcation body that has a portion that fits into the terminal 200 at the input port of the shell 210 such as into the optical connector opening 238 of the input connection port 260, but the furcation body may be disposed within the shell 210 if desired as well. The furcation body is a portion of the input tether that transitions the optical fibers 250 to individual fibers for routing within the cavity 216 of the shell 210 to the respective connector ports. As an example, a ribbon may be used for insertion into the back end of the ferrule of fiber optic connector 278 and then be routed through the input tether 270 to the furcation body where the optical fibers are then separated out into individual optical fibers 250. From the furcation body the optical fibers 250 may be protected with a buffer layer or not inside the cavity 216 of the terminal 200 and then terminated on rear connector 252 as desired.

The input tether 270 may be assembled with the rear connectors 252 and/or fiber optic connector 278 in a separate operation from the assembly of terminal 200 if the rear connectors 252 fit through the input port. Thereafter, the rear connectors 252 may be individually threaded into the input connection port 260 of the terminal with the appropriate routing of the optical fiber slack and then have the rear connectors 252 attached to the appropriate structure for optical communication with the connection port passageways 233 of the terminal 200. The furcation body may also be secured to the connection port insert in the manner desired. By way of explanation, the input tether may be secured to shell 210 using a collar that fits into a cradle. This attachment of the input tether using collar and cradle provides improved pull-out strength and aids in manufacturing; however, other constructions are possible for securing the input tether.

Figure 41:
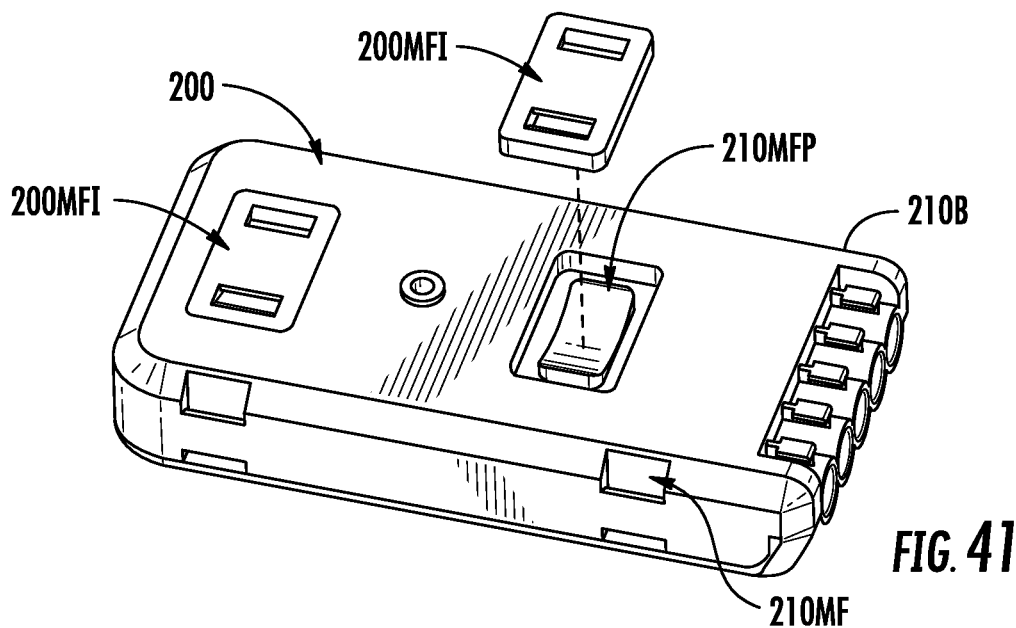
FIGS. 41-43 depict various views of a mounting feature insert that may be attached to the bottom of the second portion of the shell for use with the devices disclosed.
Figure 42:
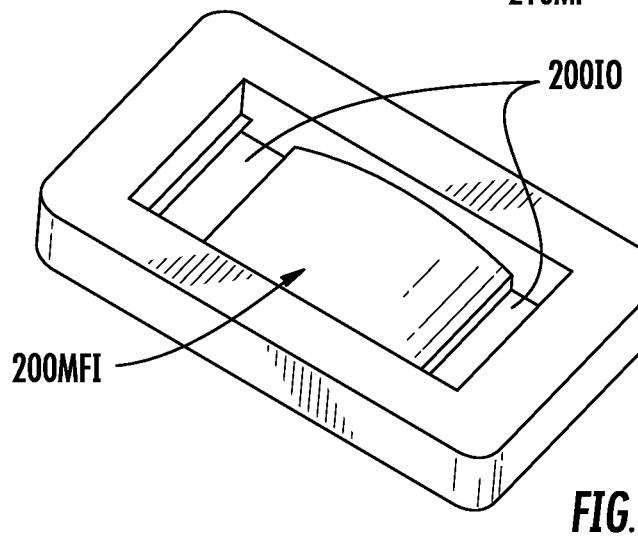
Figure 43:
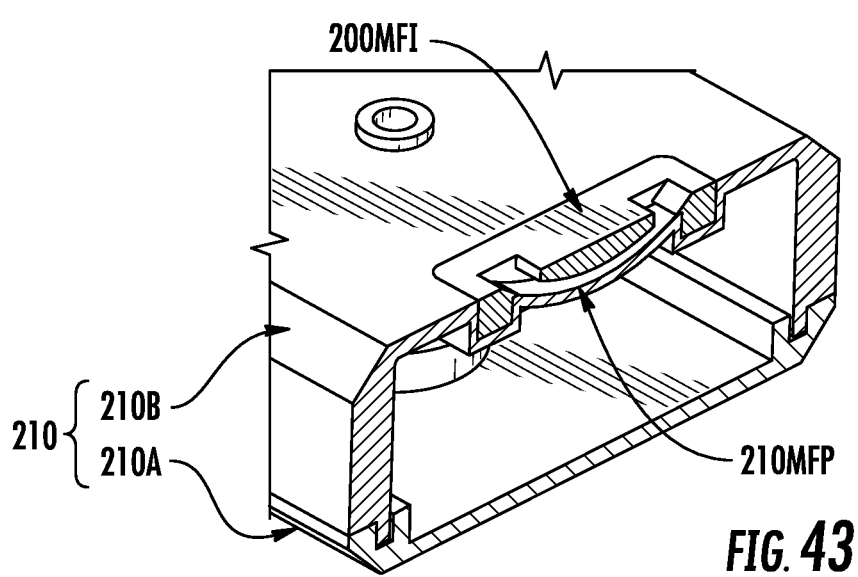

FIGS. 41-43 depict various views of a mounting feature insert 200MFI that may be attached to a portion of the shell 210 for securing the device such as with a band or tie-strap. FIG. 41 shows the bottom of the second portion 210B of shell 210 comprising one or more pockets 210MFP. As shown, mounting feature insert 200MFI cooperates with a suitable pocket 210MF to snap-fit together with a band for securing the terminal to a pole or the like. FIG. 42 depicts the mounting feature insert 200MFI comprising insert openings 200IO disposed on opposite sides of a curved saddle for receiving a band or strap, and FIG. 43 is a cross-sectional view of the cooperation between mounting feature insert 200MFI and the second portion 210B of shell 210.

Figure 44:
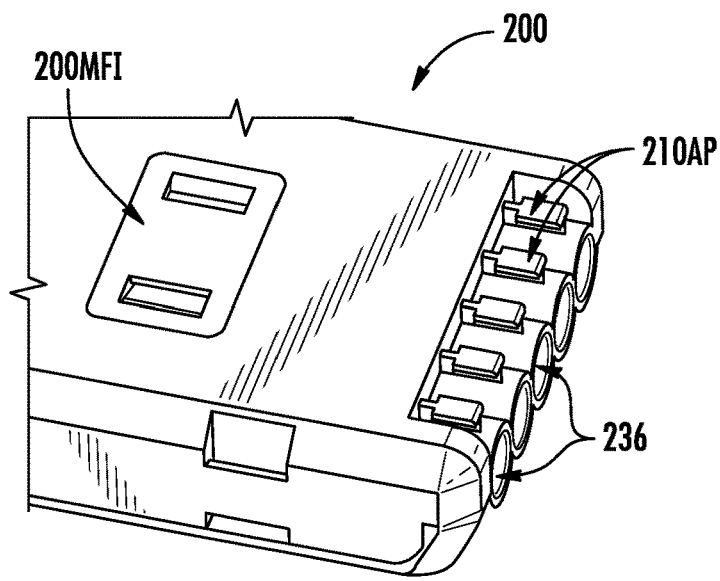
FIGS. 44-46 depict various views of a mounting tab that may be attached to the front end of the second portion of the shell for use with the devices disclosed.
Figure 45:
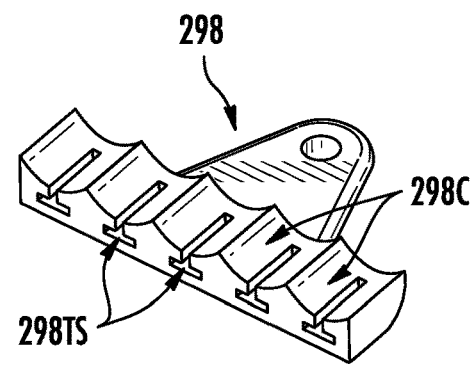
Figure 46:
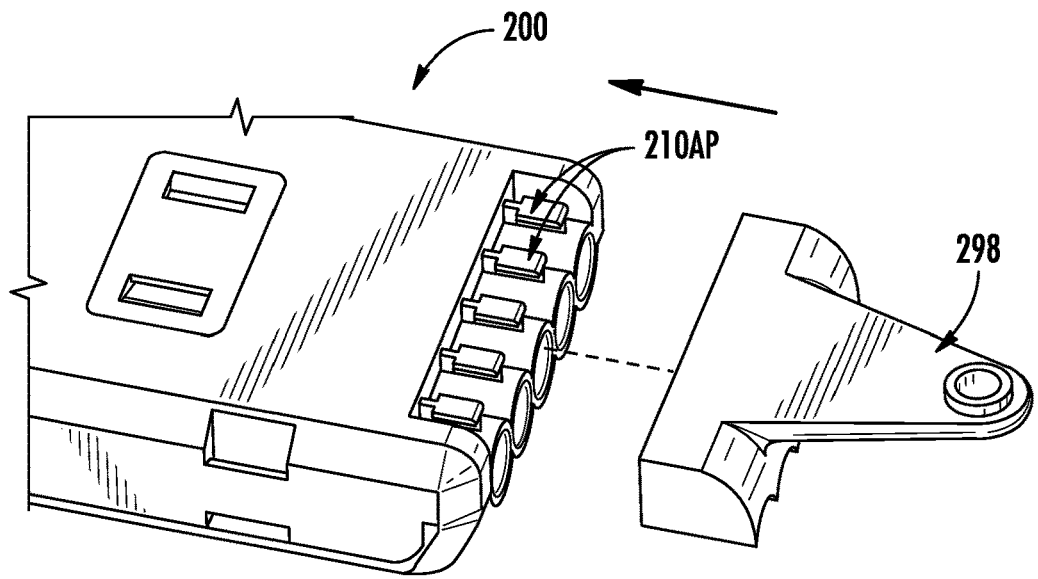

FIGS. 44-46 depict various views of a mounting feature 298 that may be attached to the front end of the second portion 210B of the shell 210 similar to the other mounting tab 298 disclosed. FIG. 44 depicts alignment protrusions 210AP on the front end 212 of second portion 210B of shell 210 for securing mounting tab 298. Alignment protrusions are configured as T-rails in this embodiment, but other geometry is possible. Specifically, alignment protrusions 210AP cooperate with a plurality of T-rail slots on mounting tab 298 as shown in FIG. 45 for aligning and attaching the mounting tab to the shell 210 of the terminal 200. Mounting tab 298 may be attached to the shell 210 as shown in FIG. 46, and adhesive or fastener may be used as desired. Other variations of for the mounting tab are possible.

As shown in FIGS. 47 and 48, terminals 200 may also have one or more dust caps 295 for protecting the connection port 236 or input connection ports 260 from dust, dirt or debris entering the terminal or interfering with the optical performance. Thus, when the user wishes to make an optical connection to the terminal, the appropriate dust cap 295 is removed from the connector port 236 and then connector 10 of cable assembly 100 may be inserted into the respective connection port 236 for making an optical connection to the terminal 200. Dust caps 295 may use similar release and retain features as the connectors 10. By way of explanation, when securing feature 310 is pushed inward or down, the dust cap 295 is released and may be removed. Moreover, the interface between the connection ports 236 and the dust cap or connector 10 may be sealed using appropriate geometry and/or a sealing element such as an O-ring or gasket.

Figure 49:
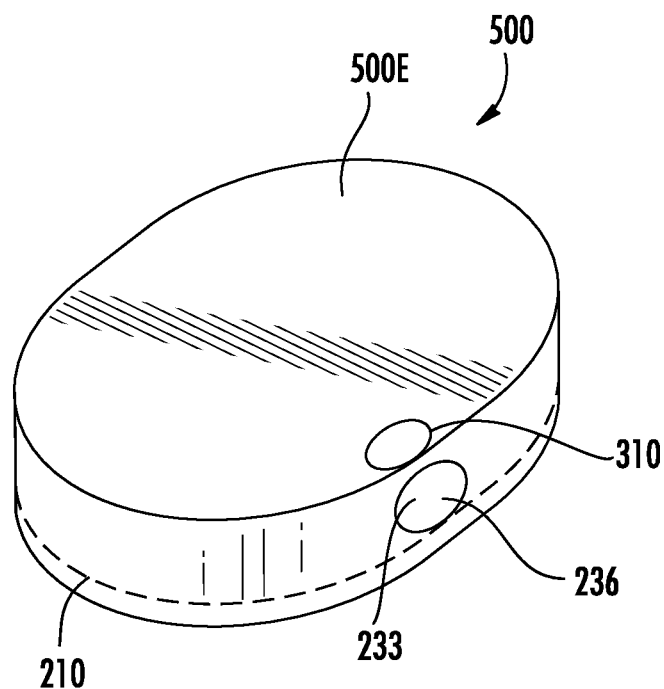
FIG. 49 is a perspective view of a wireless device comprising at least one connector port and a securing member according to the concepts disclosed herein.

FIG. 49 is a perspective view of a wireless device 500 having a similar construction to the concepts disclosed herein and comprising at least one connector port 236 associated with securing member 310. Wireless device 500 may have a securing feature resilient member 310RM for biasing a portion of the securing feature 310. Wireless device 500 may comprise one or more connection ports 236 disposed on the portion of shell 210 as shown in FIG. 49. Wireless device 500 may have an input port that includes power and may have electronics 500E (not visible) disposed with in the cavity (not visible) of the device. The wireless device 500 may have any of the other features disclosed herein and they will not be repeated for the sake of brevity.

Figure 50:
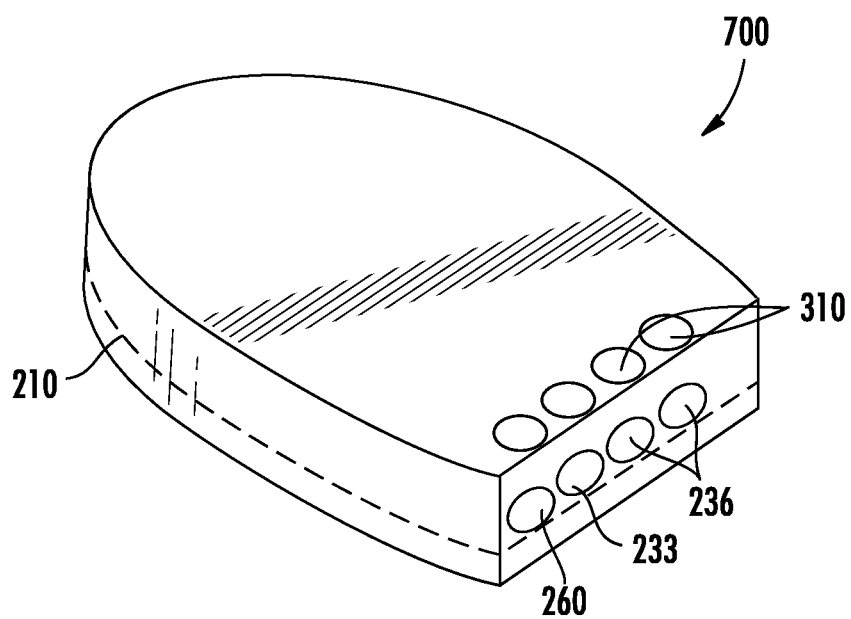
FIG. 50 is a perspective view of a closure comprising at least one connector port and a securing member according to the concepts disclosed herein.

Still other devices are possible according to the concepts disclosed. FIG. 50 is a perspective view of a closure 700 comprising at least one connector port 236 and associated securing member 310. Like wireless device 500, closure 700 may comprise one or more connection ports 236 disposed on the portion of shell 210 as shown in FIG. 50. Closure 700 may also have a securing feature resilient member 310RM for biasing a portion of the securing feature 310. Closure 700 may have one or more input ports or include other components disposed with in the cavity (not visible) of the device as disclosed herein. The closure 700 may have any of the other features disclosed herein and they will not be repeated for the sake of brevity.

Methods for making devices 200, 500 and 700 are also disclosed herein. The methods disclosed may further include installing at least one securing feature 310 into a device 200, 500 and 700 so that the at least one securing feature 310 is associated with connection port 236 (e.g., the securing feature is disposed within the shell). The securing feature 310 may translate between an open position OP and a retain position RP, and at least one securing feature resilient member (310RM) is positioned for biasing a portion of the at least one securing feature (310) to a retain position RP.

The methods may further comprise the securing feature (310) comprising a locking feature 310L. The locking feature further comprise a ramp with a ledge.

The methods may further comprise at least one securing feature (310) translating from a retain position (RP) to an open position (OP) as a suitable fiber optic connector (10) is inserted into the at least one connection port (236).

The method may further comprise securing feature 310 being capable of moving to a retain position RP automatically when a suitable fiber optic connector is fully inserted into the at least one connector port passageway 233.

The method may further comprise translating the securing feature 310 for moving the securing feature 310 to the open position OP from a normally biased closed position CP.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A terminal for making an optical connection, comprising:
    a shell;
    at least one connection port disposed on the terminal with the at least one connection port comprising an optical connector opening extending from an outer surface of the terminal into a cavity of the terminal and defining a connection port passageway;
    at least one securing feature being disposed within the shell and associated with the connection port passageway, wherein a portion of the at least one securing feature is formed from a polymer comprising a break strain range of 2-10 percent elongation before breaking as measured by ASTM D638; and
    at least one securing feature resilient member for biasing a portion of the at least one securing feature, wherein the at least one securing feature resilient member comprises a pre-load restoring force between 5 pounds force and 12 pounds force.

2. The terminal of claim 1, further comprising at least one modular adapter sub-assembly disposed within the shell.

3. A terminal for making an optical connection, comprising:
    a shell;
    at least one connection port disposed on the terminal with the at least one connection port comprising an optical connector opening extending from an outer surface of the terminal into a cavity of the terminal and defining a connection port passageway;
    at least one modular adapter sub-assembly disposed within the shell;
    at least one securing feature being associated with the connection port passageway, the at least one securing feature comprising a bore with a locking feature disposed within the bore, wherein the at least one locking feature projects from the bore with a locking feature height between 3-8 millimeters and a portion of the at least one securing feature is formed from a polymer comprising a break strain range of 2-10 percent elongation before breaking as measured by ASTM D638; and
    at least one securing feature resilient member for biasing a portion of the at least one securing feature.

4. The terminals of claim 3, wherein the at least one securing feature is capable of translating.

5. The terminal of claim 3, wherein of the at least one securing feature is biased to a retain position by at least one securing feature resilient member, wherein the at least one securing feature resilient member comprises a pre-load restoring force between 5 pounds force and 12 pounds force.

6. A terminal for making optical connections, comprising:
    a shell;
    at least one connection port comprising an optical connector opening extending from an outer surface of the terminal into a cavity and defining a connection port passageway;
    at least one modular adapter sub-assembly disposed within the shell;
    at least one securing feature capable of translating being associated with the at least one connection port passageway, wherein a portion of the at least one securing feature is part of the modular adapter sub-assembly, the at least one securing feature comprising a bore with a locking feature disposed within the bore, wherein the locking feature projects from the bore with a locking feature height between 3-8 millimeters and a portion of the at least one securing feature is formed from a polymer comprising a break strain range of 2-10 percent elongation before breaking as measured by ASTM D638.

7. The terminal of claim 6, wherein the at least one securing feature (310) comprises a bore 310B that is aligned with the at least one connection port passageway (233).

8. A terminal for making optical connections, comprising:
    a shell;
    at least one connection port comprising an optical connector opening extending from an outer surface of the terminal into a cavity and defining a connection port passageway;
    at least one modular adapter sub-assembly (310SA) disposed within the shell;
    at least one securing feature capable of translating being associated with the at least one connection port passageway, and a portion of the at least one securing feature comprises a bore and a portion of the at least one securing feature is formed from a polymer comprising a break strain range of 2-10 percent elongation before breaking as measured by ASTM D638; and
    at least one securing feature resilient member for biasing a portion of the at least one securing feature, wherein the at least one securing feature resilient member comprises a pre-load restoring force between 5 pounds force and 12 pounds force.

9. The terminal of claim 8, wherein the at least one securing feature translates from a retain position to an open position as a suitable fiber optic connector is inserted into the at least one connection port.

10. The terminal of claim 9, wherein the at least one securing feature is capable of releasing a fiber optic connector when translating to an open position.

11. The terminal of claim 8, wherein the at least one securing feature is capable of moving to a retain position automatically when a suitable fiber optic connector is fully-inserted into the at least one connector port passageway.

12. The terminal of claim 8, wherein the at least one securing feature further comprises a locking feature.

13. The terminal of claim 12, wherein the locking feature comprises a ramp with a ledge.

14. A terminal for making optical connections, comprising:
- a shell;
- at least one connection port comprising an optical connector opening extending from an outer surface of the terminal into a cavity and defining a connection port passageway;
- at least one modular adapter sub-assembly disposed within the shell;
- at least one securing feature capable of translating being associated with the at least one connection port passageway, and a portion of the at least one securing feature comprises a bore with a locking feature disposed within the bore, wherein the locking feature projects from the bore with a height between 3-8 millimeters, and a portion of the at least one securing feature is formed from a polymer comprising a break strain range of 2-10 percent elongation before breaking as measured by ASTM D638; and
- at least one securing feature resilient member for biasing a portion of the at least one securing feature, wherein the at least one securing feature resilient member comprises a pre-load restoring force between 5 pounds force and 12 pounds force, and the at least one securing feature translates from a retain position to an open position as a suitable fiber optic connector is inserted into the at least one connection port.

15. The terminal of claim 14, wherein the bore is sized for receiving a suitable fiber optic connector therethrough.

16. The terminal of claim 14, wherein the bore comprises a locking feature.

17. The terminal of claim 16, wherein the locking feature comprises a ramp with a ledge.

18. The terminal of claim 6, further comprising at least one securing feature resilient member for biasing a portion of the at least one securing feature wherein the at least one securing feature resilient member comprises a pre-load restoring force between 6 pounds force and 10 pounds force.

19. The terminal of claim 6, wherein the at least one securing feature comprises an actuator and a securing member.

20. The terminal of claim 19, wherein the securing member is part of the modular adapter sub-assembly.

21. A terminal for making optical connections, comprising:
- a shell;
- at least one connection port comprising an optical connector opening extending from an outer surface of the terminal into a cavity and defining a connection port passageway;
- at least one modular adapter sub-assembly disposed within the shell;
- at least one securing feature capable of translating being associated with the at least one connection port passageway, and the at least one securing feature comprises an actuator and a securing member, wherein the securing member comprises a bore and a locking feature, and a portion of the at least one securing feature is formed from a polymer comprising a break strain range of 2-10 percent elongation before breaking as measured by ASTM D638; and
- at least one securing feature resilient member for biasing a portion of the at least one securing feature, wherein the at least one securing feature resilient member comprises a pre-load restoring force between 5 pounds force and 12 pounds force, and wherein the at least one securing feature translates from a retain position to an open position as a suitable fiber optic connector is inserted into the at least one connection port.

22. The terminal of claim 21, wherein the locking feature comprises a ramp with a ledge.

23. The terminal of claim 22, wherein the locking feature comprises a retention surface.

24. A terminal for making optical connections, comprising:
- a shell;
- at least one connection port comprising an optical connector opening extending from an outer surface of the terminal into a cavity and defining a connection port passageway;
- a securing feature passageway;
- at least one securing feature being associated with the at least one connection port passageway, and the at least one securing feature comprises a securing member having a locking feature and an actuator, wherein the actuator is capable of translating within a portion of the at least one securing feature passageway, wherein a portion of the at least one securing feature is formed from a polymer comprising a break strain range of 2-10 percent elongation before breaking as measured by ASTM D638;
- at least one securing feature resilient member for biasing a portion of the at least one securing feature, wherein the at least one securing feature resilient member comprises a pre-load restoring force between 6 pounds force and 10 pounds force, and wherein the at least one securing feature translates from a retain position to an open position as a suitable fiber optic connector is inserted into the at least one connection port; and
- at least one modular adapter sub-assembly disposed within the shell, wherein the securing member is part of the modular adapter sub-assembly.

25. The terminal of claim 6, wherein the at least one connection port is a portion of the shell.

26. The terminal of claim 25, the shell comprises at least a first portion and a second portion.

27. The terminal of claim 6, at least one optical fiber routed from the at least one connection port toward an input connection port of the terminal.

28. The terminal of claim 6, the at least one modular adapter sub-assembly comprising an adapter aligned with the at least one connection port.

29. The terminal of claim 28, the adapter biased by a resilient member.

30. The terminal of claim 28, the at least one modular adapter sub-assembly comprising an adapter body and a retainer, wherein the adapter is secured to the adapter body using retainer.

31. The terminal of claim 6, the at least one modular adapter sub-assembly comprising an adapter biased by a resilient member and aligned with the at least one connection port, and the at least one modular adapter sub-assembly further comprising an adapter body and a retainer, wherein the adapter is secured to the adapter body using retainer.

32. The terminal of claim 6, the at least one modular adapter sub-assembly capable of floating relative to the at least one connection port passageway.

33. The terminal of claim 6, further comprising a sealing feature disposed on the at least one securing feature.

34. The terminal of claim 6, further comprising at least one rear connector comprising a rear connector ferrule.

35. The terminal of claim 34, the at least one rear connector further comprising a resilient member for biasing the rear connector ferrule.

36. The terminal of claim 6, further comprising at least one rear connector having a SC footprint.

37. The terminal of claim 6, wherein the terminal is weatherproof.

38. The terminal of claim 6, further comprising an optical splitter disposed within the cavity.

39. The terminal of claim 6, further comprising at least one mounting feature for the terminal.

40. The terminal of claim 6, further comprising an input connection port configured as a single-fiber input connection or a multi-fiber input connection.

41. The terminal of claim 6, further comprising an input connection port configured as an input tether.

42. The terminal of claim 6, the connection port passageway comprising a keying portion.

43. The terminal of claim 42, wherein the keying portion comprises a male key.

44. The terminal of claim 6, further comprising at least one fiber routing guide or support.

45. The terminal of claim 6, wherein the shell defines a volume of 800 cubic centimeters or less.

46. The terminal of claim 6, wherein the shell defines a volume of 400 cubic centimeters or less.

47. The terminal of claim 6, wherein the shell defines a volume of 100 cubic centimeters or less.

48. The terminal of claim 6, wherein the terminal has a port width density of at least one connection port per 20 millimeters of width of terminal.

49. The terminal of claim 6, further comprising a sealing element.

50. The terminal of claim 6, further comprising a dust cap sized for cooperating with the at least one optical connector opening.

51. The terminal of claim 6, wherein the terminal comprises a marking indicia for the at least one connection port.

52. The terminal of claim 14, wherein the terminal comprises a marking indicia on the at least one securing feature for the at least one connection port.

53. The terminal of claim 21, wherein the locking feature projects from the bore with a locking feature height between 3-8 millimeters.

54. The terminal of claim 21, wherein the locking feature comprises a locking feature surface area greater than 3 square millimeters.

55. The terminal of claim 6, wherein a portion of the at least one securing feature is formed from a polymer comprising a break stress range of 70-250 MPa as measured by ASTM D638.

56. A method for making a device comprising an optical connection port, comprising the steps of:
  installing at least one securing feature into the device so that the at least one securing feature is associated with a respective connection port, wherein the at least one securing feature may translate between an open position and a retain position, wherein a portion of the at least one securing feature is formed from a polymer comprising a break strain range of 2-10 percent elongation before breaking as measured by ASTM D638, and at least one securing feature resilient member is positioned for biasing a portion of the at least one securing feature to a retain position wherein the at least one securing feature resilient member comprises a pre-load restoring force between 5 pounds force and 12 pounds force.

57. The method of claim 56, wherein the at least one securing feature further comprises a locking feature.

58. The method of claim 57, wherein the locking feature further comprising a ramp with a ledge.

59. The method of claim 56, wherein the locking feature projects from a bore with a locking feature height between 3-8 millimeters.

60. The method of claim 56, further comprising the at least one securing feature translating from a retain position to an open position as a suitable fiber optic connector is inserted into the at least one connection port.

61. The method of claim 56, further comprising the at least one securing feature being capable of moving to a retain position automatically when a suitable fiber optic connector is fully-inserted into a connector port passageway.

62. The method of claim 56, further comprising translating the at least one securing feature the open position from a normally-biased retain position.

63. A wireless device, comprising:
  a shell;
  at least one connection port on the wireless device, the at least one connection port comprising an optical connector opening extending from an outer surface of the wireless device into a cavity of the wireless device and defining a connection port passageway;
  at least one securing feature being associated with the connection port passageway, wherein a portion of the at least one securing feature is formed from a polymer comprising a break strain range of 2-10 percent elongation before breaking as measured by ASTM D638; and
  at least one securing feature resilient member for biasing a portion of the at least one securing feature wherein the at least one securing feature resilient member comprises a pre-load restoring force between 5 pounds force and 12 pounds force.

64. The wireless device of claim 63, further comprising at least one modular adapter sub-assembly disposed within the shell.

65. The wireless device of claim 63, wherein the at least one securing feature further comprises a locking feature, wherein the locking feature projects from a bore with a locking feature height between 3-8 millimeters.

* * * * *